(12) United States Patent
Fisher

(10) Patent No.: US 11,780,343 B2
(45) Date of Patent: Oct. 10, 2023

(54) MOBILE EV CHARGING STATION

(71) Applicant: The Shyft Group, Inc., Charlotte, MI (US)

(72) Inventor: Eric R. Fisher, Elkhart, IN (US)

(73) Assignee: The Shyft Group, Inc., Charlotte, MI (US)

( * ) Notice: Subject to any disclaimer, the term of this patent is extended or adjusted under 35 U.S.C. 154(b) by 0 days.

(21) Appl. No.: 17/942,851

(22) Filed: Sep. 12, 2022

(65) Prior Publication Data

US 2023/0081083 A1 Mar. 16, 2023

Related U.S. Application Data

(60) Provisional application No. 63/307,664, filed on Feb. 8, 2022, provisional application No. 63/284,122, filed
(Continued)

(51) Int. Cl.
| | |
|---|---|
| *B60L 53/30* | (2019.01) |
| *B60L 53/31* | (2019.01) |
| *H02J 7/00* | (2006.01) |
| *B60L 53/53* | (2019.01) |
| *G05D 1/00* | (2006.01) |

(Continued)

(52) U.S. Cl.
CPC ............ *B60L 53/30* (2019.02); *B60L 15/20* (2013.01); *B60L 53/16* (2019.02); *B60L 53/31* (2019.02); *B60L 53/53* (2019.02); *B62D 61/12* (2013.01); *G05D 1/0022* (2013.01); *G05D 1/0223* (2013.01); *H02J 7/007* (2013.01); *H02J 7/0013* (2013.01); *H02J 7/0042* (2013.01); *H02J 7/0063* (2013.01); *H02J 7/35* (2013.01); *H02J 50/001* (2020.01); *H02J 2300/22* (2020.01); *H02J 2300/28* (2020.01)

(58) Field of Classification Search
CPC .................................. B62D 61/12; B60L 53/30
USPC ......................................................... 320/109
See application file for complete search history.

(56) References Cited

U.S. PATENT DOCUMENTS

| | | | |
|---|---|---|---|
| 3,933,258 A * | 1/1976 | Forsyth ................... | B60P 3/07 410/91 |
| 7,952,325 B2 | 5/2011 | Baxter | |

(Continued)

FOREIGN PATENT DOCUMENTS

| | | | | |
|---|---|---|---|---|
| WO | WO-2008083219 A2 * | 7/2008 | ............ | F03D 1/005 |
| WO | WO 2021105928 A1 | 6/2021 | | |
| WO | WO-2021246993 A1 * | 12/2021 | ............ | B60L 53/30 |

OTHER PUBLICATIONS

International Search Report and Written Opinion; dated Jan. 27, 2023; PCT/US2022/043284; Filed Sep. 13, 2022.

*Primary Examiner* — Jerry D Robbins
(74) *Attorney, Agent, or Firm* — Barnes & Thornburg LLP

(57) ABSTRACT

A mobile electronic vehicle (EV) charging station is provided. The charging station may include one or more charging bays for charging electric vehicles (EVs). The charging station includes a plurality of batteries within an interior compartment to supply power for charging the EVs. There is a power delivery subsystem to control supply of electrical power from the batteries to the charging bays. The charging station self-driving to move between a first position to a second position. In some cases, the charging station includes a drive subsystem that controls speed and/or steering based on wireless communications.

8 Claims, 45 Drawing Sheets

Related U.S. Application Data on Nov. 30, 2021, provisional application No. 63/274,178, filed on Nov. 1, 2021, provisional application No. 63/261,113, filed on Sep. 13, 2021.

(51) Int. Cl.

| | | |
|---|---|---|
| *G05D 1/02* | (2020.01) | |
| *B62D 61/12* | (2006.01) | |
| *B60L 53/16* | (2019.01) | |
| *B60L 15/20* | (2006.01) | |
| *H02J 7/35* | (2006.01) | |
| *H02J 50/00* | (2016.01) | |

(56) References Cited

U.S. PATENT DOCUMENTS

| | | | |
|---|---|---|---|
| 8,564,454 B2 | 10/2013 | Oizumi | |
| 9,157,418 B2 * | 10/2015 | Petersen | H02S 20/30 |
| 9,597,970 B2 | 3/2017 | DeBoer, III | |
| 9,779,365 B2 | 10/2017 | DeBoer, III | |
| 10,023,252 B1 * | 7/2018 | Bjone | B62D 61/12 |
| 10,183,563 B2 | 1/2019 | Rayner | |
| 10,262,536 B2 | 4/2019 | Bezak | |
| 10,391,873 B2 | 8/2019 | Köhnke | |
| 10,562,405 B2 | 2/2020 | Penney | |
| 10,727,778 B2 * | 7/2020 | Carrington | H02S 10/40 |
| 10,875,420 B2 | 12/2020 | Grimm | |
| 10,906,420 B2 | 2/2021 | Seo | |
| 11,108,354 B2 * | 8/2021 | Carrington | H02S 30/20 |
| 11,117,482 B2 | 9/2021 | Mercer | |
| 11,498,445 B1 * | 11/2022 | Gurin | B60L 53/54 |
| 2001/0032032 A1 * | 10/2001 | Matsumoto | B60P 1/6445 |
| | | | 700/213 |
| 2011/0146751 A1 * | 6/2011 | McGuire | F03D 9/007 |
| | | | 136/245 |
| 2013/0020993 A1 | 1/2013 | Taddeo et al. | |
| 2014/0285139 A1 | 9/2014 | Ahn et al. | |
| 2016/0121735 A1 * | 5/2016 | Sugano | H02J 7/342 |
| | | | 320/109 |
| 2016/0134140 A1 | 5/2016 | Tittle et al. | |
| 2017/0174092 A1 * | 6/2017 | Köhnke | H02J 5/00 |
| 2018/0194267 A1 * | 7/2018 | Helou, Jr. | B65D 88/022 |
| 2018/0264955 A1 * | 9/2018 | Gupta | G06Q 30/0283 |
| 2019/0064809 A1 * | 2/2019 | Salter | B60W 30/18009 |
| 2019/0202306 A1 * | 7/2019 | Gurin | B60L 53/64 |
| 2019/0236741 A1 * | 8/2019 | Bowman | G05D 1/0287 |
| 2019/0275907 A1 | 9/2019 | Lee | |
| 2019/0326980 A1 * | 10/2019 | Waldhauer, Jr. | H04B 7/18517 |
| 2019/0337406 A1 * | 11/2019 | Mingenbach | H02J 1/102 |
| 2019/0381908 A1 | 12/2019 | Joo | |
| 2020/0361329 A1 | 11/2020 | Schütz et al. | |
| 2020/0384873 A1 | 12/2020 | Macaluso | |
| 2020/0398690 A1 * | 12/2020 | Lee | B60L 53/51 |
| 2021/0138921 A1 | 5/2021 | Fox | |
| 2021/0155108 A1 | 5/2021 | Martin | |
| 2021/0182919 A1 | 6/2021 | Wyckoff | |
| 2021/0237595 A1 | 8/2021 | Jung | |
| 2021/0323429 A1 * | 10/2021 | Fata | H02J 50/27 |
| 2022/0048195 A1 * | 2/2022 | Rastegar | B25J 9/0084 |
| 2022/0084340 A1 * | 3/2022 | Hall | B60R 25/24 |

\* cited by examiner

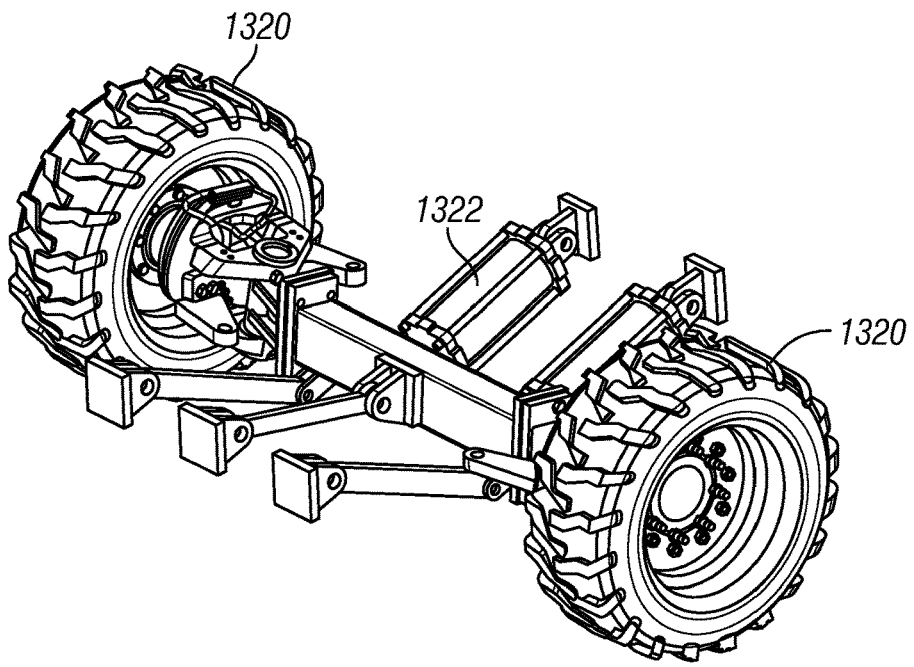
FIG. 54
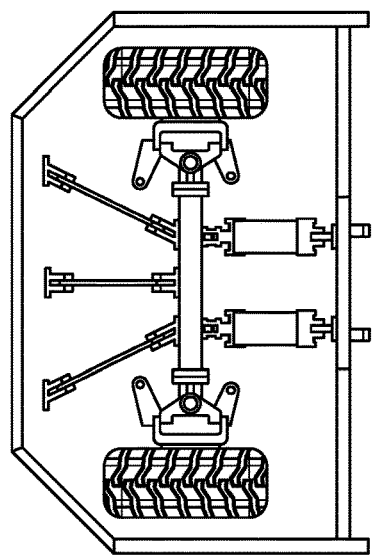
FIG. 55
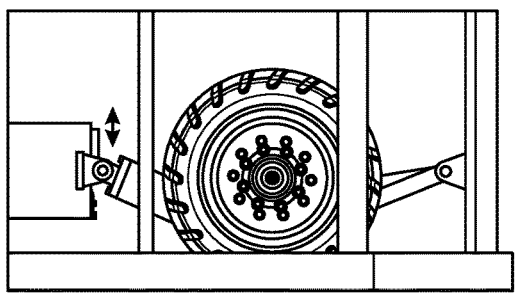 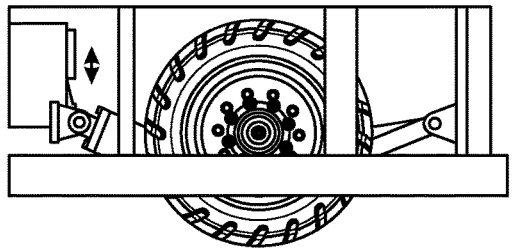
FIG. 56  FIG. 57

MOBILE EV CHARGING STATION

RELATED APPLICATIONS

This application claims the benefit of U.S. Provisional Application No. 63/307,664 for a Mobile EV Charging Station filed Feb. 8, 2022, U.S. Provisional Application No. 63/284,122 for a Mobile EV Charging Station filed Nov. 30, 2021, U.S. Provisional Application No. 63/274,178 for a Mobile EV Charging Station filed Nov. 1, 2021, and U.S. Provisional Application No. 63/261,113 for a Mobile EV Charging Station filed Sep. 13, 2021. Each of these applications are hereby incorporated by reference in their entireties.

TECHNICAL FIELD

This disclosure relates generally to charging stations for electronic vehicles (EVs); in particular, this relates to a charging station that is portable to be readily moved to a desired charging location.

BACKGROUND

Internal combustion engine (ICE) vehicles have fuel tanks that must be periodically refilled. There is an existing infrastructure with numerous fuel stations that allow users with ICE vehicles to refill their tanks. The fuel station infrastructure is mature with plentiful stations for refueling.

With electronic vehicles (EVs), their batteries must be periodically recharged. The current EV charging infrastructure is one of the biggest challenges facing EV vehicle adoption. Unlike the fuel station infrastructure, there is a poor EV charging infrastructure with a limited number of chargers available. There are many obstacles to improving the EV charging infrastructure, such as a lengthy approval process, long lead times for installation, large upfront investment and long-term commitment. This also makes installation of chargers in remote locations problematic.

Although the existing fuel station infrastructure is generally acceptable for its purpose, there is a need for improving the EV charging infrastructure in a way that overcomes one or more of these obstacles.

SUMMARY

According to one aspect, this disclosure provides a mobile electronic vehicle (EV) charging station with a charging station housing having an interior compartment. The charging station has one or more charging bays arranged on the charging station housing. The one or more charging bays include one or more charging connectors each configured to connect to an EV vehicle. The charging station includes a plurality of batteries within the interior compartment of the charging station housing. There is a power delivery subsystem to control supply of electrical power from one or more of the plurality of batteries to the one or more charging connectors. Also, the charging station has a drive system to drive the charging station housing from a first position to a second position.

According to a further aspect, this disclosure provides a method of transporting an electronic vehicle (EV) charging station. The method includes the step of providing a self-propelled EV charging station that is configured to be wirelessly driven between a first position and a second position, wherein the EV charging station includes a power delivery subsystem capable of supplying Level 2 and/or Level 3 charging to one or more electronic vehicles (EVs). The self-propelled EV charging station is loaded into a cargo area of a transport vehicle by driving, using a wireless controller, the self-propelled EV charging station from an ingress location up a ramp of the transport vehicle to the cargo area. Additionally, the method includes unloading the self-propelled EV charging station from the cargo area of the transport vehicle by driving, using the wireless controller, the self-propelled EV charging station down the ramp to an egress location.

According to another aspect, this disclosure provides a mobile electronic vehicle (EV) charging station with a cuboid-shaped charging station housing having an interior compartment. The charging station has one or more charging connectors to electrically connect with an EV vehicle. There is a plurality of batteries within the interior compartment of the cuboid-shaped charging station housing. The charging station has a communication subsystem and a power delivery subsystem to control supply of electrical power from one or more of the plurality of batteries to the one or more charging connectors. There is a drive system with a plurality of wheels and one or more motors to drive one or more of the plurality of wheels, wherein the drive system is configured to control speed and/or steering of the plurality of wheels based on wireless communications received from the communication subsystem.

According to yet another aspect, this disclosure provides an electronic vehicle (EV) charging station that includes a charging station housing with an interior compartment; in this embodiment, the charging station housing comprises a shipping container. The charging station includes one or more charging connectors extending through openings in the shipping container to electrically connect with an EV vehicle. The charging station includes a plurality of batteries within the interior compartment of the charging station housing. Additionally, there is a power delivery subsystem to control supply of electrical power from one or more of the plurality of batteries to the one or more charging connectors.

According to a further aspect, this disclosure provides an electronic vehicle (EV) charging station with a cuboid-shaped charging station housing with an interior compartment, wherein the cuboid-shaped charging station housing includes a roof. The charging station includes one or more charging bays with charging connectors to electrically connect with an EV vehicle. There is a plurality of batteries within the interior compartment of the cuboid-shaped charging station housing. The charging station includes one or more solar panels are mounted to the roof of the cuboid-shaped charging station housing, wherein the one or more solar panels are electrically connected with the plurality of batteries to recharge the plurality of batteries based on harvesting solar energy. Additionally, the charging station includes a power delivery subsystem to control supply of electrical power from one or more of the plurality of batteries to the one or more charging connectors.

According to yet another aspect, this disclosure provides an electronic vehicle (EV) charging station with a cuboid-shaped charging station housing with an interior compartment, wherein the cuboid-shaped charging station housing includes a roof. The charging station includes one or more charging bays with charging connectors to electrically connect with an EV vehicle. There is a plurality of batteries within the interior compartment of the cuboid-shaped charging station housing. The charging station includes one or more wind turbines are mounted to the roof of the cuboid-shaped charging station housing, wherein the one or more wind turbines are electrically connected with the plurality of batteries to recharge the plurality of batteries based on harvesting wind energy. Additionally, the charging station includes a power delivery subsystem to control supply of electrical power from one or more of the plurality of batteries to the one or more charging connectors.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

FIG. 54 is a perspective view showing an example assembly for moving the wheel between an extended and retracted position according to an embodiment of this disclosure;

FIG. 55 is a top view of the example assembly for moving the wheel between an extended and retracted position according to an embodiment of this disclosure;

FIG. 56 is a side view of the example assembly shown in FIG. 54 with the wheel moved to a retracted position;

FIG. 57 is a side view of the example assembly shown in FIG. 56 with the wheel moved to an extended position;

DETAILED DESCRIPTION OF THE DRAWINGS

Figure 1:
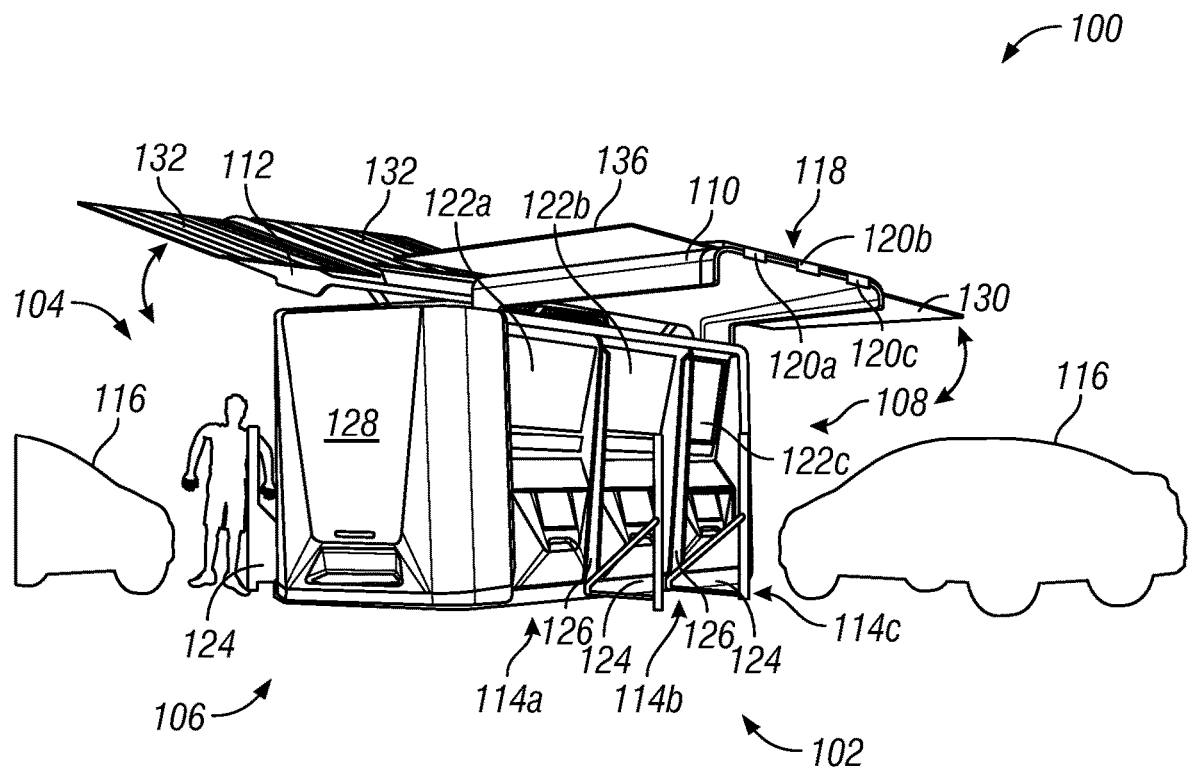
FIG. 1 is a perspective view of an example EV charging station in an open position with side doors extended to provide access to charging bays according to an embodiment of this disclosure.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural features may be shown in specific arrangements. However, it should be appreciated that such specific arrangements may not be required. Rather, in some embodiments, such features may be arranged in a different manner than shown in the illustrative figures. Additionally, the inclusion of a structural in a particular figure is not meant to imply that such feature is required in all embodiments and, in some embodiments, may not be included or may be combined with other features.

This disclosure relates generally to a mobile EV charging station 100 with one or more bays for charging EV vehicles. As explained herein, the EV charging station 100 is portable for simple, easy deployment. Typically, the EV charging station 100 would provide Level 2 and/or Level 3 charging. For example, in at least one embodiment, the EV charging station 100 supports 19 kW (Level 2 charging). In some embodiments, the EV charging station 100 supports 50 kW to 350 kW fast charging (Level 3).

The EV charging station 100 includes batteries that supply power to charge EV vehicles. The number of batteries and configuration may differ depending on a number of parameters, such as number of charging bays, desired size of the EV charging station 100, time period for deployment, etc. For example, the EV charging station 100 could be embodied in a variety of lengths, such as 10 foot, 20 foot, 30 foot, etc.

An embodiment of the EV charging station 100 may include any one or more, and any combination of, the technical features described below. For example, some embodiments of the EV charging station 100 could bridge the gap of 6-24-months for obtaining charger permits and install lead-time. This could limit the required investment for short-term deployments, such as for EVs of Amazon™ delivery service partners (DSPs), with an ability to relocate and have a lower upfront cost. Additionally, the EV charging station 100 could be used to convert gas stations to EV charging in days.

Embodiments of the EV charging station 100 overcome technical obstacles to quickly deploying an EV charging station. Since the EV charging station 100 is portable, there is speed to implementation, in which the EV charging station 100 can be deployed in hours vs months or years for obtaining permits and installation of traditional EV charging stations.

The EV charging station 100 could provide mobile power charging to support the private/government sectors during natural disasters. FEMA, National Guard, Military, etc. For example, depending on the configuration, the EV charging station 100 could support power companies in grid repairs, cell towers power, emergency, temporary shelters, etc. Likewise, depending on the configuration, the EV charging station 100 could support remote locations with limited power infrastructure to support charging stations. For example, the EV charging station 100 could support areas with limited infrastructure to charge multiple vehicles at the same time.

In some embodiments, the EV charging station 100 provides flexibility to charge on-site or swap batteries (or the EV charging station 100 itself swapped) at night. There is flexibility to charge batteries of the EV charging station 100 in the off-peak hours, which avoids peak charging penalties. In some cases, the EV charging station 100 could be configured to support special events requiring temporary charging. This limits the charging risk during power blackout or power outage.

Figure 3:
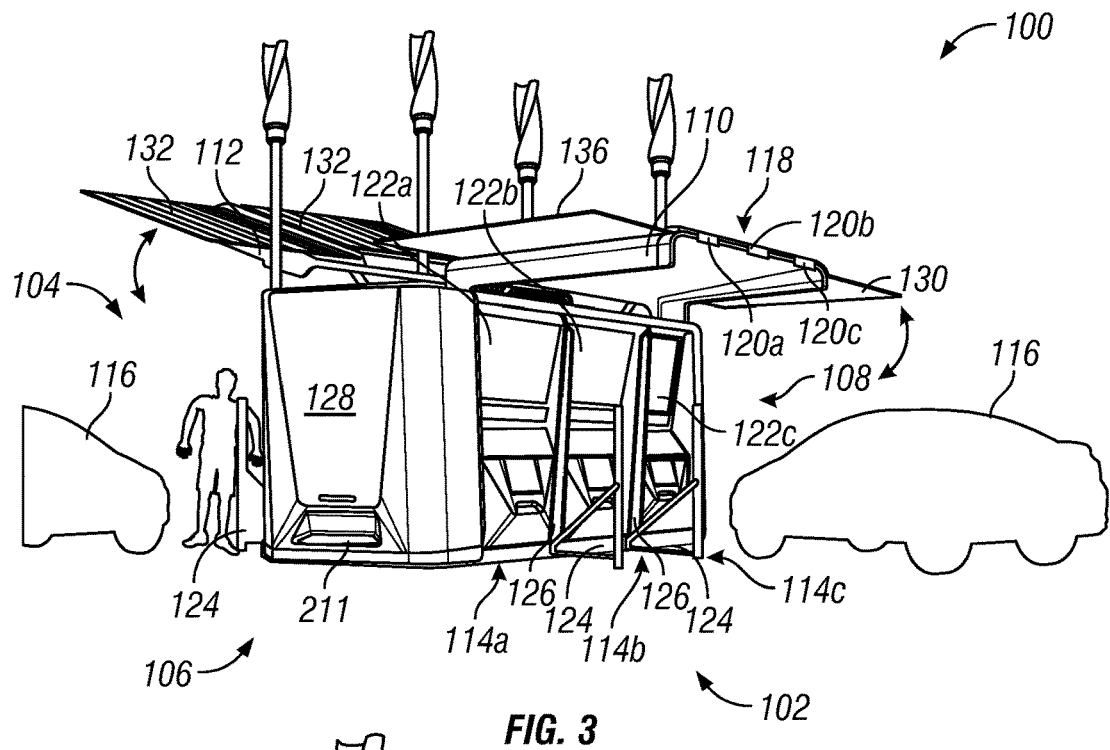
FIG. 3 is a perspective view of the example EV charging station shown in FIG. 1 with various wind turbines in an extended position according to an embodiment of this disclosure.

FIG. 1 illustrates an example the EV charging station 100 with a first side 102, a second side 104, a first end 106, and a second end 108. As shown, the EV charging station 100 includes a first side wall 110 on the first side 102 and a second side wall 112 on the second side 104. The side walls 110, 112 are movable between a closed position (FIGS. 4-6) and an open position (FIGS. 1 and 3).

In the open position, the side walls 110, 112 extend outwardly to provide access to the charging bays 114a, 114b, 114c for charging a vehicle 116 and provide shelter from inclement weather, such as rain, snow, sleet, etc. Although three charging bays 114a, 114b, 114c are shown on each side for purposes of example, more or less charging bays could be provided depending on the desired configuration. In some embodiments, each charging bay 114a, 114b, 114c includes at least one charging connector for connecting to EV vehicles, such as by way of example, a J1772 plug, a Tesla-style plug, a CHAeMO plug, a SAE Combo (CCS) plug, etc., to supply power from the EV charging station 100.

In the closed position, the side walls 110, 112 prevent access to the charging bays 114a, 114b, 114c. For example, the EV charging station 100 may be moved to the closed position for transport.

In the embodiment shown, the side walls 110, 112 are hinged to a top portion on the side walls of the EV charging station 100 to pivot between the open and closed positions about a generally horizontal axis. However, the side walls 110, 112 could be movable between the open/closed positions in other manners. In some cases, the side walls 110, 112 are manually movable and/or automatically movable. Depending on the circumstances, the EV charging station 100 could include wireless communication capabilities so the side walls 110, 112 could be moved automatically between open and closed positions using a remote computing device.

As shown, the side walls 110, 112 include a proximal end hinged to the EV charging station 100 and a distal end with status indicators 118 along an edge. In the embodiment shown, there are separate status indicators 120a, 120b, 120c corresponding to each charging bay 114a, 114b, 114c. For example, the status indicators 120a, 120b, 120c could be axially aligned along an axis transverse from the EV charging station 100 with respective charging bays 114a, 114b, 114c. As shown, the status indicators 120a, 120b, 120c are lights that are switchable to different colors in which colors indicate different statuses. For example, a status indicator light that is red could indicate the corresponding bay is out of order or under service or in use. By way of another example, a status indicator light that is green could indicate the corresponding bay is available and in good working order. Of course, numerous color indicators could be used. Other types of indicators, such as text, symbols, etc. could also be used (or alternatively used) instead of lights. In the embodiment shown, the high position of the status indicators 120a, 120b, 120c above the respective bays 114a, 114b, 114c allows good visibility during daytime and at night when vehicles approach the EV charging station 100.

In the embodiment shown, each bay 114a, 114b, 114c includes a monitor 122a, 122b, 122c from which users can make selections and control charging. Depending on the circumstances, the user may be able to make entertainment choices from the monitors 122a, 122b, 122c, such as Netflix™, videogames, etc. Likewise, the monitors 122a, 122b, 122c could be used to allow users to make vending choices in embodiments in which the EV charging station 100 offers vending products, such as food or beverages. Additionally, the monitors 122a, 122b, 122c could be used to supply instructions for charging and/or marketing/advertising materials during charging.

As shown, the EV charging station 100 includes integrated vehicles barriers 124 that reduce the risk a vehicle will accidentally run into the EV charging station 100. In the embodiment shown, the vehicle barriers 124 are movable between an extended position (see FIGS. 1 and 3) and a retracted position (FIG. 4) within cavities 126 that allows the side walls 110, 112 to move to the closed position.

In the embodiment shown, there is a door 128 on the first end 106 that is movable to an open position (see FIG. 4) that allows access to the interior compartment, such as to inspect and/or service components of the EV charging station 100. In some embodiments, there is a door 130 (see also FIG. 6) on the second end 108 to allow access to accessories, such as a table and/or seating, and shelter from inclement weather.

As shown, there are one or more solar panels 132 to harvest solar energy, which could be used to recharge batteries of the EV charging station 100. Depending on the circumstances, the solar panels 132 could be retracted into the interior compartment of the EV charging station 100 when not in use. Other energy harvesting devices, such as wind turbines 134 (see FIGS. 3-4), or other harvesting devices could be used to recharge the batteries. As shown, there is a weather station 136 integrated with the EV charging station 100, which could include weather-related sensors for use in adjusting solar panels 132, wind turbines 134 and/or other parameters. As shown, the weather station 136 may be pivotally mounted with the EV charging station 100 (see FIG. 6).

Figure 2:
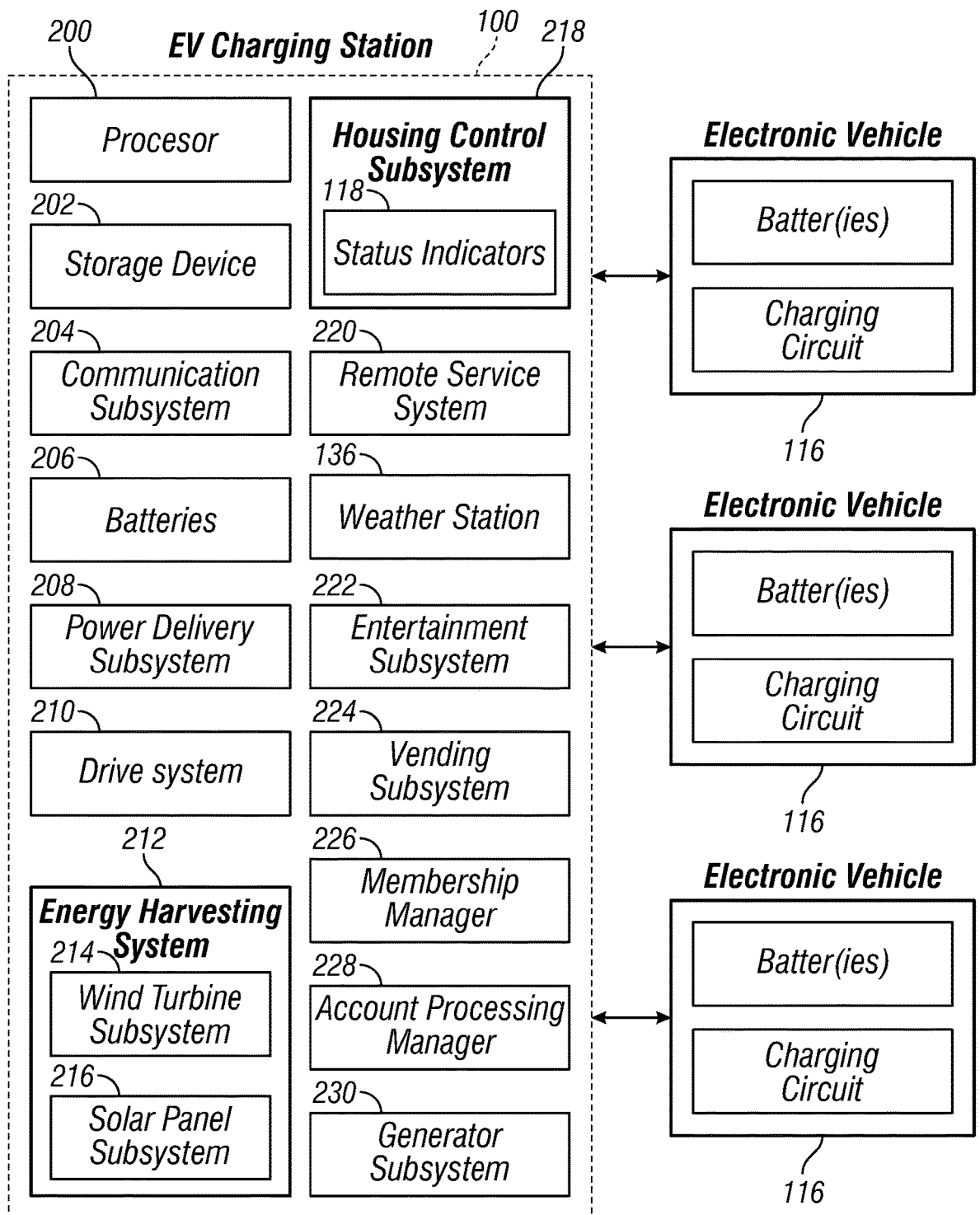
FIG. 2 is a simplified block diagram showing various components and environments of an EV charging station according to an embodiment of this disclosure.

Referring to FIG. 2, in an illustrative embodiment, the EV charging station 100 may be embodied with components that facilitate one or more of the features described herein; in some embodiments, the EV charging station 100 establishes an environment during operation to control one or more components of the EV charging station 100.

In the example shown, the EV charging station 100 includes a processor 200, which could be embodied as any type of processor capable of performing the functions described herein. The processor 200 may be embodied as a single or multi-core processor(s), digital signal processor, microcontroller, or other processor or processing/controlling circuit.

As shown, the EV charging station 100 includes a storage device 202, which may be embodied as any type of volatile or non-volatile memory or data storage capable of performing the functions described herein. In operation, the storage device 202 may store various data and software used during operation of the EV charging station 100 such as operating systems, applications, programs, libraries, and drivers. The storage device 202 is communicatively coupled to the processor 200 via an I/O subsystem, which may be embodied as circuitry and/or components to facilitate input/output operations with the processor 200, the storage device 202, and other components of the EV charging station 100. For example, the I/O subsystem may be embodied as, or otherwise include, memory controller hubs, input/output control hubs, sensor hubs, firmware devices, communication links (i.e., point-to-point links, bus links, wires, cables, light guides, printed circuit board traces, etc.) and/or other components and subsystems to facilitate the input/output operations. In some embodiments, the I/O subsystem may form a portion of a system-on-a-chip (SoC) and be incorporated, along with the processor 200, the storage device 202, and other components of the EV charging station 100, on a single integrated circuit chip. Similarly, the storage device 202 may be embodied as any type of device or devices configured for short-term or long-term storage of data such as, for example, memory devices and circuits, memory cards, hard disk drives, solid-state drives, non-volatile flash memory, or other data storage devices.

The EV charging station 100 may also include a communication subsystem 204, which may be embodied as any communication circuit, device, or collection thereof, capable of enabling communications between the EV charging station 100 and other remote devices over a network. For example, the communication subsystem 204 may be embodied as or otherwise include a network interface controller (NIC) or other network controller for sending and/or receiving network data with remote devices. The NIC may be embodied as any network interface card, network adapter, host fabric interface, network coprocessor, or other component that connects the EV charging station 100 to the network. The communication subsystem 204 may be configured to use any one or more communication technology (e.g., wired or wireless communications) and associated protocols (e.g., Ethernet, InfiniBand®, Bluetooth®, Wi-Fi®, WiMAX, 3G, 4G LTE, 5G, etc.) to effect such communication. In some embodiments, the communication subsystem 204 and/or the NIC may form a portion of a SoC and be incorporated along with the processor 200 and other components of the EV charging station 100 on a single integrated circuit chip.

Figure 4:
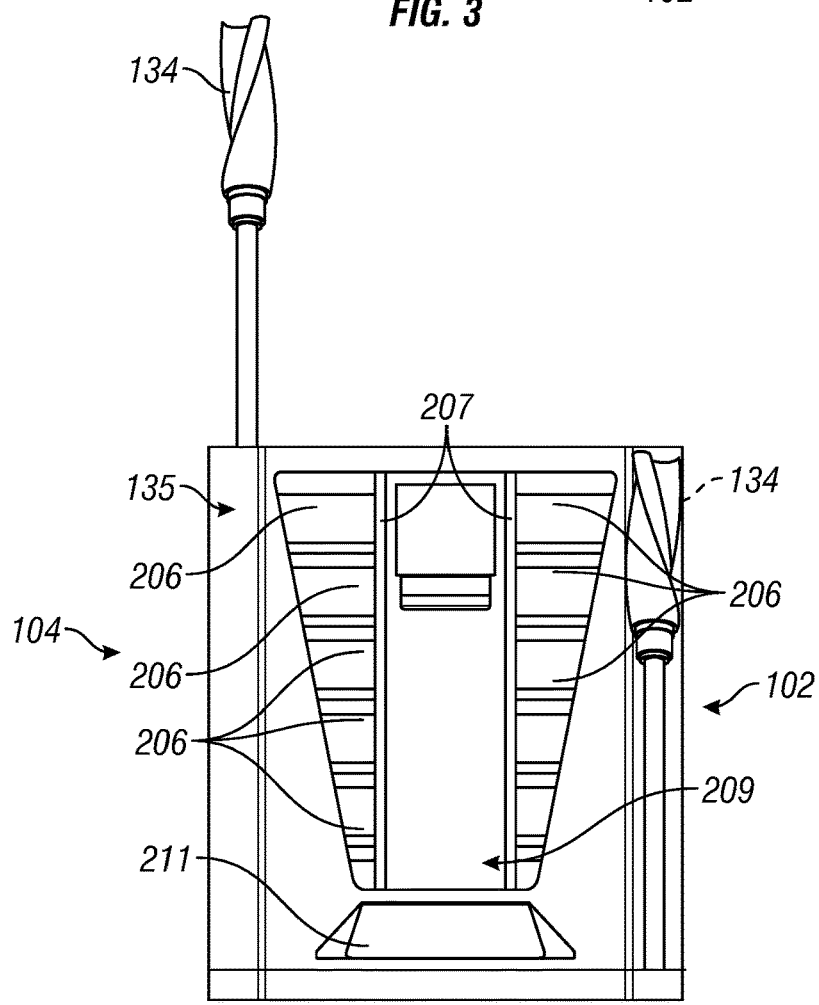
FIG. 4 is an end perspective view of the example EV charging station shown in FIG. 1 with wind turbines in both an extended and retracted positions and an end door open to expose the interior compartment.

The EV charging station 100 includes a plurality of batteries 206. The batteries 206 provide a power source from which EV vehicles may recharge. Typically, the batteries 206 would be configured to provide Level 2 and/or Level 3 charging. In some embodiments, such as shown in FIG. 4, the batteries 206 are arranged on the shelves of racks 207 adjacent the sides 102, 104. The size of the EV charging station 100 may determine the number of batteries, length of racks, and number of shelves. With this configuration, the racks 207 are spaced apart to provide a walkway 209 therebetween. This allows access to the batteries 206 (and other components within the interior compartment) for inspection and service/maintenance. In the embodiment shown in FIG. 4, there is a step 211 integral with the housing of the EV charging station 100 to step up into the walkway 209 when the door 128 is open.

Referring again to FIG. 1, in some embodiments, the EV charging station 100 may include a power delivery subsystem 108, which controls power supplied by the batteries 206 to the bays 114a, 114b, 114c for charging. For example, the power delivery subsystem 108 may be configured to supply power to the appropriate bay responsive to selection(s) by users. In this embodiment with 6 bays, for example, the power delivery subsystem 108 could be configured to supply power to Bay 1 based on a charging initiation sequence at Bay 1 by a user. Likewise, the power delivery subsystem 108 could be configured to supply an amount of power based on a power delivery curve appropriate to the EV vehicle being charged.

Figure 5:
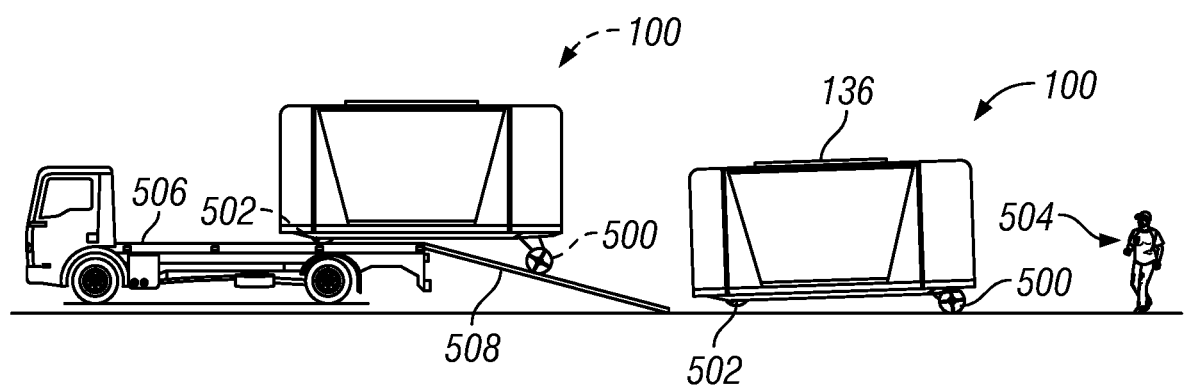
FIG. 5 is a side progressive view of an example EV charging station being self-driven from a loaded position on a truck to an unloaded position.
Figure 6:
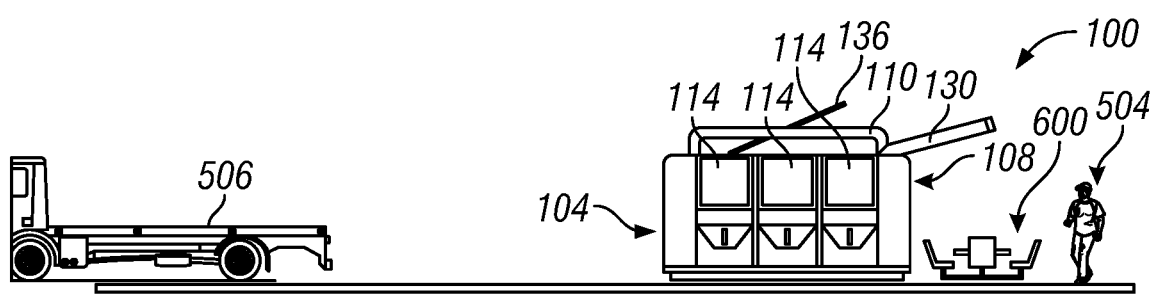
FIG. 6 is a side view of an example EV charging station in an open position with an end door open to expose an accessory, which in this example is a seating assembly.
Figure 7:
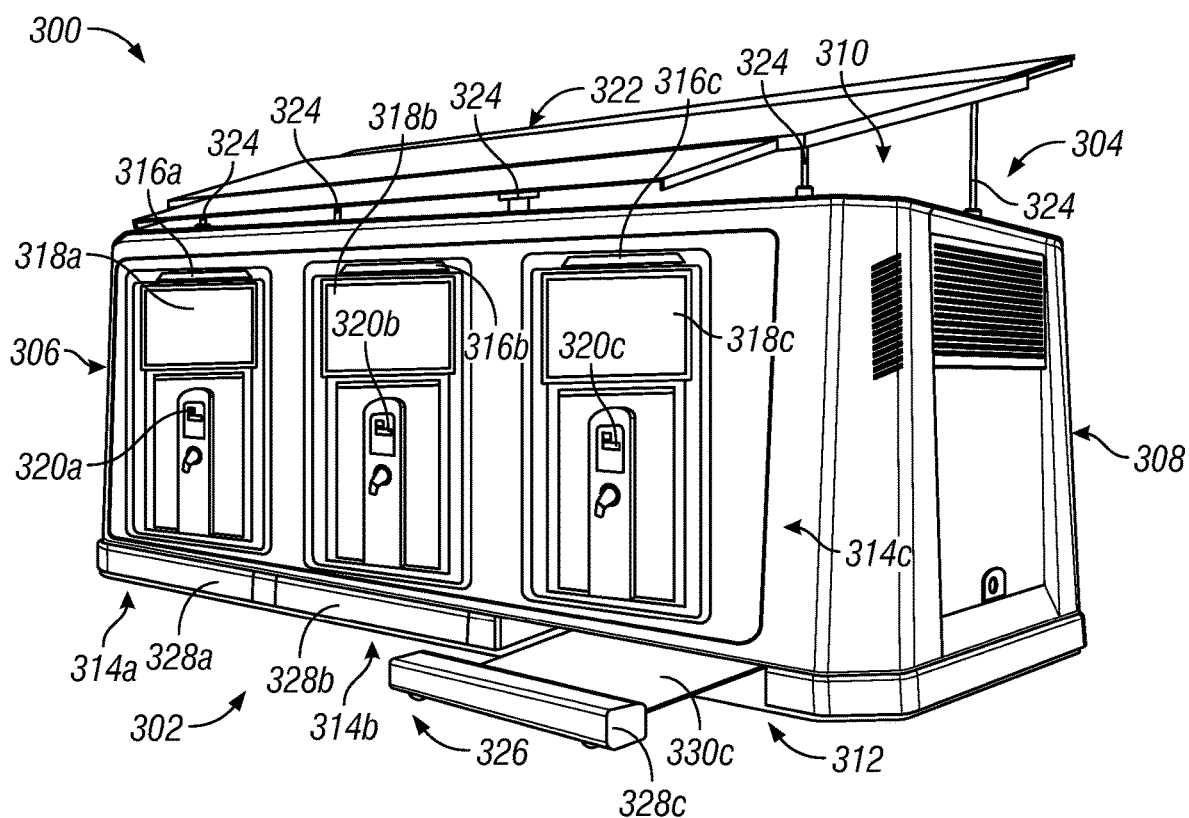
FIG. 7 is a perspective view of an example EV charging station according to another embodiment of this disclosure.
Figure 8:
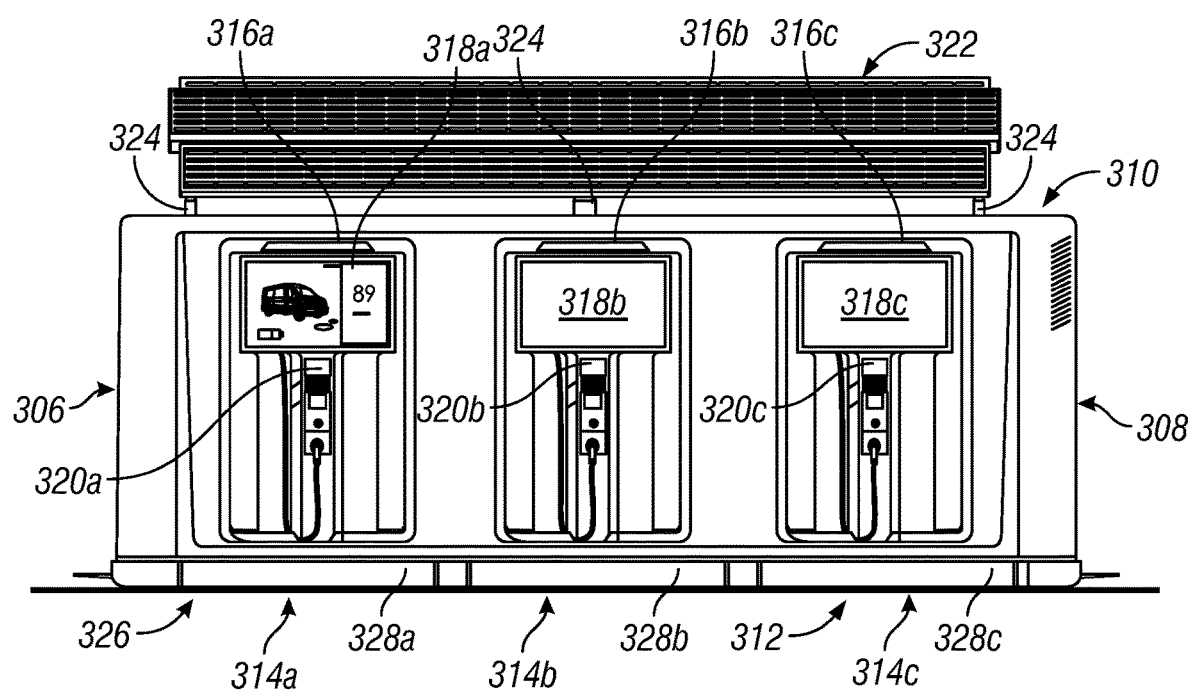
FIG. 8 is a front view of the example EV charging station shown in FIG. 7.

In some embodiments, the EV charging station 100 is self-driving with a drive system 210. For example, the EV charging station 100 may include one or more motors for driving one or more wheels, which allows the EV charging station 100 to be driven for unloading/loading from/to a truck, moved from one location to another, etc. FIG. 5 shows an embodiment in which the EV charging station 100 includes a drive wheel 500 and a support wheel 502 that allows the EV charging station 100 be self-propelled. In some cases, both wheels 500, 502 could be drive wheels. As shown, the EV charging station 100 is controlled with a remote control device 504, which could include a joystick, or other controller, which could be used to control speed and/or steering of the EV charging station 100. In the example shown, there is a truck 506 onto which the EV charging station 100 had been loaded, and is unloaded by driving the EV charging station 100 off the truck 506 down a ramp 508 to an unloaded position using the remote control device 504. This allows the EV charging station 100 to be loaded or unloaded to/from the truck 506 by driving the EV charging station 100 using the remote control device 504. As shown in FIG. 6, in some embodiments, upon driving the EV charging station 100 to the desired location, the wheels 500, 502 may be retracted and the truck 506 can leave. As shown, the door 130 can be opened to reveal one or more accessories 600, such as tables, chairs, etc. In the embodiment shown, the accessories 600 are sheltered by the door 130.

As discussed herein, the EV charging station 100 may include an energy harvesting system 212, which may include a wind turbine subsystem 214 and/or a solar panel subsystem 216. For example, the wind turbine subsystem 214 may be configured to harvest energy from the wind turbines 134 for recharging the batteries 206. Depending on the circumstances, the wind turbines 134 may be configured to move between an extended position and a retracted position. For example, FIG. 3 illustrates an example in which multiple wind turbines 134 are extended above the EV charging station 100 for energy harvesting. As shown, the wind turbines 134 are embodied as generally cylindrical devices that extend vertically from the corners of the EV charging station 100. In the example shown in FIG. 4, there is a storage compartment 135 in each corner of the EV charging station 100 that are dimensioned to receive the wind turbine 134 in the retracted position; of course, the storage compartment 135 could be located in other positions. As shown in FIG. 4, there is a wind turbine 134 in both the extended position and the retracted position within the storage compartment 135. The solar panel subsystem 216 may be configured to harvest energy from the solar panels 132 for recharging the batteries 206. Although the solar panels 132 and wind turbines 134 are examples of energy harvesting devices that could be used for recharging batteries, these are merely used for purposes of example, and other energy harvesting devices could be used to recharge the batteries 206.

The EV charging station 100 may include a housing control subsystem 218, which could be configured to control various aspects of the EV charging station 100's housing. For example, as discussed herein, the EV charging station 100 may include one or more status indicators 118 that could be controlled by the housing control subsystem 218. Other functions, such as moving the doors, 110, 112, 128, 130 between extended and retracted positions, could be controlled by the housing control subsystem 218. Likewise, the housing control subsystem 218 could automatically raise or lower the wind turbines 134 depending on wind conditions measured by the weather station 136 or dynamically adjust the positioning of solar panels 132 based on weather conditions.

In some embodiments, the EV charging station 100 may include a remote service system 220 for connecting with remote devices via the communication subsystem 204. For example, certain features of the EV charging station 100 may be accessed/controlled remotely. In some cases, the side walls 110, 112 could potentially be closed remotely based on weather/location or other parameters. Likewise, customer service for the EV charging station 100 could be provided remotely, such as through a videoconferencing feature with cameras mounted to the EV charging station 100.

The EV charging station 100 may include an entertainment subsystem 222 and/or a vending substation 224. As discussed herein, the entertainment subsystem 222 may allow users to watch TV shows or movies, such as via antenna and/or streaming, or video games or other entertainment options using the monitors 122. The vending substation 224 could be used to control vended products, such as food, beverages, etc. For example, the users may want to purchase a vended product while waiting on their vehicle to charge.

In the embodiment shown, the EV charging station 100 may include a membership manager 226. In some cases, users can have a membership/account with the EV charging stations 100. This would allow the users to charge their account, which could be linked to credit cards or other funds. The charges for energy usage and/or others purchases (e.g., entertainment/vending) could be charged to the funds linked to the user's account by the account processing manager 228.

In addition to (or alternatively from) the energy harvesting devices used to recharge the batteries 206, the EV charging station 100 may include a generator subsystem 230. For example, the EV charging station 100 may be equipped with one or more attached or detached generators powered by different fuels, such as gas, diesel/CNG, hydrogen, biofuel, etc.

Referring now to FIGS. 7-20, there is shown an example EV charging station 300 according to another embodiment of this disclosure. In this example, the EV charging station 300 has a first side wall 302, a second side wall 304, a first end wall 306, a second end wall 308, a top wall 310, and a bottom wall 312. One or both of the side walls 302, 304 include charging bays 314*a*, 314*b*, 314*c* for charging a vehicle 315 (FIG. 9) similar to how the charging bays 114*a*, 114*b*, 114*c* charge a vehicle 315. Although three charging bays 314*a*, 314*b*, 314*c* are shown for purposes of example, more or less charging bays could be provided depending on the desired configuration. As shown, each charging bay 314*a*, 314*b*, 314*c* includes at least one charging connector for connecting to EV vehicles, such as by way of example, a J1772 plug, a Tesla-style plug, a CHAeMO plug, a SAE Combo (CCS) plug, etc., to supply power from the EV charging station 300.

In the embodiment shown, the side walls 302, 304 include respective operational status indicators 316*a*, 316*b*, 316*c*, monitors 318*a*, 318*b*, 318*c*, and charging status indicators 320*a*, 320*b*, 320*c*. As shown, the operational status indicators 316*a*, 316*b*, 316*c* are lights that are switchable to different colors in which colors indicate different statuses. For example, a status indicator light that is red could indicate the corresponding bay is out of order or under service or in use. By way of another example, a status indicator light that is green could indicate the corresponding bay is available and in good working order. Of course, numerous color indicators could be used. Other types of indicators, such as text, symbols, etc. could also be used (or alternatively used) instead of lights. The high position of the operational status indicators 316*a*, 316*b*, 316*c* above the respective bays 314*a*, 314*b*, 314*c* allows good visibility during daytime and at night when vehicles approach the EV charging station 300.

The monitors 318*a*, 318*b*, 318*c* may be screens from which users can view status information about charging (e.g., vehicle charging percentage, time until charged, charging rate, etc.) and/or watch entertainment, such as Netflix™, videogames, etc. Depending on the circumstances, the monitors 318*a*, 318*b*, 318*c* may be used to allow users to make vending choices in embodiments in which the EV charging station 300 offers vending products, such as food or beverages. Additionally, the monitors 318*a*, 318*b*, 318*c* may could be used to supply instructions for charging and/or marketing/advertising materials during charging.

In the embodiment shown, the side walls 302, 304 include charging status indicators 320*a*, 320*b*, 320*c*, which are embodied as displays to show a real-time vehicle charging status. Although the vehicle charging status information is shown on the charging status indicators 320a, 320b, 320c for purposes of example, other information, such as payment, connection status, operational status, etc., could be shown on the charging status indicators 320a, 320b, 320c.

As shown, the top wall 310 supports a solar panel assembly 322, which could be part of the energy harvesting system 212. In the embodiment shown, the solar panel assembly 322 is suspended by a plurality of support legs 324, which may be controlled by the energy harvesting system 212 to dynamically move into/out to angle the solar panel assembly 322 in a manner that most efficiently harvests solar energy based on time of day, weather conditions, etc. Likewise, the support legs 324 may be retracted by the energy harvesting system 212 for transport of the charging station 300.

In the embodiment shown, the bottom wall 312 includes a parking barrier assembly 326. As shown, the parking barrier assembly 326 includes a barrier portion 328a, 328b, 328c and an extension portion 330a, 330b, 330c for each bay 314a, 314b, 314c that are independently movable between an extended position to block vehicles from getting close to its associated bay (bay 314c in FIG. 7) and a retracted position within the charging station 300 that does not block vehicles (bays 314a and 314b in FIG. 7). For example, the barrier portion 328a, 328b, 328c could be moved to an extended position to prevent vehicles from inadvertently crashing into charging bays 314a, 314b, 314c and retracted for transport.

Figure 9:
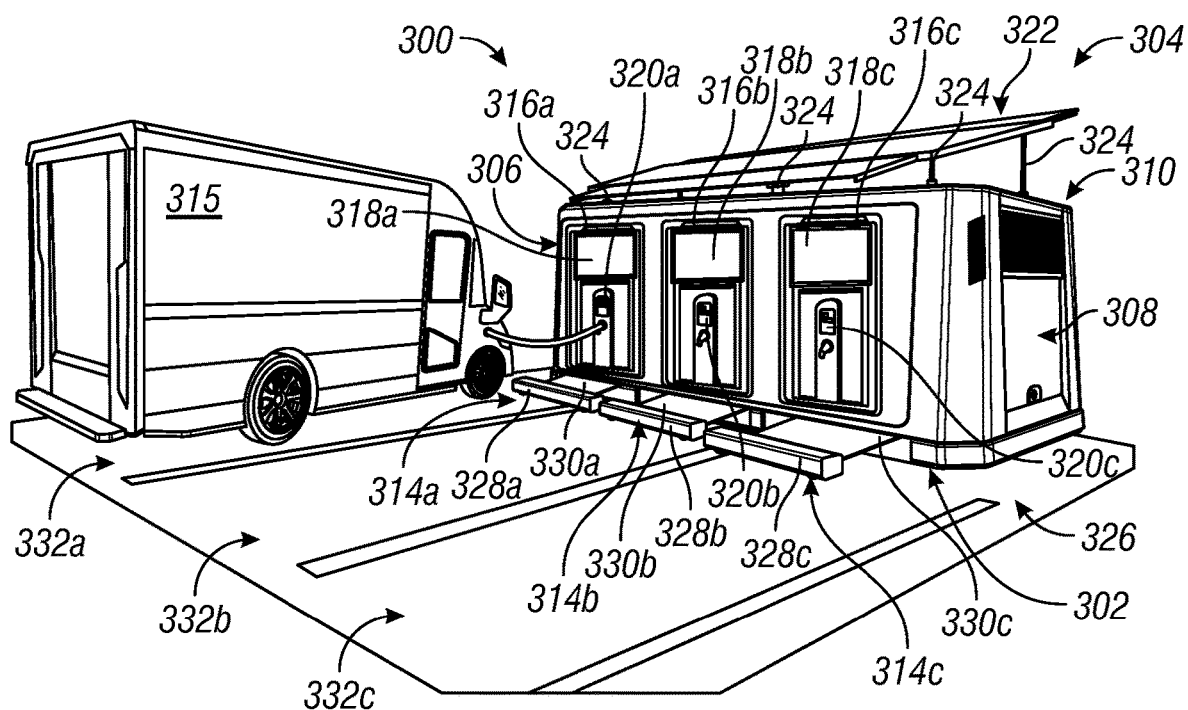
FIG. 9 is a perspective view of the example EV charging station shown in FIG. 7 with the barriers extended and a vehicle plugged in to charge.
Figure 10:
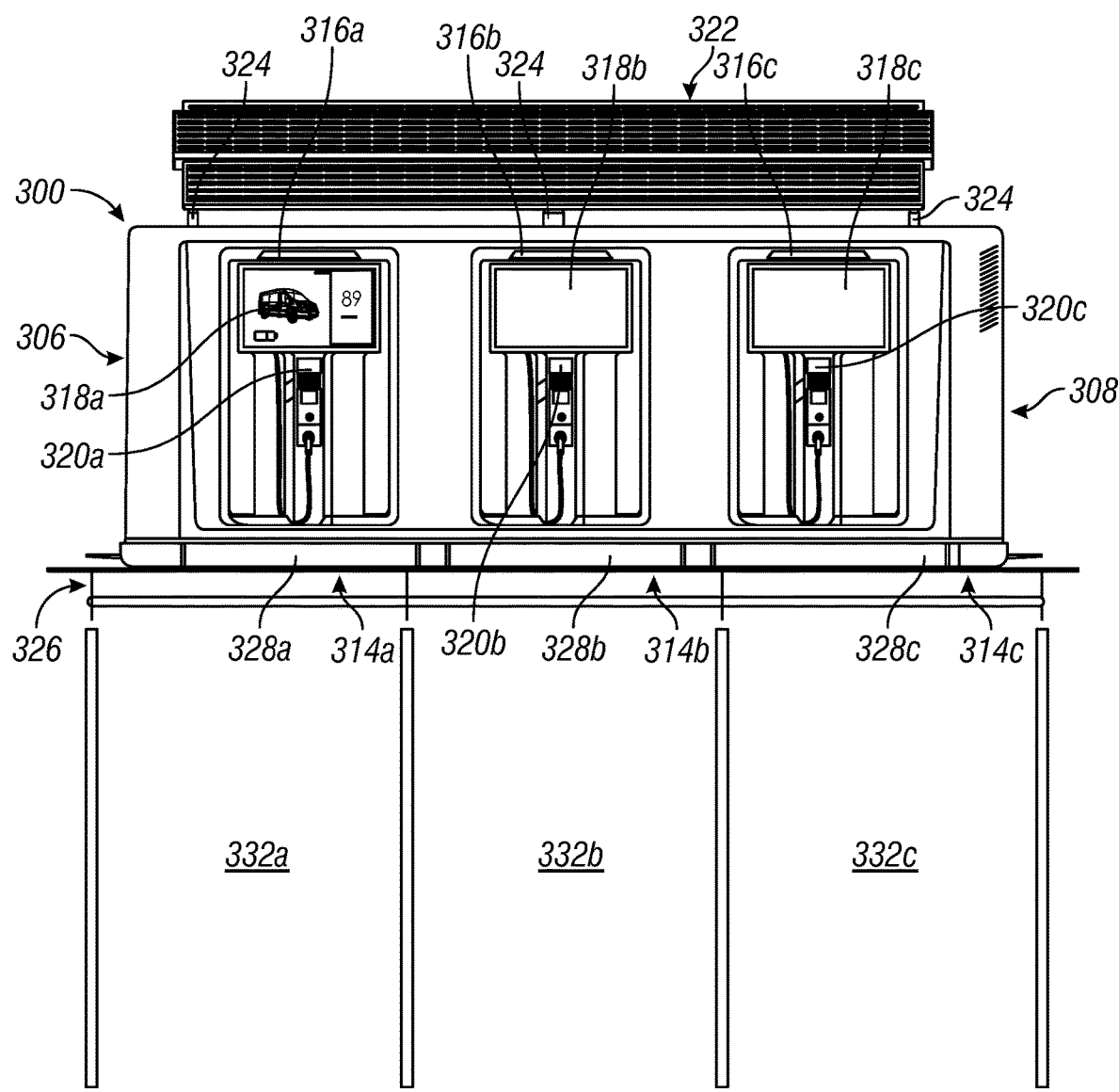
FIG. 10 is a front view of the example EV charging station shown in FIG. 7 with example parking spaces corresponding to each charging bay.
Figure 11:
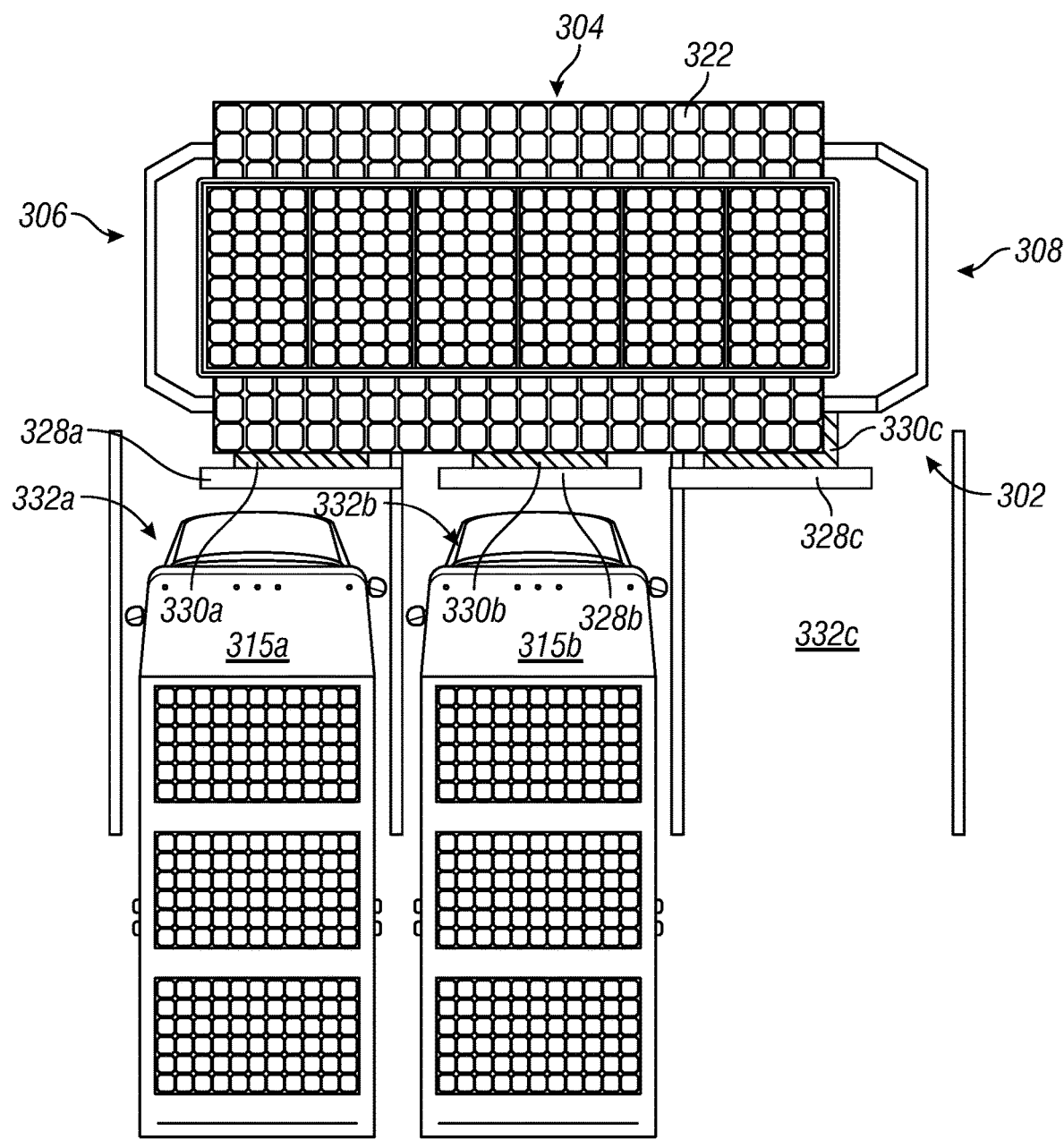
FIG. 11 is a top view of the example EV charging station shown in FIG. 7 with the barriers extended and multiple vehicles corresponding to charging bays.

FIG. 9 illustrates the example charging station 300 with the barrier portions 328a, 328b, 328c in an extended position to prevent vehicles from inadvertently crashing into any charging bay 314a, 314b, 314c. As shown, there is a first parking space 332a aligned with the first charging bay 314a, a second parking space 332b aligned with the second charging bay 314b, and a third parking space 332c aligned with the third charging bay 314c. This allows a vehicle to park in front of each charging bay 314a, 314b, 314c and the barrier portions 328a, 328b, 328c prevent the vehicles from pulling into the parking spaces 332a, 332b, 332c too far and inadvertently hitting one or more of the charging bays 314a, 314b, 314c. As shown, the vehicle 315 has pulled into the first parking space 332a and is plugged into the first charging bay 314a. Although the vehicle 315 is plugged into the first charging bay 314a for purposes of example, the vehicle 315 could be plugged into the second or third charging bays 314b, 314c. Additionally, vehicles could also be pulled into the second and/or third parking spaces 332b, 332c to plug into the second and/or third charging bays 314b, 314c. Depending on the circumstances, barrier portions could be movable between extended/retracted positions from the second side wall 304 if the charging station 300 is configured to provide charging from both sides 302, 304 of the charging station 300. FIG. 10 illustrates the example parking spaces 332a, 332b, 332c aligned with the charging bays 314a, 314b, 314c without any vehicles. FIG. 11 illustrates a top view with a first vehicle 315a parked in the first parking space 332a, and a second vehicle 315b parked in the second parking space 332b, and no vehicle in the third parking space 332c.

Figure 12:
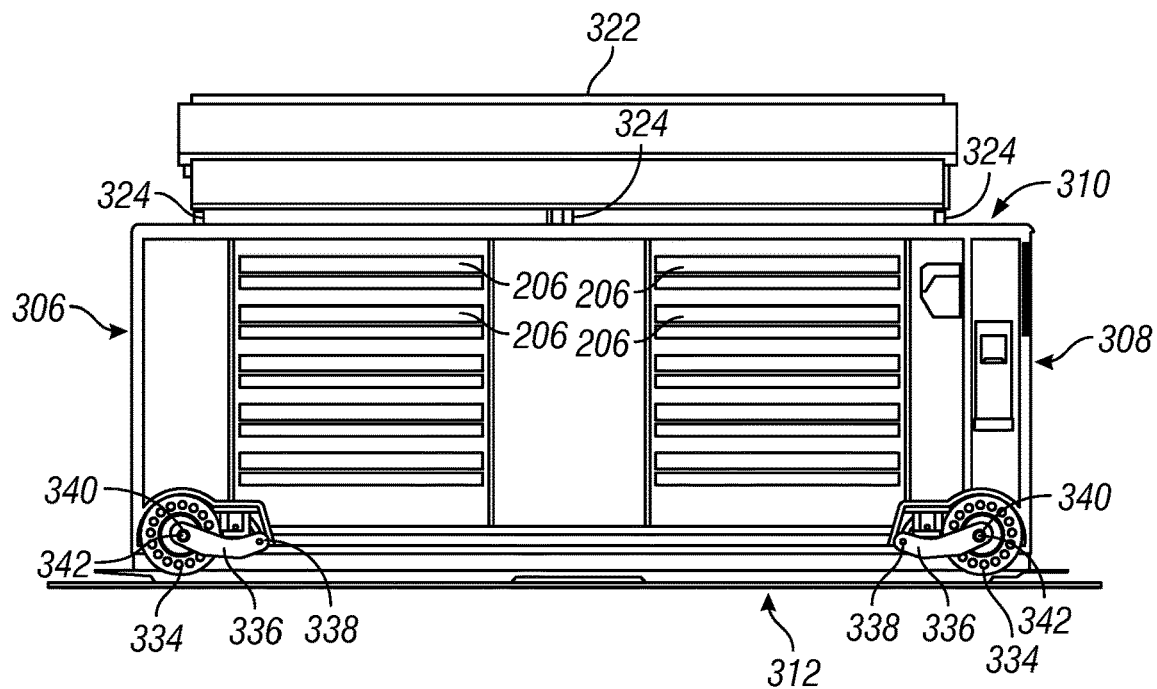
FIG. 12 is a simplified cross-sectional view of the EV charging station shown in FIG. 7 with the wheels in a retracted position.
Figure 13:
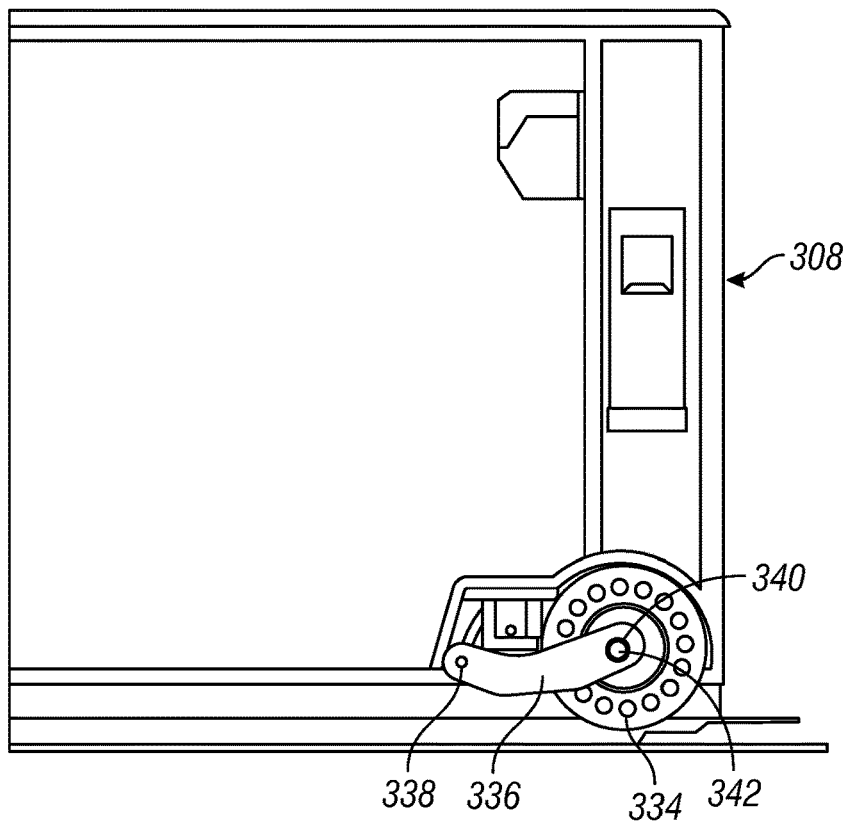
FIG. 13 is a detailed side view of the EV charging station shown in FIG. 12 with the wheels in a retracted position.
Figure 14:
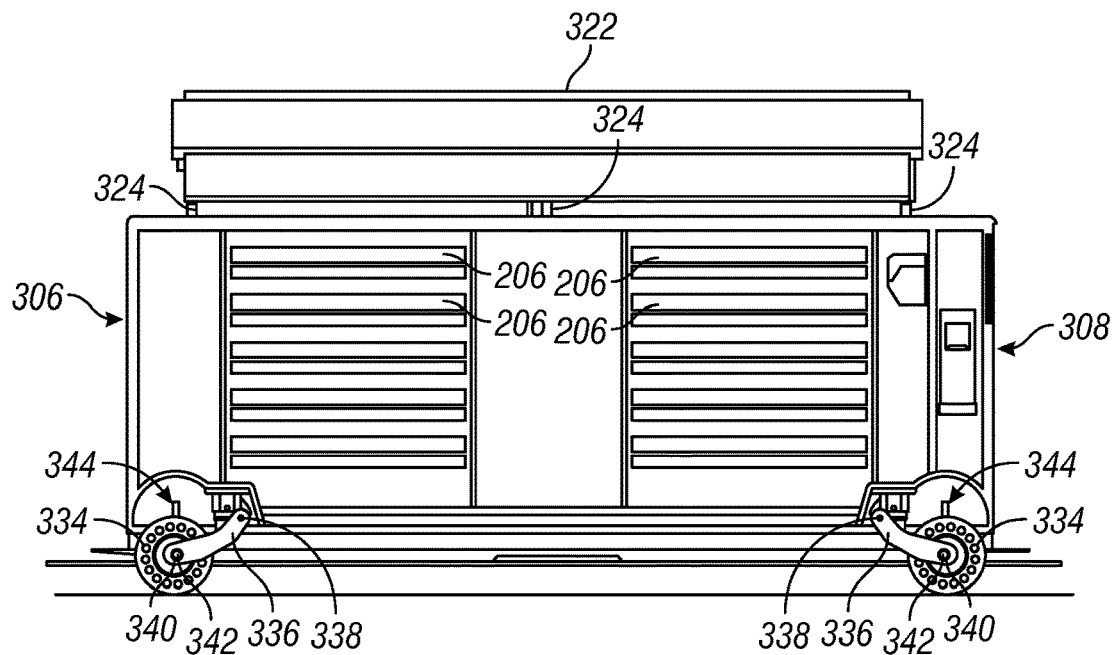
FIG. 14 is a simplified cross-sectional view of the EV charging station shown in FIG. 7 with the wheels in an extended position.
Figure 15:
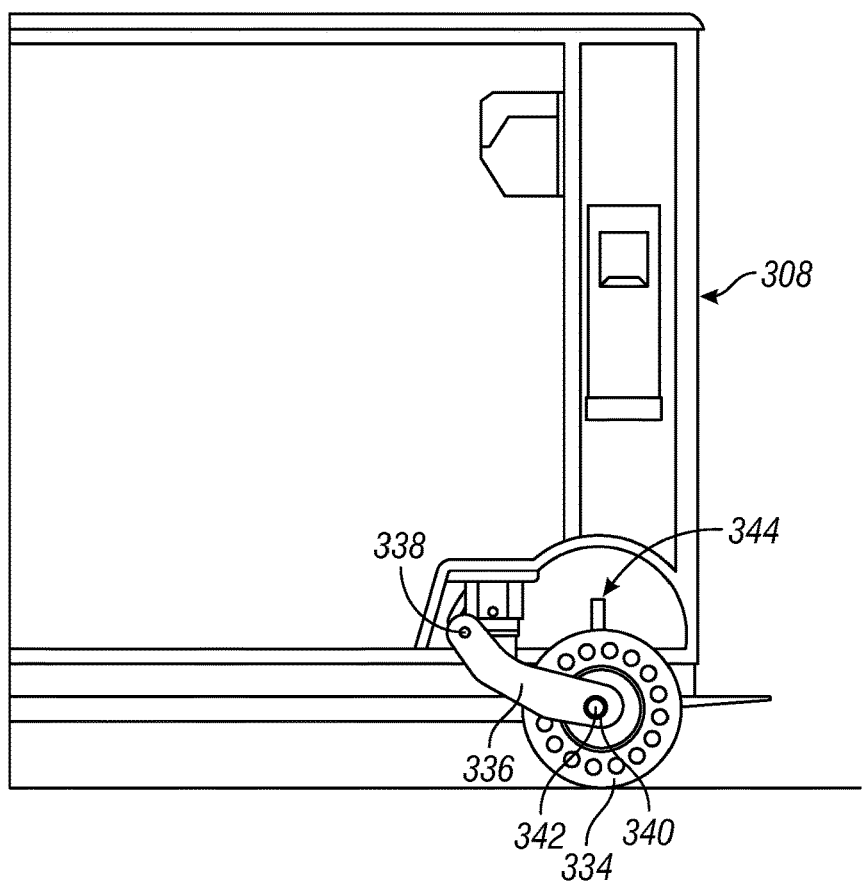
FIG. 15 is a detailed side view of the EV charging station shown in FIG. 14 with the wheels in an extended position.

In some embodiments, the charging station 300 includes wheels 334 that are movable between a retracted position (FIGS. 12-13) in which the charging station 300 is stationary (a portion of the charging station touches the ground or other surface) and an extended position (FIG. 14-15) in which the charging station 300 is mobile (suspended above the ground by the wheels) and can be self-driven. FIG. 12 illustrates a cross-section of the charging station 300 with the wheels 334 in the retracted position and FIG. 13 is a detailed view of the charging station 300. In the embodiment shown, the wheels 334 are connected to the charging station with a bracket 336 that is pivotable between the retracted and extended positions. As shown, the bracket 336 includes a proximal end with a first pivotal connection 338 between the side wall 302, 304 and a distal end with a second pivotal connection 340 between the bracket 336 and an axle 342 of the wheel 334. A motor or other device could be used to pivot the bracket 336 between the retracted and extended positions to move the charging station 300 between its stationary and mobile positions. As shown in FIGS. 14-15, there may be a guide slot 344 for guiding the wheel 334 between the retracted and extended positions.

Figure 16:
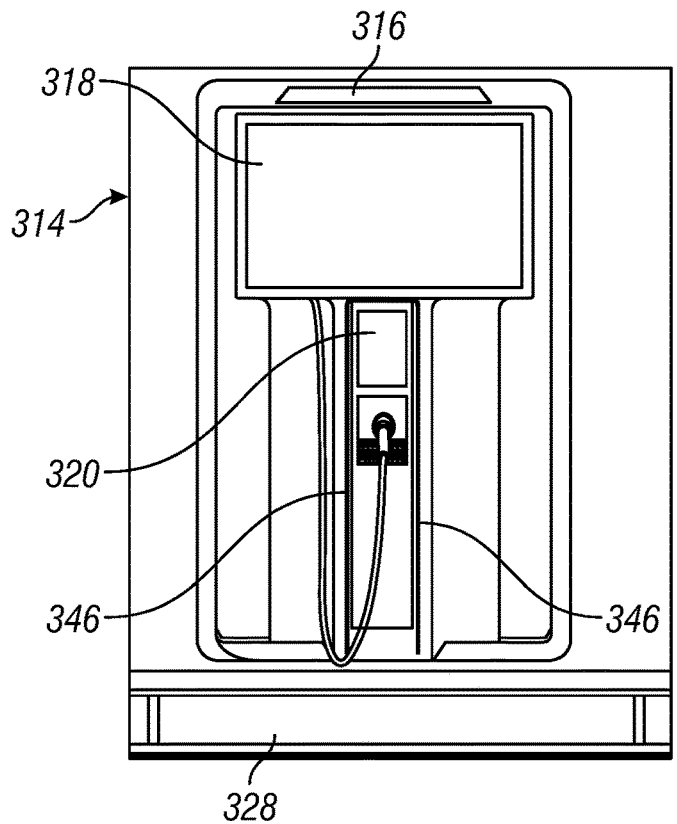
FIGS. 16 and 17 are detailed front views of a charging bay with different lighting options according to an embodiment of this disclosure.
Figure 17:
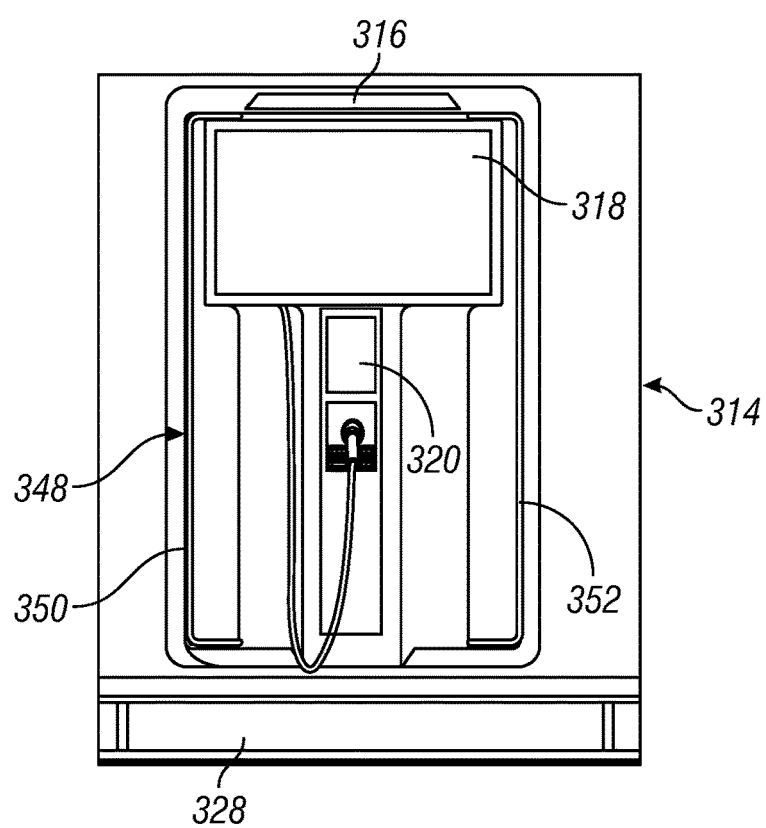

The charging bays 314a, 314b, 314c may include various lighting options. FIGS. 16 and 17 illustrate an example charging bay 314 according to an embodiment of this disclosure that includes the operational status indicator 316, monitor 318, and charging status indicator 320. In the embodiment shown in FIG. 16, the charging bay 314 includes a light 346 surrounding the indicator 320 and charging connector that is switchable between off/non-illuminated and on/illuminated. In the embodiment shown in FIG. 17, the charging bay 314 includes a light 348 with a first portion 350 on a first side of the indicator 316, monitor 318, and indicator 320, and a second portion 352 on the other side. As shown, the first portion 350 has a C-shape and the second portion 352 has a symmetrical C-shape to surround the charging bay 314. In some cases, the lights 346, 348 could be formed from one or more LED strings. However, the lights 346, 348 could be provided in different shapes and configurations depending on the circumstances.

Figure 18:
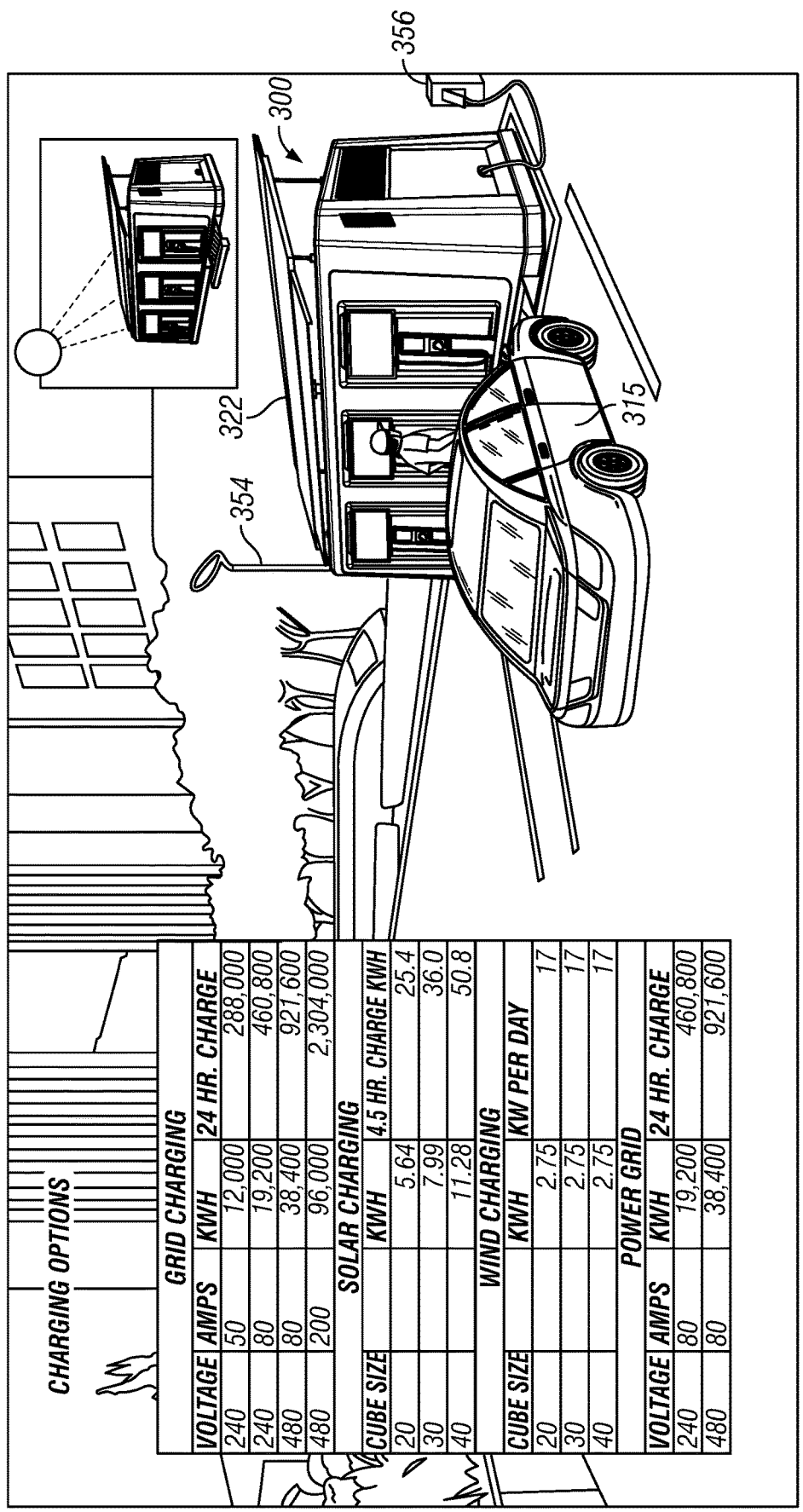
FIG. 18 is a perspective view of the EV charging station shown in FIG. 7 with a vehicle plugged in to charge and a table showing various charging/power distribution options for the EV charging station.

FIG. 18 illustrates the example charging station 300 and that, depending on the circumstances, could be powered to recharge the batteries 206 using a plurality of energy sources, such as energy harvesting system 212 with the solar panel assembly 322 and/or wind turbine(s) 354, and/or grid power 356. In some embodiments, the charging station 300 could be configured to provide power back into the grid power 356. The table in FIG. 18 with example power amounts for charging is provided for purposes of example only.

Figure 19:
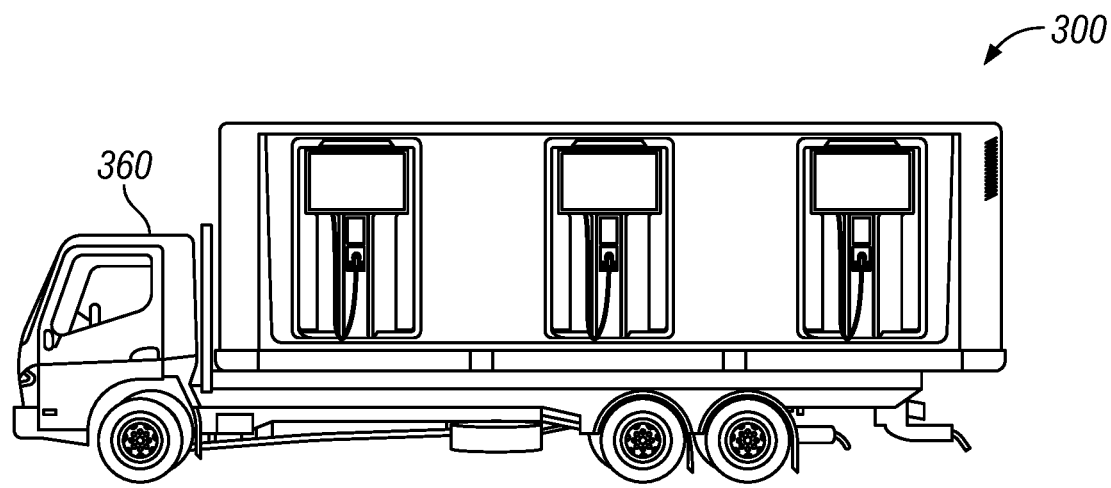
FIGS. 19-20 are side progressive views of the example EV charging station shown in FIG. 7 moving from a loaded position on a truck to an unloaded position being self-driven.
Figure 20:
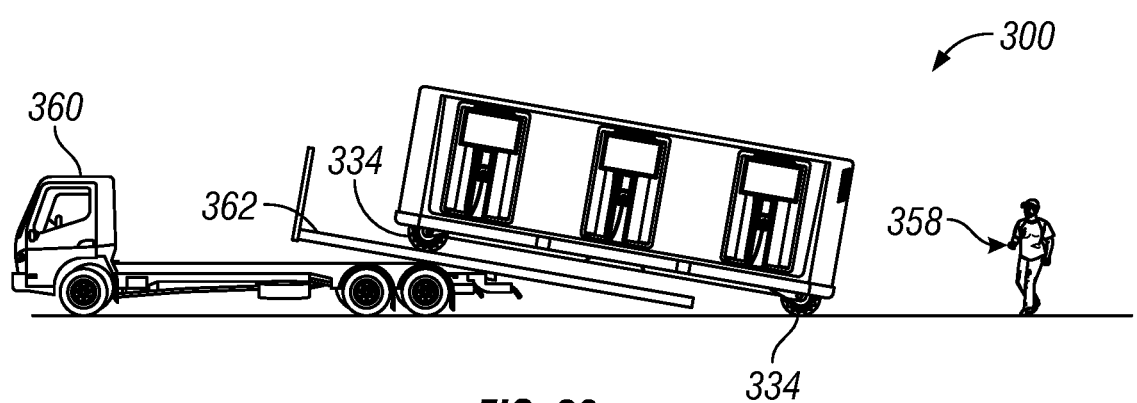

Similar to the EV charging station 100, in some embodiments, the EV charging station 300 is self-driving with the drive system 210. For example, the EV charging station 300 may include one or more motors for driving one or more wheels, which allows the EV charging station 300 to be driven for unloading/loading from/to a truck, moved from one location to another, etc. FIG. 19 shows an embodiment in which the EV charging station 300 includes one or more drive wheels 334 that allows the EV charging station 300 be self-propelled. As shown, the EV charging station 300 is controlled with a remote control device 358, which could include a joystick, or other controller, which could be used to control speed and/or steering of the EV charging station 300. In the example shown, there is a truck 360 onto which the EV charging station 300 had been loaded, and is unloaded by driving the EV charging station 300 off the truck 360 down a ramp 362 to an unloaded position using the remote control device 358. This allows the EV charging station 300 to be loaded or unloaded to/from the truck 360 by driving the EV charging station 300 using the remote control device 358. As shown in FIGS. 12-15, in some embodiments, upon driving the EV charging station 300 to the desired location, the wheels 334 may be retracted and the truck 360 can leave.

Figure 21:
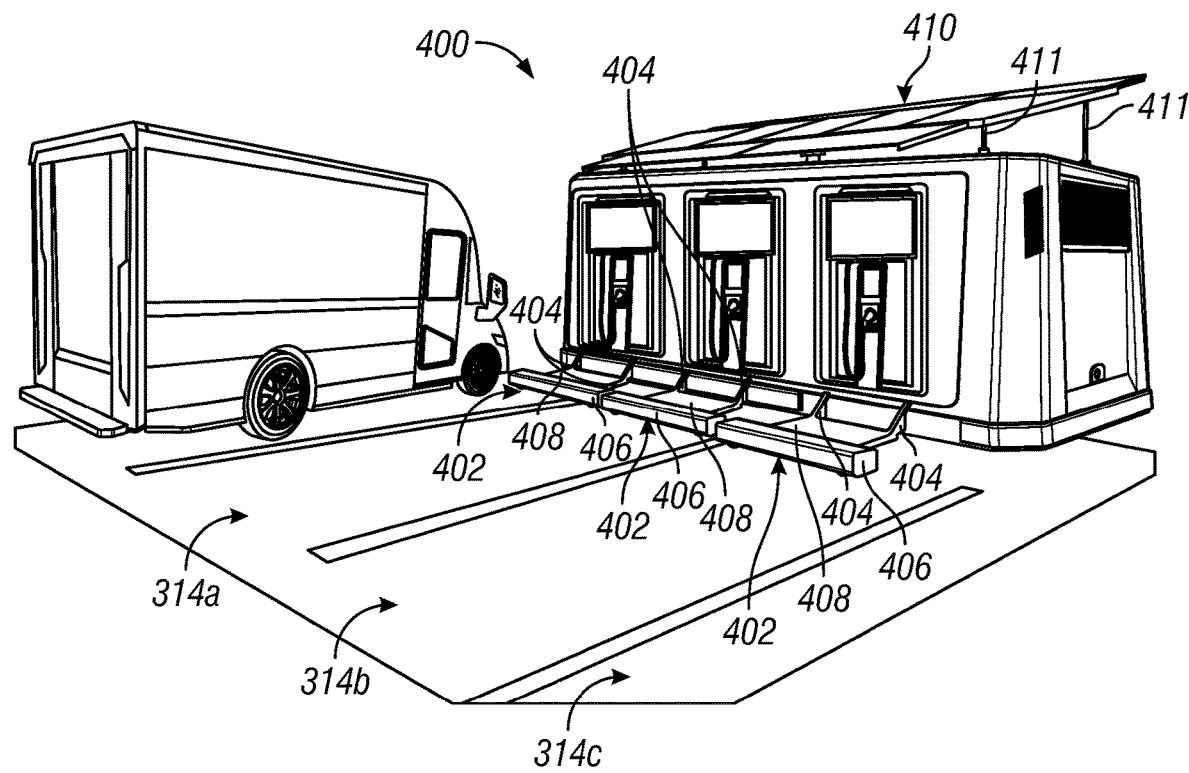
FIG. 21 is a perspective view of the example EV charging station according with another embodiment with the barriers extended and a vehicle plugged in to charge.
Figure 22:
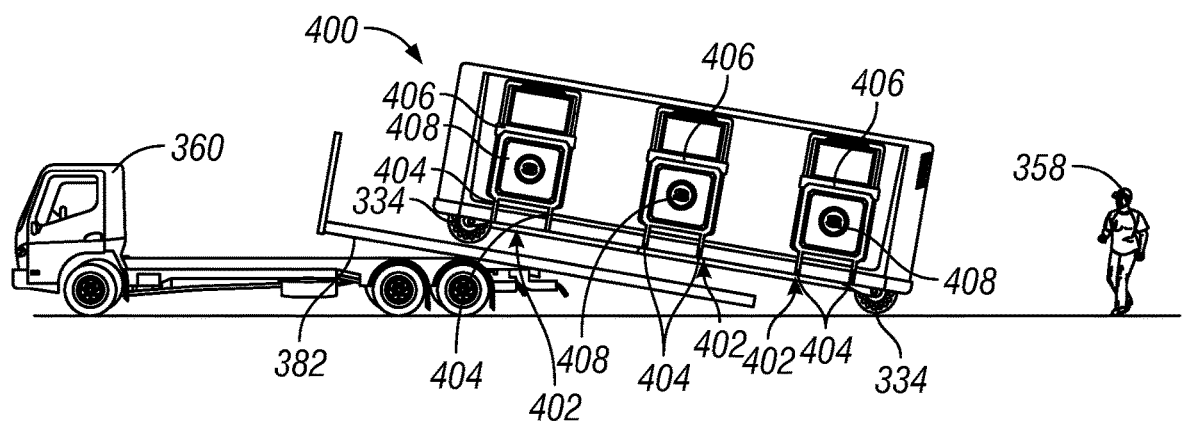
FIG. 22 is a side view of the example EV charging station shown in FIG. 21 self-driving to move to an unloaded position.
Figure 23:
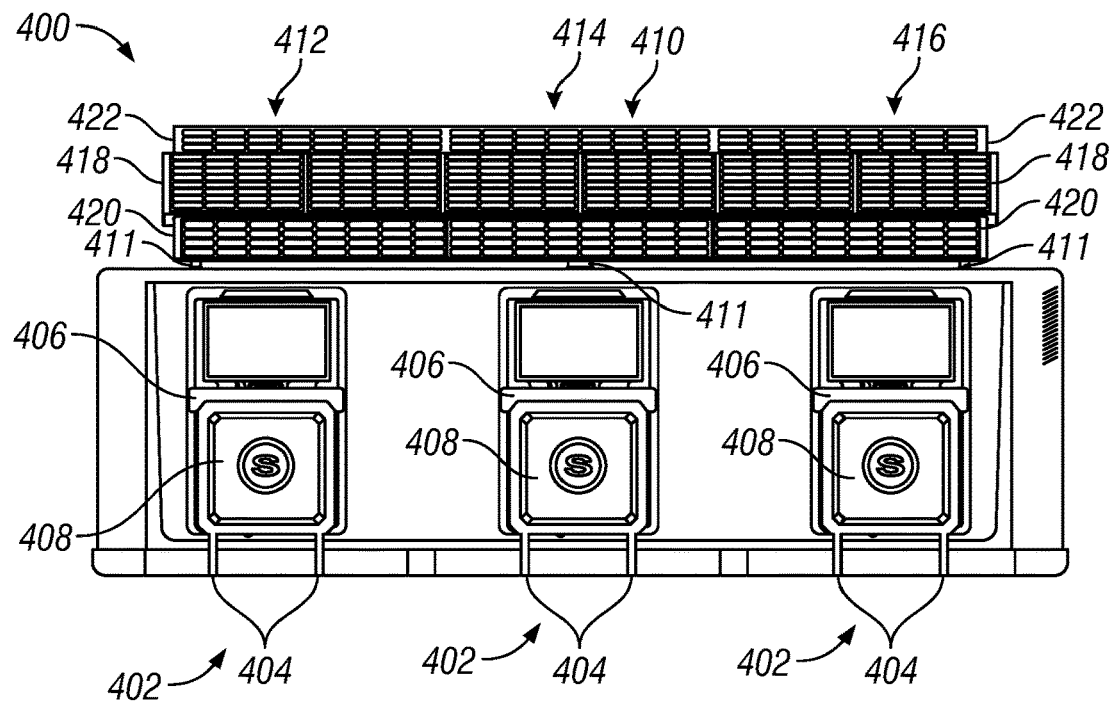
FIG. 23 is a front view of the example EV charging station shown in FIG. 21 with the barrier portions in the retracted position.

FIGS. 21-31 illustrate another embodiment of an EV charging station 400. The EV charging station 400 is similar to the EV charging station 300, and similar components will have similar reference numbers, but the EV charging station 400 includes a parking barrier assembly 402 that pivots between an extended position (FIG. 21) and a retracted position (FIGS. 22-23).

In some embodiments, the parking barrier assembly 402 has a proximal end with spaced apart legs 404 that are pivotally connected to a lower portion of the EV charging station 400 that allows the parking barrier assembly 402 to pivot between its extended and retracted positions. Although this example shows two legs 404 pivotally connected to the EV charging station 400, a single leg or more than two legs could be provided depending on the circumstances.

As shown, the embodiment of the parking barrier assembly 402 includes a distal end with a barrier portion 406, which prevents vehicles from getting too close to the EV charging station 400 and/or crashing into the EV charging station 400. An extension portion 408 extends between the legs 404 and the barrier portion 406. In the embodiment shown, the extension portion 408 is an approximately planar sheet embossed with a rim and recessed area. The size of the extension portion 408 depends on how far it is desired to have the barrier portion 406 extended from the EV charging station 400 in the extended position. In the retracted position, the extension portion 408 protects its respective charging bays 314a, 314b, 314c. Typically, the extension portion 408 is formed from a steel sheet, but other materials, such as aluminum, hard plastics, etc. could be used.

Depending on the circumstances, the parking barrier assembly 402 could be moved manually or automatically between its extended and retracted positions. For example, in an automatic embodiment, the EV charging station 400 may include a motor (not shown) controllable to move one or more of the parking barrier assemblies 402 between their extended and retracted positions.

In embodiments in which the parking barrier assembly 402 is manually moved between its extended and retracted positions, the parking barrier assembly 402 may include one or more latching assemblies (not shown) that latches the parking barrier assembly 402 in the retracted position. For example, the parking barrier assembly 402 in the extended position could be lifted upwards towards the retracted position until latching with the latch assembly to hold the parking barrier assembly 402 in the retracted position. When the parking barrier assembly 402 is latched in the retracted position, the parking barrier assembly 402 could be moved to the extended position by unlatching the latch assembly, and then lowering the parking barrier assembly 402 to the ground. In some cases, the latch assembly may include a lock for locking the parking barrier assembly 402 in the retracted position, such as during transport. In embodiments in which the parking barrier assembly is automatically moved between its extended and retracted positions, the latch could automatically latch the parking barrier assembly 402 in the retracted position, and automatically unlatch when the motor starts to move the parking barrier assembly 402 to the extended position.

FIG. 21 illustrates the example EV charging station 400 with the parking barrier assembly 402 pivoted to the extended position. In this position, the extension portion 408 is approximately horizontal and the barrier portion 406 is spaced apart from the EV charging station 400 to block vehicles from getting to close to the EV charging station 400. In some embodiments, each parking barrier assembly 402 may be individually moved between the extended and retracted positions.

FIG. 22 illustrates the example EV charging station 400 self-driving to unload from a truck 360. As with the EV charging stations 100 and 300, the EV charging station 400 may include a drive system 210. As shown, the EV charging station 400 is controlled with a remote control device 358, which could include a joystick, or other controller, which could be used to control speed and/or steering of the EV charging station 400, similar to the EV charging station 300.

FIG. 23 illustrates the example EV charging station 400 with the parking barrier assembly 402 in the retracted position. As shown, the EV charging station 400 includes a solar panel assembly 410 that can be used as an energy harvesting device similar to solar panel assembly 322 in the EV charging station 300. As shown in FIG. 23, the solar panel assembly 410 is suspended on a plurality of support legs 411 that form a platform on which the solar panel assembly 410 is supported. In the example shown, each of the bays 314a, 314b, 314c include a section of the solar panel assembly 410 with a first section 412, a second section 414, and a third section 416. Although the solar panel assembly 410 includes three sections 412, 414, 416 of arrays corresponding to the three bays 314a, 314b, 314c in the example shown, less or more sections could be provided depending on circumstances.

Figure 24:
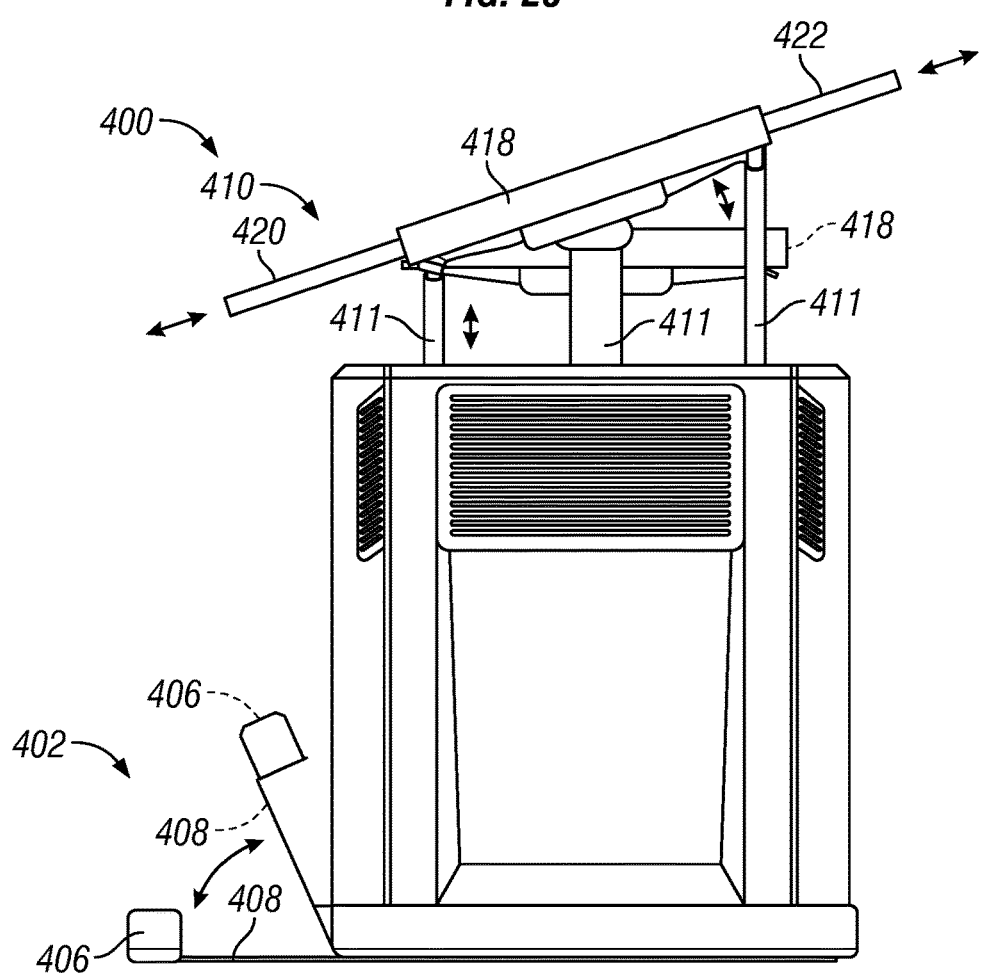
FIG. 24 is a right side view of the example EV charging station shown in FIG. 21 with the barrier portion shown moving between extended and retracted positions and the solar panels moving between pivoted/extended position to a flat/retracted position.

Referring now to FIG. 24, each section 412, 414, 416 includes a central solar array 418, a first side solar array 420, and a second side solar array 422. The central solar array 418 includes an internal cavity dimensioned to receive the first side solar array 420 and second side solar array 422. The first side solar array 420 and second side solar array 422 are movable between an extended position and a retracted position. In the retracted position, the first side solar array 420 and second side solar array 422 are received within the cavity of the central solar array 418 and in the extended position, the first side solar array 420 and second side solar array 422 move transversely in opposite directions out of the central solar array 418. For example, the central solar array 418 may include one or more internal motors to move the first side solar array 420 and second side solar array 422 between the extended and retracted positions. The first side solar array 420 and second side solar array 422 may be retracted during transport and extended during energy harvesting sessions.

The support legs 411 can also be seen in FIG. 24. In the embodiment shown, the support legs 411 are rods that are movable between an extended position out of the EV charging station 400 and a retracted position within the EV charging station 400. The support legs 411 may be moved to tilt and/or otherwise orient the solar panel 422 into a position to maximize energy harvesting. In some embodiments, the support legs 411 may be electronically controlled by a linear movement device to dynamically move the legs 411 to orient the solar panel 422 based on solar position, weather conditions, and/or other parameters. Depending on the circumstances, the sections 412, 414, 416 of arrays could be independently controllable. Additionally, the support legs 411 may be moved to a fully retracted position to lower the solar panel assembly 410 for transport.

Figure 25:
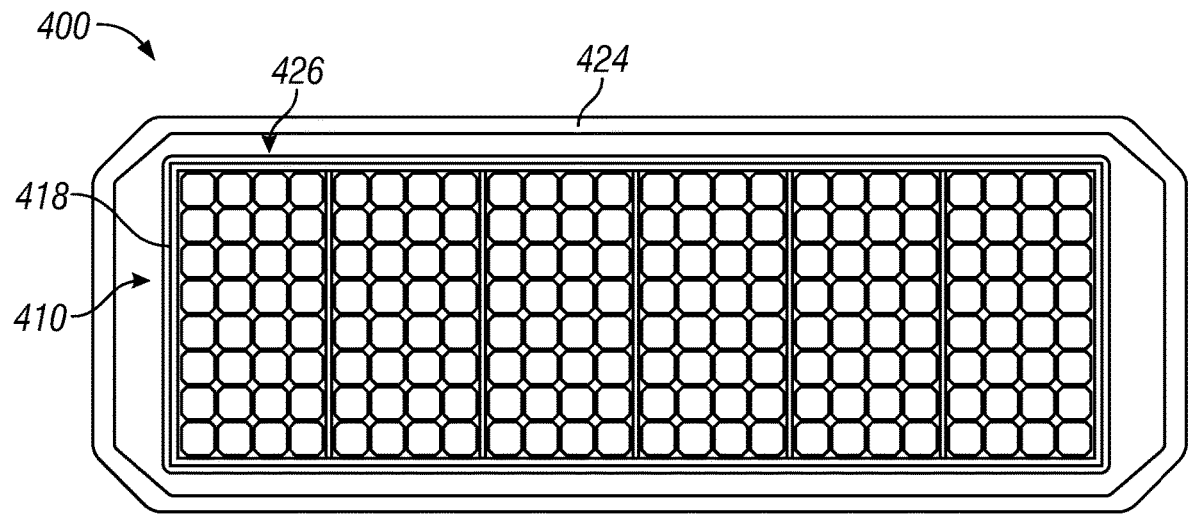
FIG. 25 is a top view of the example EV charging station shown in FIG. 21 with the solar panels in the retracted position.
Figure 26:
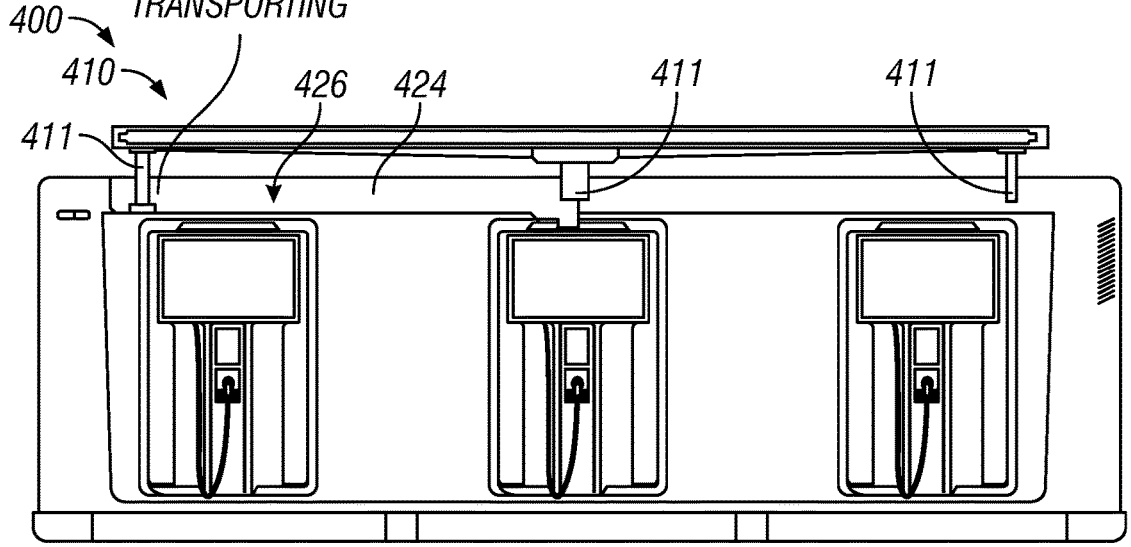
FIG. 26 is a front view of the example EV charging station shown in FIG. 21 with the solar panels in a horizontal position and a portion of the body cut away to reveal a recessed area to receive the solar panels.

Referring now to FIG. 25, there is shown the solar panel assembly 410 in the retracted position within the first and second side solar arrays 420, 422 received within the internal cavity of the central solar array 418. In the embodiment shown, the top portion of the EV charging station 400 includes a rim 424 defining a perimeter of a recessed area 426. In some embodiments, the recessed area 426 is dimensioned to receive the solar panel assembly 410 so that the solar panel assembly 410 does not extend above the rim 424. FIG. 26 shows the rim 424 partially cut away to reveal the recessed area 426. In some cases, the recessed portion 426 may be shaped so the bottom angles towards the corners for water shedding, such as during inclement weather so water does not pool on top of the EV charging station 400.

Figure 27:
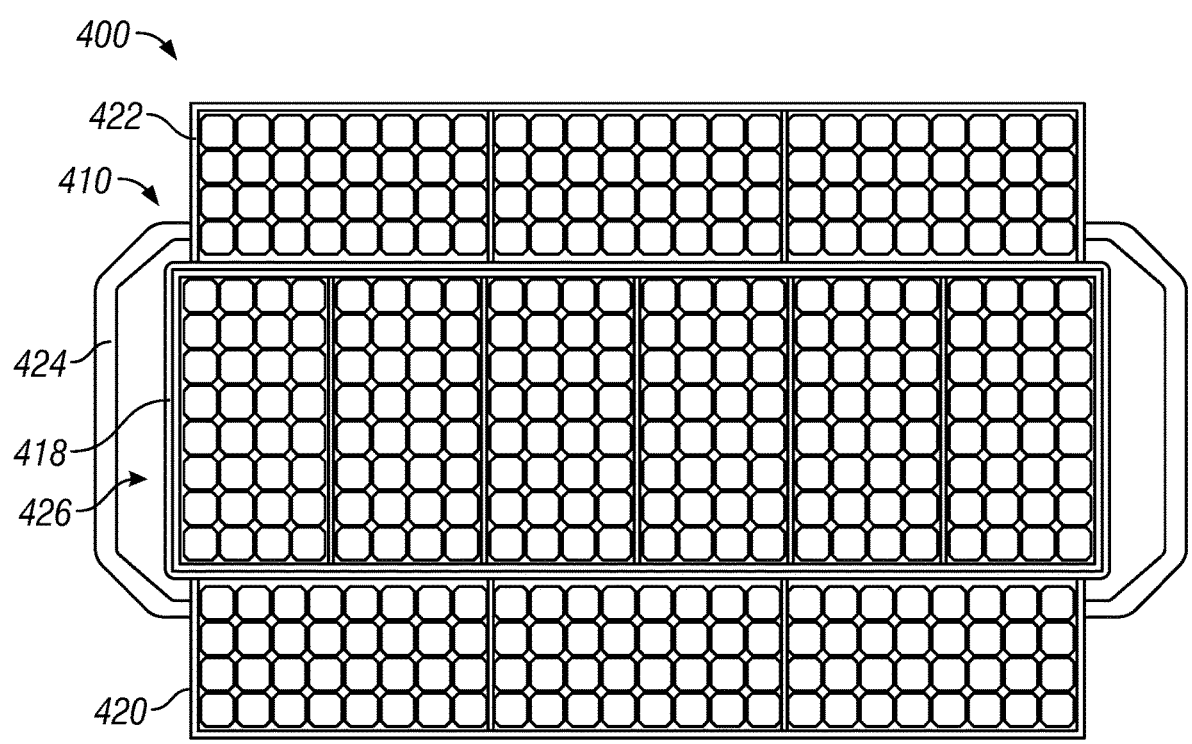
FIG. 27 is a top view of the example EV charging station shown in FIG. 21 with the solar panels in the extended position.
Figure 28:
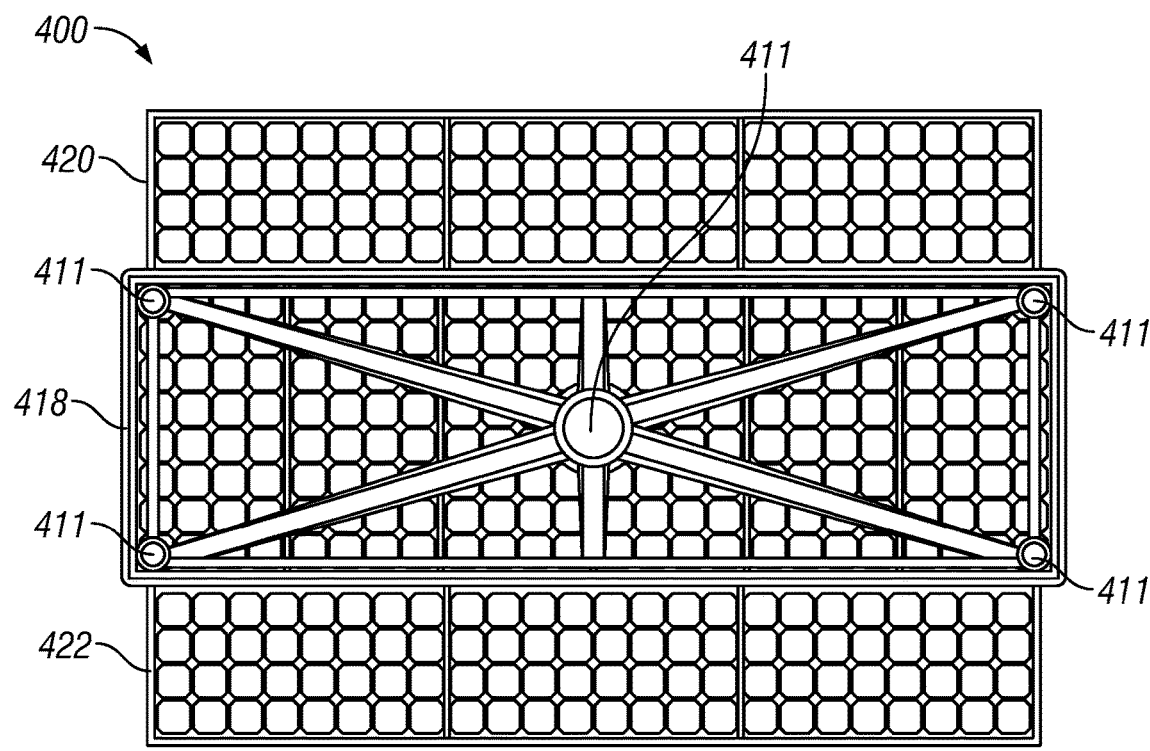
FIG. 28 is a cross-sectional view of an embodiment of the solar panel support structure showing the support underneath the solar panels in an extended position.
Figure 29:
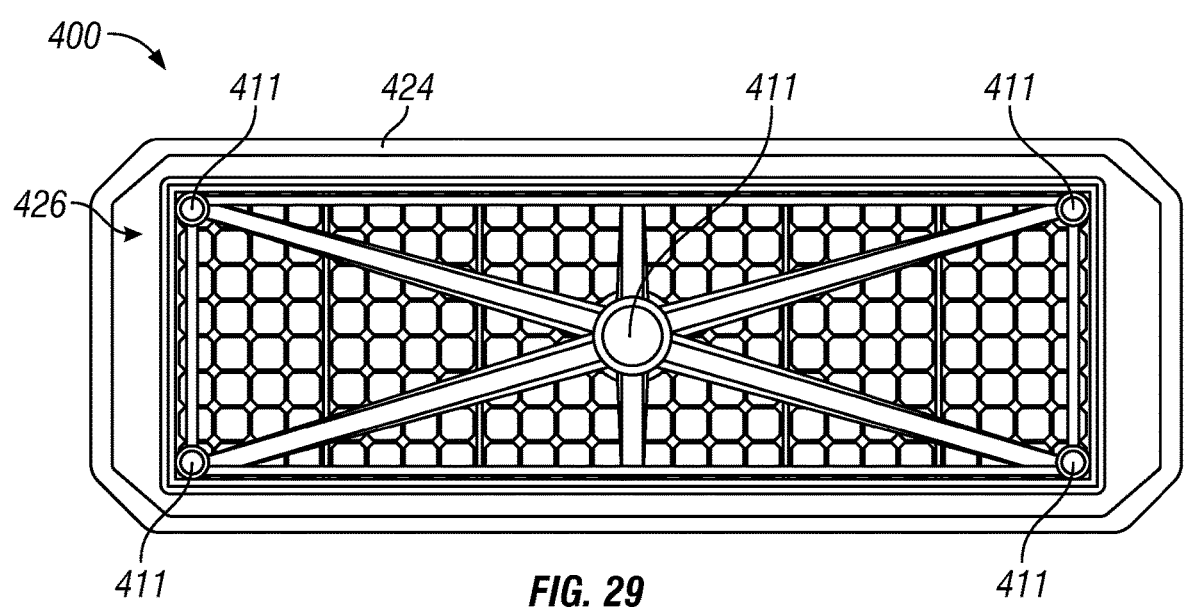
FIG. 29 is a view of the solar panel support structure shown in FIG. 28 underneath the solar panels in the retracted position.

FIG. 27 shows the solar panel assembly 410 in the extended position with the first and second side solar arrays 420, 422 moved transversely out of the central solar array 418 to define a greater surface area for the solar arrays to increase energy harvesting. As shown, the first and second side solar arrays 420, 422 are extended beyond the rim 424. FIGS. 28 and 29 illustrate the connection points of the support legs 411 with the solar panel assembly 410 in the extended position and retracted positions, respectively.

Figure 30:
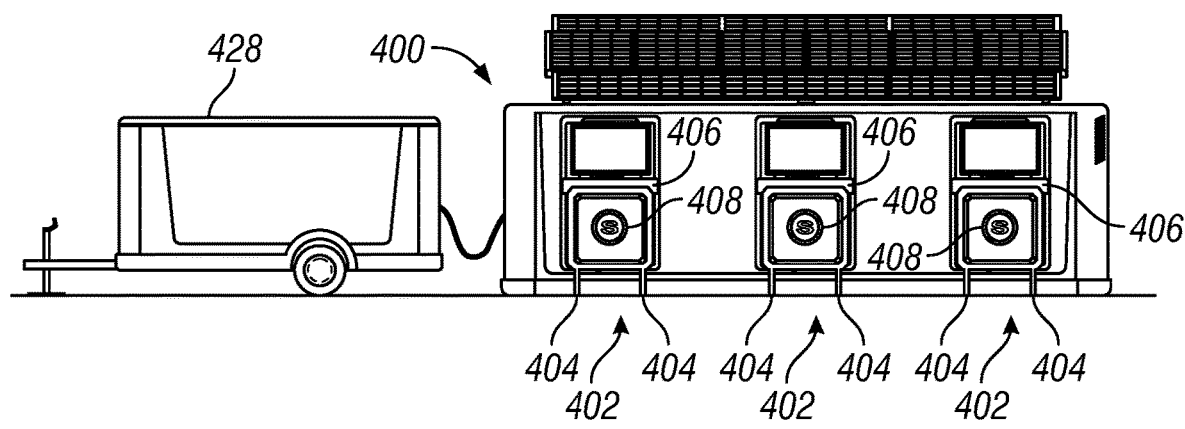
FIG. 30 a front view of the example EV charging station shown in FIG. 21 with the barriers in the retracted position being charged with a support charging vehicle.

FIG. 30 illustrates an embodiment in which a supplemental energy storage vehicle 428 may be used to charge the EV charging station 400. In the embodiment shown, the supplemental charging station 428 is embodied as a trailer with a plurality of batteries that may hauled to a location of the EV charging station 400 for charging. Depending on the circumstances, the supplemental charging station 428 could be embodied as other types of vehicles, including both those that are hauled and those that are driven.

Figure 31:
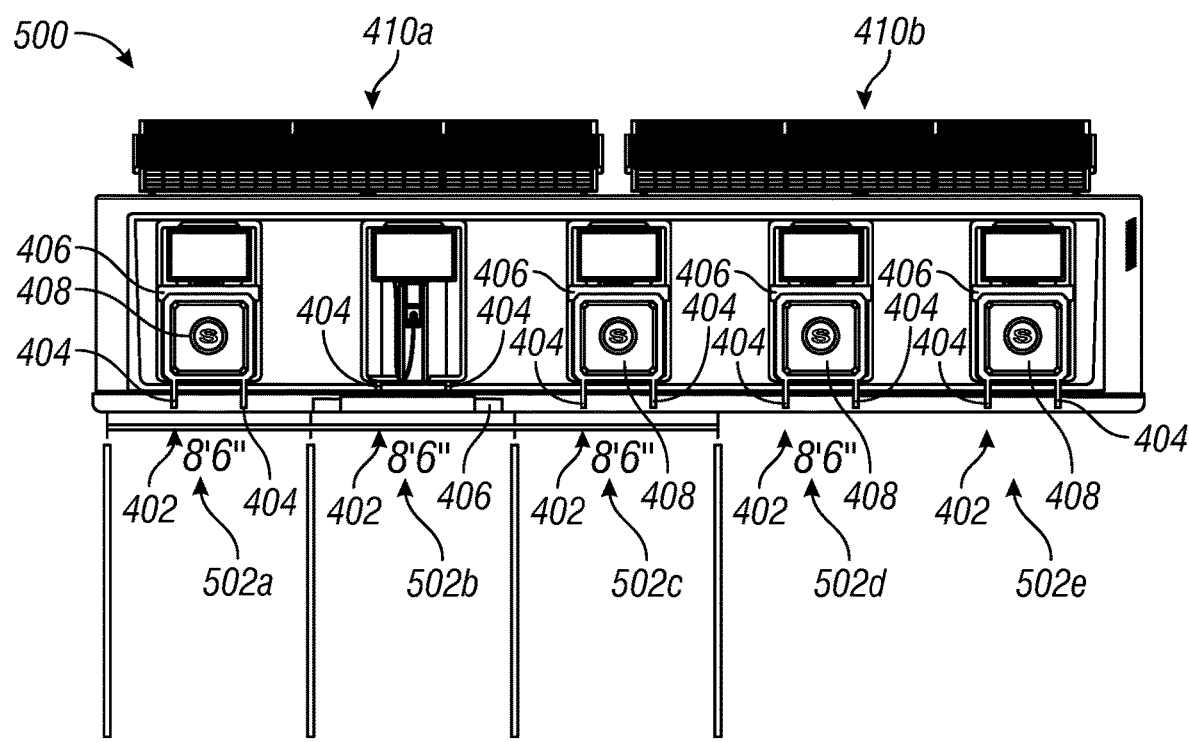
FIG. 31 is a front view of an example EV charging station with example parking spaces corresponding to some of the charging bays.

Referring now to FIG. 31, there is shown an example EV charging station 500 according to another embodiment. In the embodiment shown, there are five charging bays 502a, 502b, 502c, 502d, and 502e, and a first solar panel assembly 410a and a second solar panel assembly 410b. Example parking spaces are shown aligned with a portion of the charging bays 502a, 502b, 502c, 502d, 502e without any vehicles. As mentioned herein, the exact number of charging bays for the EV charging station 500 may vary depending on the circumstances.

Figure 32:
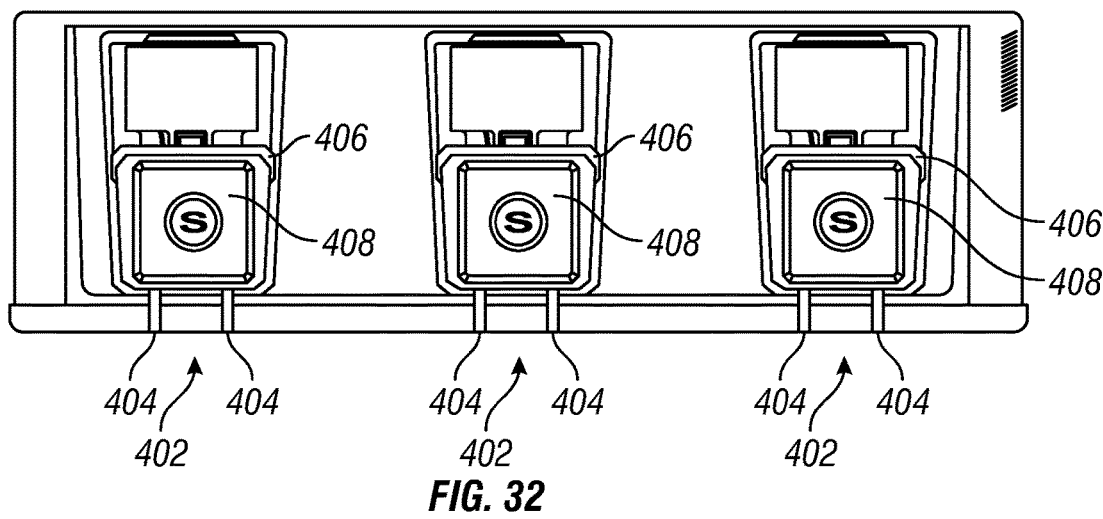
FIG. 32 is a front view of an example EV charging station according to another embodiment with camouflage.
Figure 33:
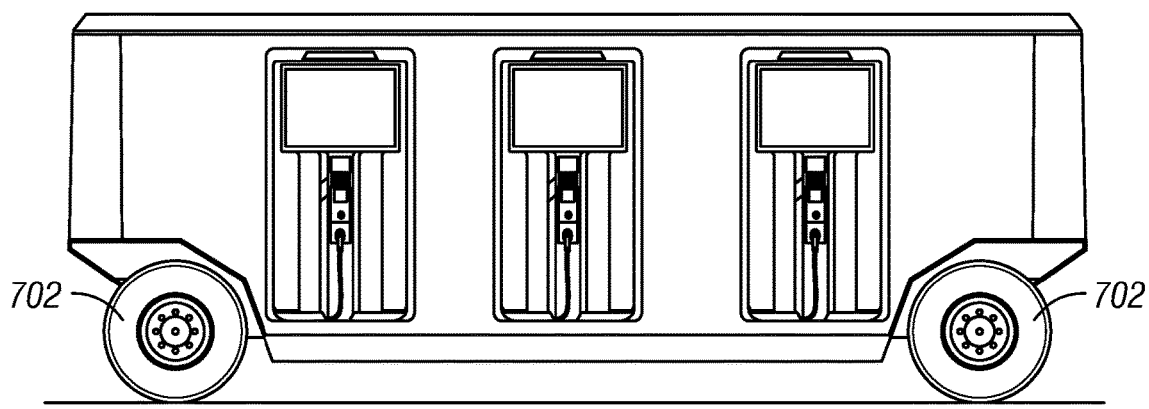
FIG. 33 is a front view of an example EV charging station according to another embodiment.

FIGS. 32 and 33 illustrate example EV charging stations 600 and 700 that each include camouflage, which could be particularly useful in military environments. The example EV charging station 600 is similar to EV charging stations 100, 300, 400 that can be self-driven with wheels that are movable between extended and retracted positions. As shown, the wheels of the EV charging station 600 are in the retracted position. In the example shown, there are no monitors on the EV charging station 600 for additional durability in a military application. The example EV charging station 700 includes wheels 702 that are fixed in position (unlike the retractable wheels that pivot described elsewhere herein). The wheels 702 in the EV charging station 700 are heavy duty style wheels for off-road conditions and may include 4-wheel drive.

Figure 34:
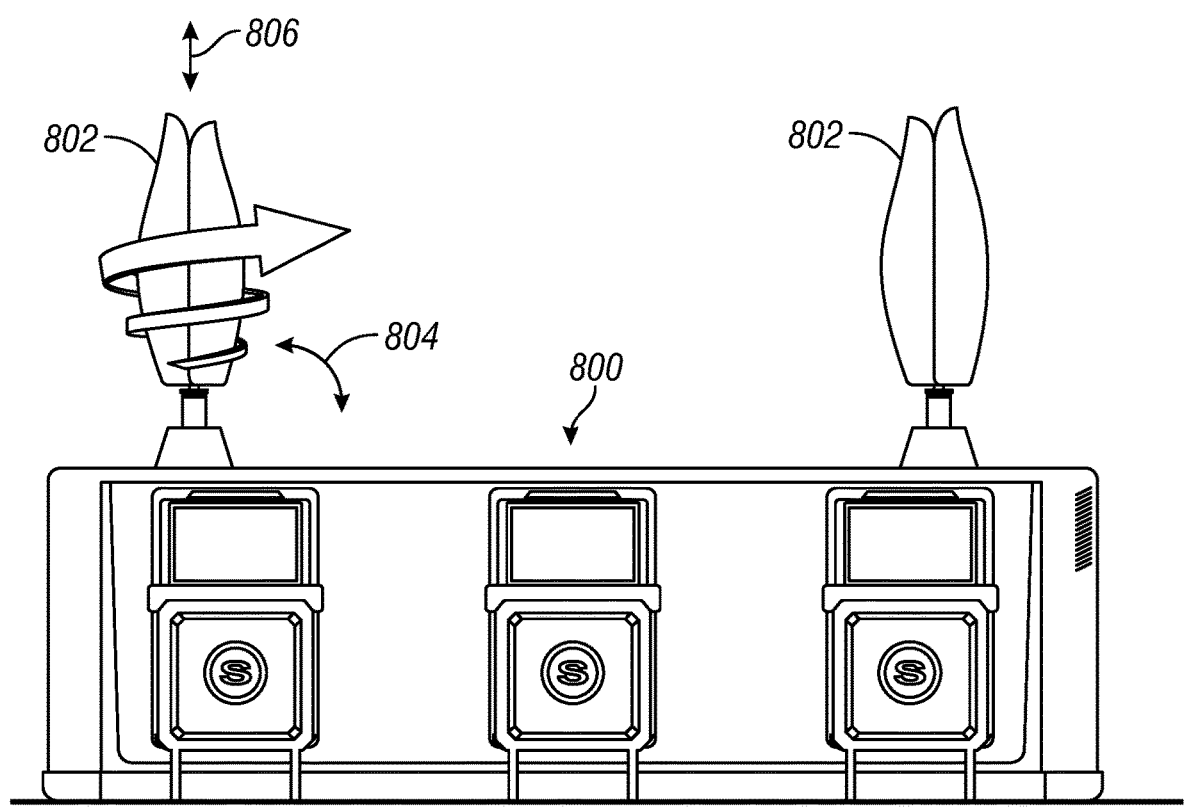
FIG. 34 is a side view of an example EV charging station according to an embodiment of this disclosure with a plurality of wind turbines in an extended position to harvest wind energy for recharging the charging station's batteries.

FIG. 34 illustrates an example EV charging station 800 according to an embodiment of this disclosure. In the example shown, the EV charging station 800 includes a plurality of wind turbines 802 that are configured to harvest wind energy for charging the internal batteries of the EV charging station 800 or for charging other electrical components. Although a plurality of wind turbines 802 are shown for purposes of example, a single wind turbine could be provided depending on the circumstances. In some embodiments, the wind turbines 802 could be those available under the name "Flower Turbine" by Flower Turbines LLC in the U.S. and Leviathan Energy Wind Lotus, Ltd. in Israel. The wind turbines 802 are movable between an extended position (as shown in FIG. 34) and a retracted position in which the wind turbines 802 are retracted within the housing of the EV charging station 800. Depending on the circumstances, the wind turbines 802 could pivot substantially along line 804 between the extended and retracted positions. In some cases, the wind turbines 802 could move between the extended and retracted positions along line 806.

Figure 35:
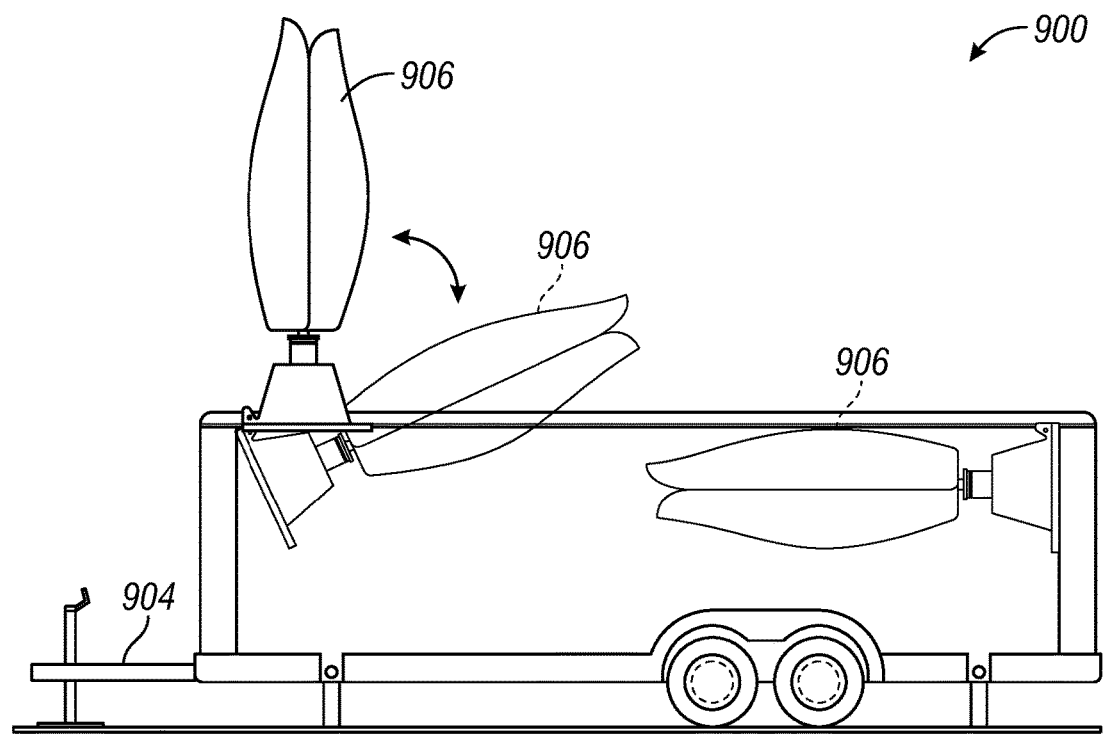
FIG. 35 is a side view of an example support charging vehicle with a wind turbine moving between the extended and retracted positions according to an embodiment of this disclosure.
Figure 36:
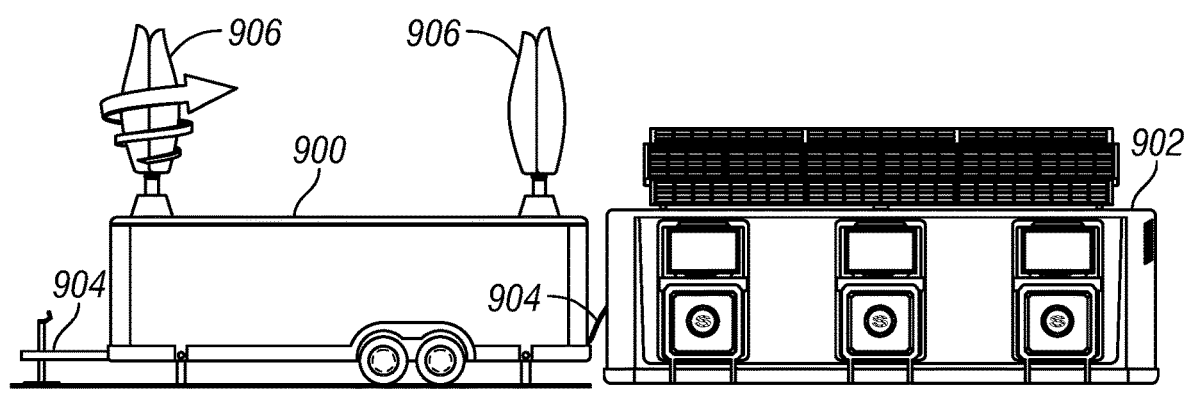
FIG. 36 is a side view of an example support charging vehicle connected to an example EV charging station with the support vehicle having a plurality of wind turbines in an extended position to harvest wind energy and the charging station having a plurality of solar panels to harvest solar energy.

FIGS. 35 and 36 illustrate an example support charging vehicle 900 that could be used to charge an EV charging station 902 to or other electrical devices, such as an electronic vehicle. As shown, the support charging vehicle 900 is embodied as a trailer, which could include a plurality of internal batteries for charging the EV charging station 902 or other device. For example, the support charging vehicle 900 could be transported to the location of the EV charging station 902 (or a electric vehicle), and supply electrical energy. In the embodiment shown, the support charging vehicle 900 could be connected to a truck with the hitch 904 and transported to a location where the EV charging station 902 or other device needs to be charged. The support charging vehicle 900 includes one or more output lines 904 (FIG. 36) that could be plugged into the EV charging station 902 or other device to be charged. In some cases, the support charging vehicle 900 could use the output lines 904 (or other lines) to connect with grid power for charging the internal batteries of the support charging vehicle 900.

In the embodiment shown, the support charging vehicle 900 includes one or more wind turbines 906 that are movable between an extended position and a retracted position. In the extended position, the wind turbines 906 are generally upright to harvest wind energy. In the retracted position, the wind turbines 906 are retracted into an interior space of the support charging vehicle 900 so that the support charging vehicle 900 can be transported to a desired location where charging is needed. In the example shown in FIG. 35, the wind turbines 906 are pivotable between the extended and retracted positions.

Figure 37:
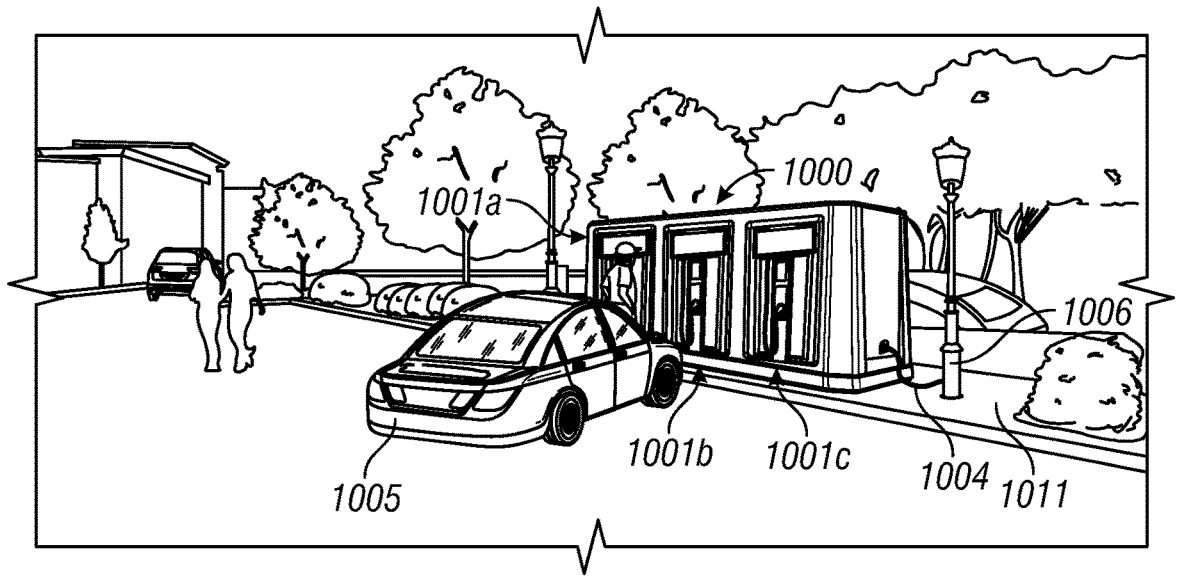
FIG. 37 is a perspective view of an example EV charging station according to another embodiment of this disclosure.
Figure 39:
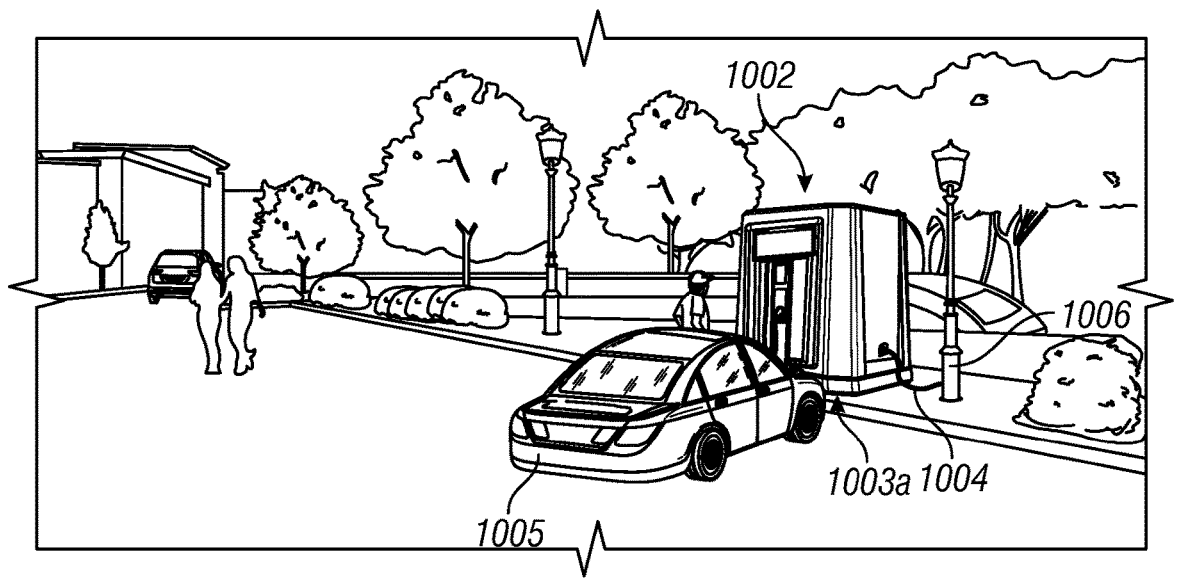
FIG. 39 is a perspective view of an example EV charging station connected to the grid for charging the batteries of the charging station according to a further embodiment of this disclosure.

FIG. 37 shows an example EV charging station 1000 according to another embodiment of this disclosure. In this example, the EV charging station 1000 has a narrower body than other EV charging stations shown previously in this disclosure. This allows the EV charging station 1000 to be more maneuverable and fit into spaces where wider EV charging stations would not fit. For example, in some embodiments, the EV charging station 1000 may only be approximately 4 feet wide. As shown, the width has been selected because it is the width of a sidewalk 1011 on which the EV charging station 1000 is placed. In the example shown with three charging bays 1001a, 1001b, 1001c, the EV charging station 1000 may be approximately 20 feet long. However, depending on the circumstances, the EV charging station 1000 could have more or fewer bays than three. As shown in FIG. 39, an example EV charging station 1002 includes a single bay 1003a for charging an electric vehicle 1005 or other device.

Referring back to FIG. 37, the EV charging station 1000 includes an electrical connection 1004, which is embodied as a cord in this example, for connecting the EV charging station 1000 to other electrical devices to supply or receive electrical power. As shown, the electrical connection 1004 is connected with a light pole 1006, which supplies electrical power for charging the batteries of the EV charging station 1000. Depending on the circumstances, the light pole 1006 could provide power from the grid to charge the EV charging station 1000. For example, the grid power could be three-phase power for the EV charging station 1000 at 10-12 kWh charging with 208/240/277 line voltage at 50 amps, for approximately 240-288 kilowatts charge per day. Of course, other outlets or facilities could provide grid power at other power levels to charge the batteries of the EV charging station 1000, such as between 468-2304 kW from the grid per day depending on the line voltage, amperage, phase, and kilowatt hours available at the outlet or facility providing the power. This arrangement provides versatility in which a power source (e.g., grid power from light pole, facility, etc.) can easily be turned into multiple charging bays with the EV charging station 1000. For example, consider a parking lot with a plurality of light poles that could each provide electrical power for charging the batteries of the EV charging station 1000. In this example, with the EV charging station 1000 includes three bays 1001a, 1001b, 1001c for charging electric vehicles; with this configuration, each light pole could be transformed into three charging bays for electric vehicles. Of course, the EV charging station 1000 could have more or fewer bays depending on the circumstances. Consider another example when a vehicle dealership receives a delivery of electrical vehicles; in this example, the newly delivered vehicles could be quickly charged for delivery to customers using light poles or other electrical outlets readily available in the parking lot of the dealership without adding any further infrastructure or construction to build EV chargers. Also, the EV charging station 1000 could be selectively placed in areas that need additional vehicle charging capacity during peak times to increase the charging capacity.

Figure 38:
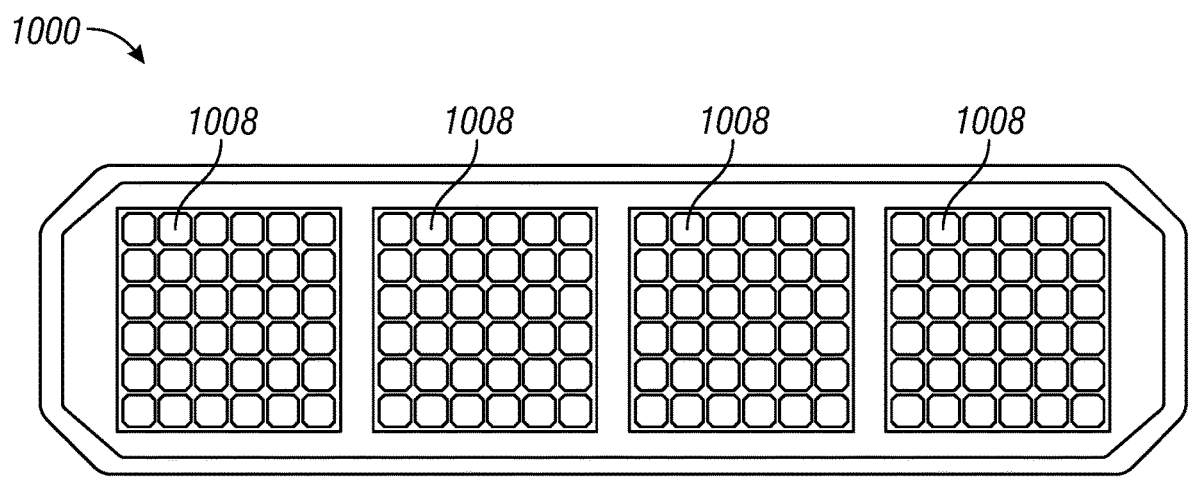
FIG. 38 is a top view of the example EV charging station shown in FIG. 37 with a plurality of solar panels for harvesting solar energy to charge the batteries of the charging station.

FIG. 38 illustrates an example energy harvesting system that could be mounted on the EV charging station 1000. In the example shown, the energy harvesting system is embodied as a plurality of solar panels 1008 for charging the batteries of the EV charging station 1000. However, the energy harvesting system could be embodied as wind turbines or other energy harvesting systems depending on the circumstances. As discussed herein, the solar panels 1008 may include a platform that allows pivoting an adjustment to maximize energy harvesting from the sun based on environmental conditions.

Figure 40:
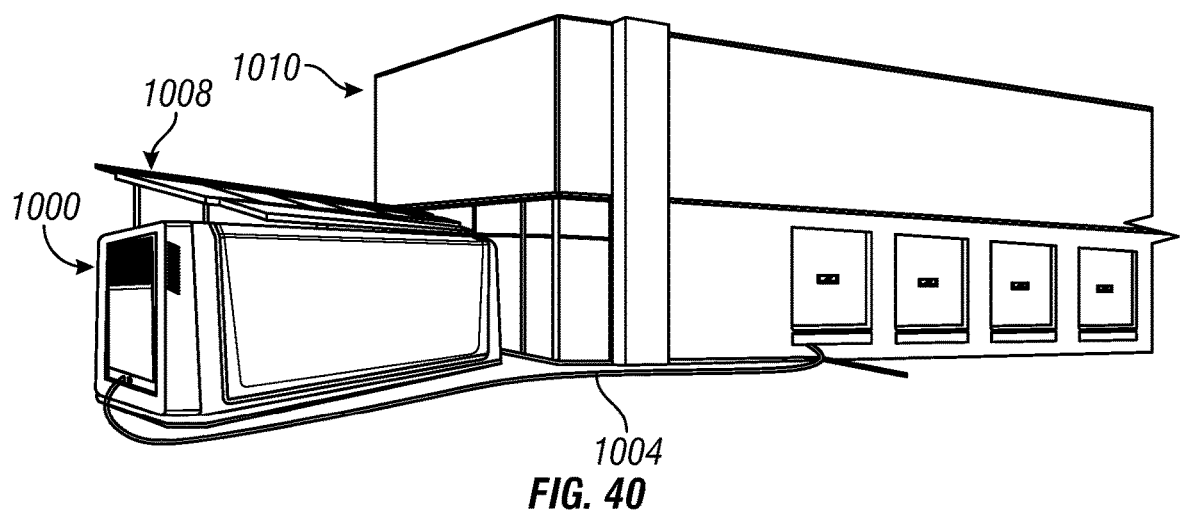
FIG. 40 is a perspective view of an example EV charging station connected to grid power for charging the charging station's batteries and solar panels also harvesting solar energy for charging the batteries.

FIG. 40 shows an example in which the EV charging station 1000 is plugged into grid power at a facility 1010 using the electrical connection 1004. Consider an example in which the facility shown in FIG. 40 is a location with a plurality of fleet vehicles that are electrical vehicles. The EV charging station 1000 could increase the number of charging bays for electrical fleet vehicles by merely plugging in the EV charging station 1000 into the grid on location without needing to build additional infrastructure to accommodate charging the fleet vehicles.

Figure 41:
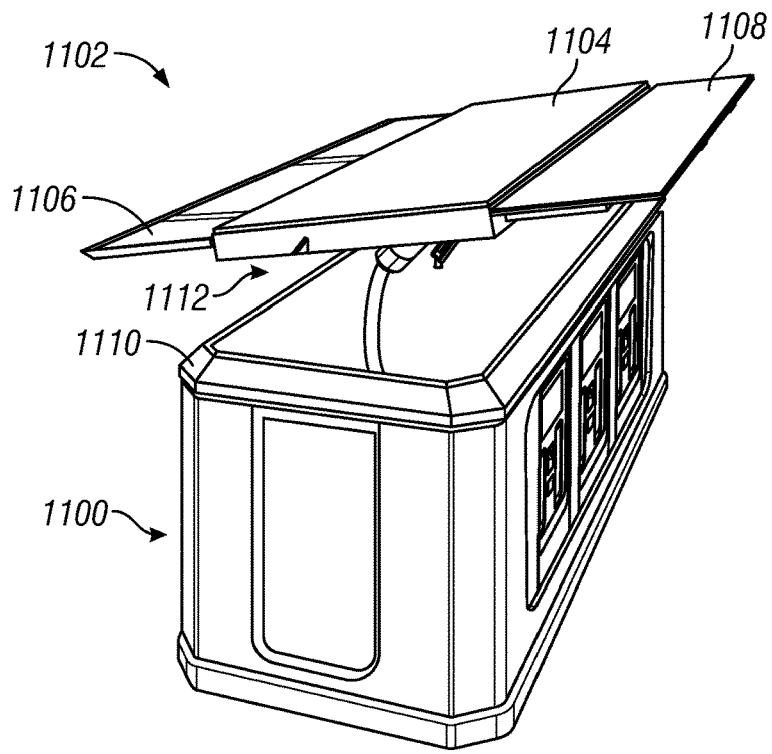
FIGS. 41-42 are perspective views from the front and rear, respectively, of an example EV charging station with the solar panel assembly in an extended position.
Figure 42:
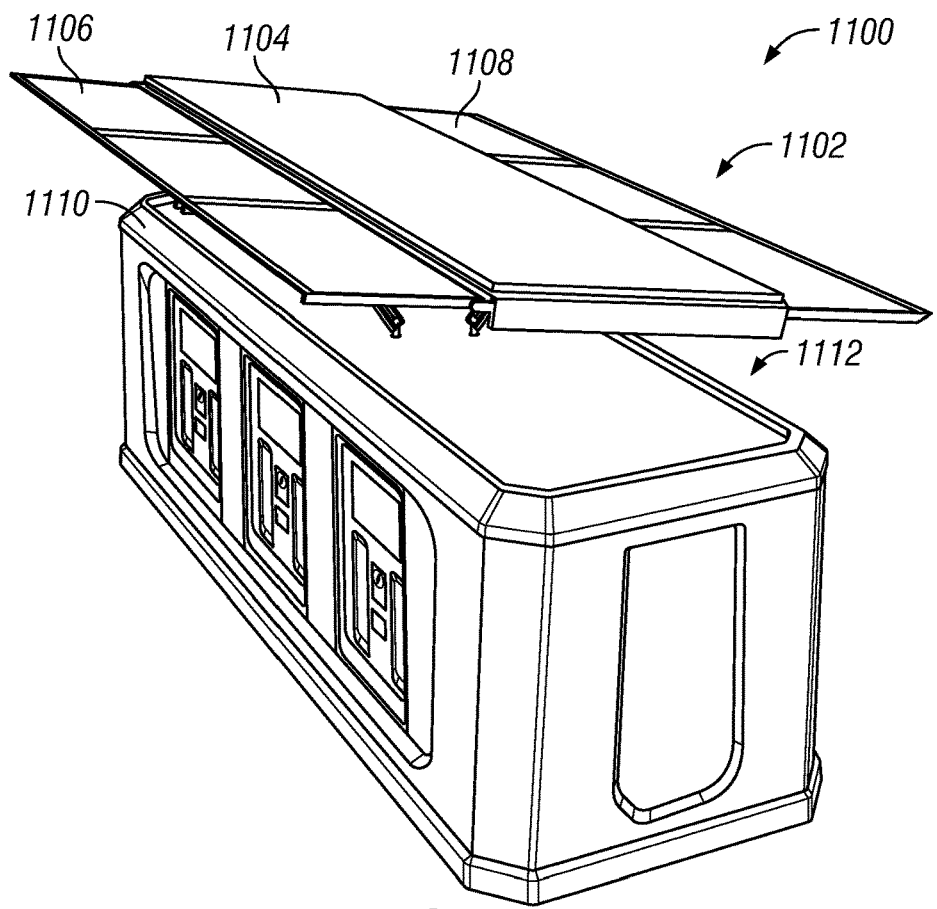
Figure 43:
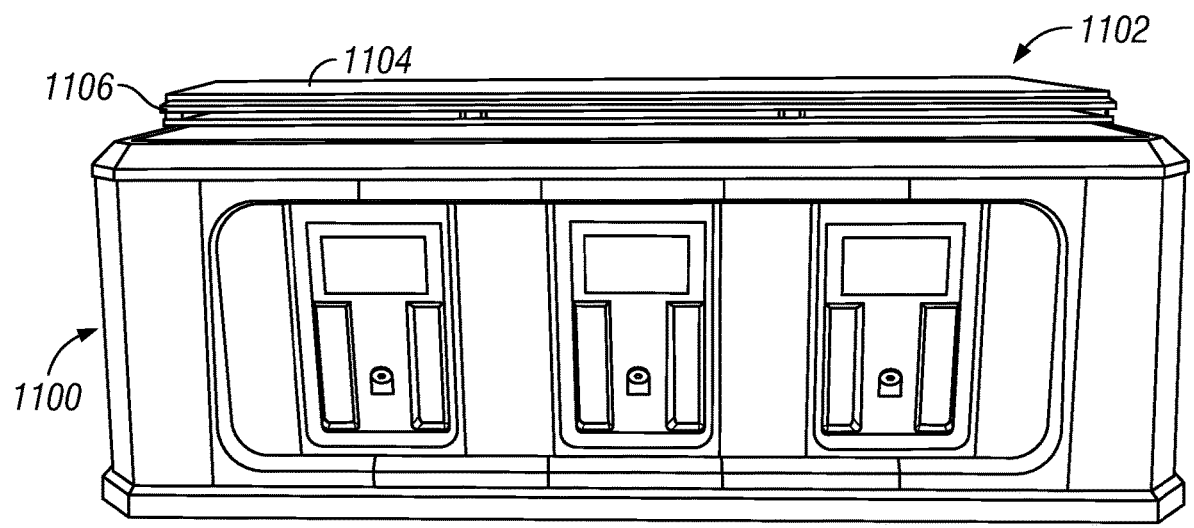
FIG. 43 is a side view of the example EV charging station shown in FIGS. 41-42 with the solar panel assembly in a retracted position.

FIGS. 41 and 42 illustrate an example EV charging station 1100 with a solar panel assembly 1102 mounted on top in an extended position while FIG. 43 illustrates the solar panel assembly 1102 in a retracted position. Similar to the solar panel assembly 410 shown in FIGS. 24 and 25, the solar panel assembly 1102 includes a central solar array 1104, a first side solar array 1106, and a second side solar array 1108. The central solar array 1104 includes an internal cavity dimensioned to receive the first side solar array 1106 and second side solar array 1108. The first side solar array 1106 and second side solar array 1108 are movable between an extended position (FIGS. 41-42) and a retracted position (FIG. 43).

In the retracted position, the first side solar array 1106 and second side solar array 1108 are received within the cavity of the central solar array 1104 and in the extended position, the first side solar array 1106 and second side solar array 1108 move transversely in opposite directions out of the central solar array 1104. For example, the central solar array 1104 may include one or more internal motors to move the first side solar array 1106 and second side solar array 1108 between the extended and retracted positions. The first side solar array 1106 and second side solar array 1108 may be retracted during transport and extended during energy harvesting sessions. As shown, the top of the EV charging station 1100 includes a recessed top portion defined by a lip 1110.

Figure 44:
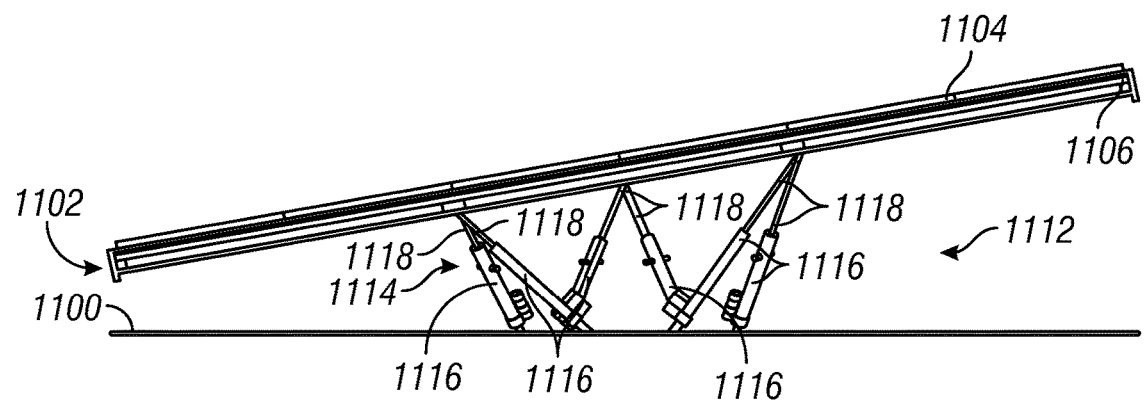
FIGS. 44-45 are side views of the solar panel assembly shown in FIGS. 41-43 with a base assembly that pivots the solar panel assembly into various positions to optimize energy harvesting.
Figure 45:
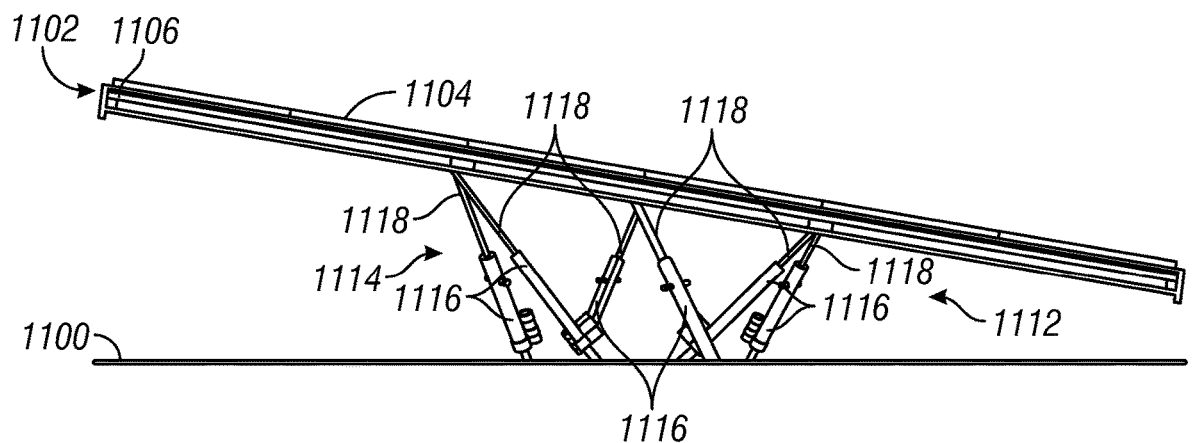
Figure 46:
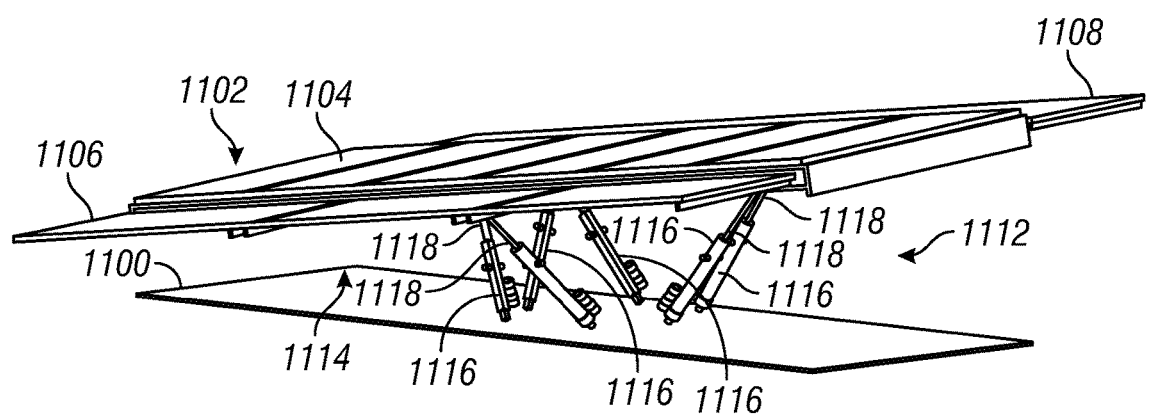
FIG. 46 is a perspective view of the example solar panel assembly shown in FIGS. 44-45 assembly in an extended position.

In some embodiments, the solar panel assembly 1102 is supported by an adjustable platform assembly 1112 that is configured to adjust the orientation of the solar panel assembly 1102 based on one or more parameters, such as time of day, atmospheric conditions, etc. to optimize solar energy harvesting. FIGS. 44-46 illustrate an embodiment of the adjustable platform assembly 1112 for adjusting orientation of the solar panel assembly 1102. In the embodiment shown, the adjustable platform assembly 1112 includes a plurality of hydraulic pistons 1114 that are electronically controllable to adjust the orientation of the solar panel assembly 1102. As shown, the hydraulic pistons 1114 include a hydraulic cylinder 1116 and a rod 1118 that is movable in and out of the hydraulic cylinder 1116. The position of the rod 1118 is electronically controllable in and out of the hydraulic cylinder 1116. As shown, the hydraulic cylinder 1116 is pivotally mounted to the top of the EV charging station 1100 while in and of the rod 1118 is pivotally connected to the solar panel assembly 1102. The connection points between the hydraulic cylinders 1116 in the top of the EV charging station 1100 are arranged to adjust orientation of the solar panel assembly 1102 so that it can be tilted in each direction (towards the front, back, left, right) to maximize energy harvesting. The connection points of the rods 1118 to the solar panel assembly 1102 is likewise arranged to adjust orientation of the solar panel assembly 1102 in each direction. Depending on which direction of tilting the solar panel assembly 1102, one or more of the rods 1118 could be moved in or out of their respective hydraulic cylinders 1116. Although this example shows six hydraulic pistons 1114, more or less hydraulic pistons could be provided depending on the circumstances. With this arrangement, in some circumstances, the solar panel assembly 1102 may be electronically controlled to be tilted in each direction based on the position of the sun and/or atmospheric conditions, among other possible parameters. For example, the solar panel assembly 1102 could be tilted approximately 30 degrees in each direction in some cases.

Figure 47A:
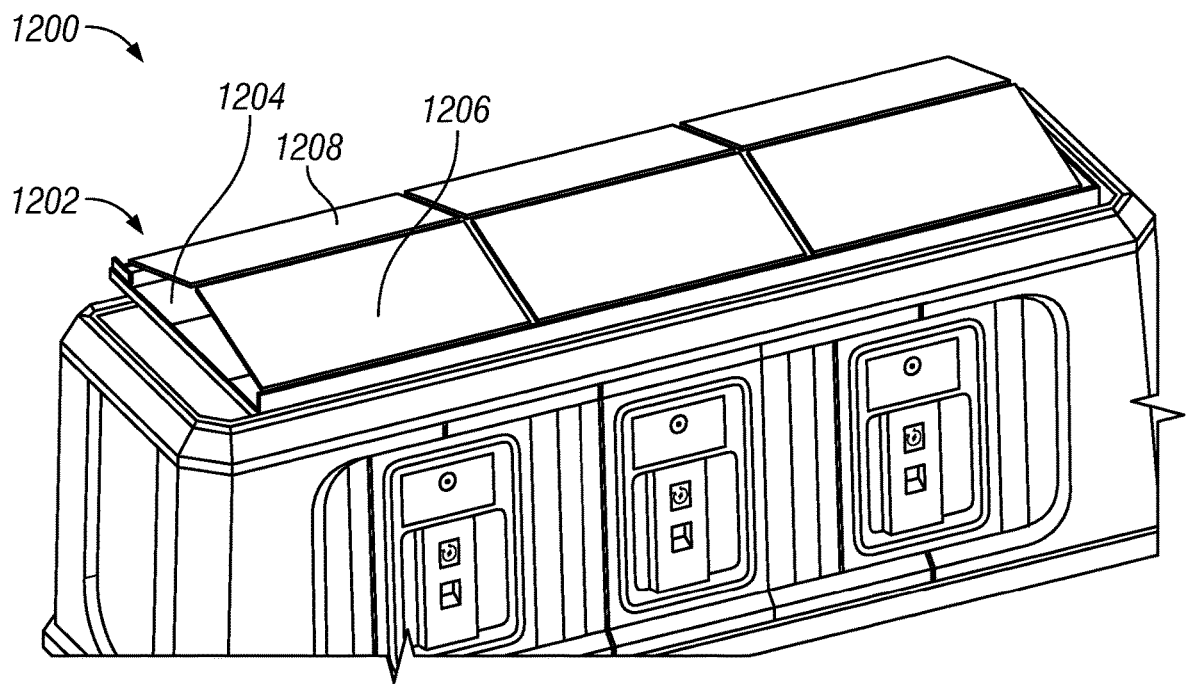
FIGS. 47A-47E is a series of progressive views showing a solar panel assembly according to another embodiment of this disclosure in which the solar panels pivot between extended and retracted positions.
Figure 47B:
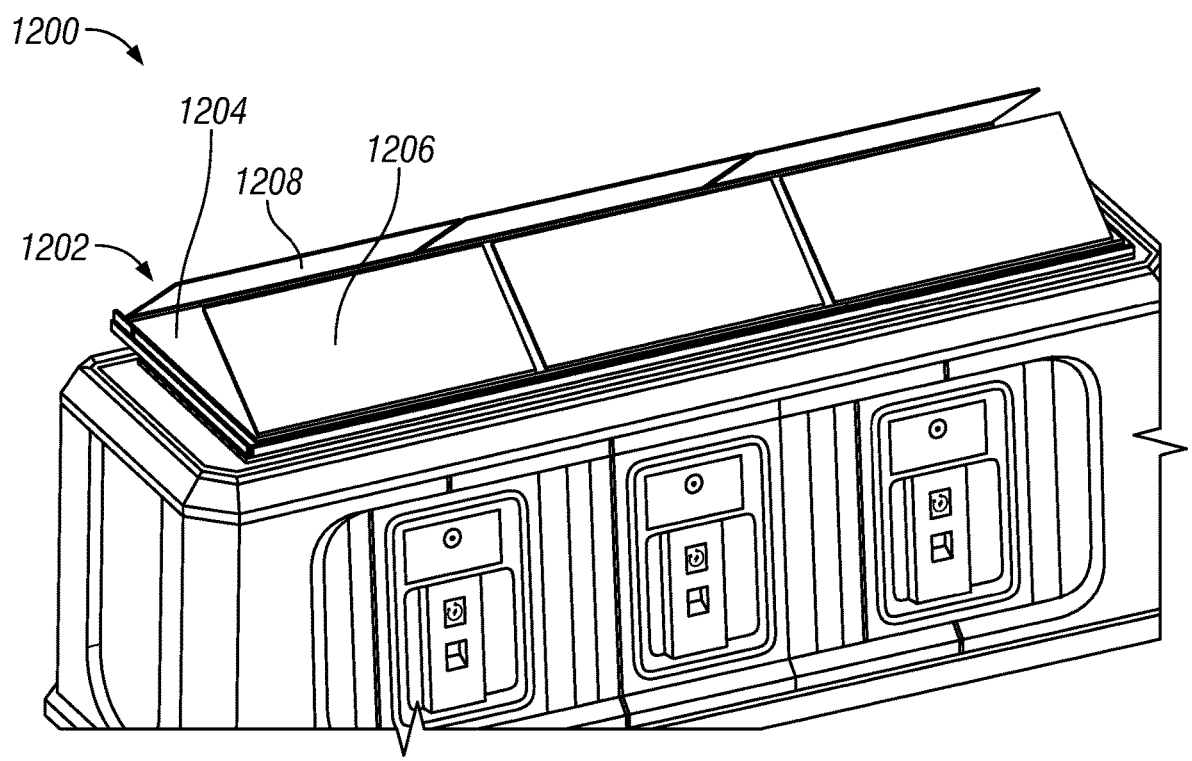
Figure 47C:
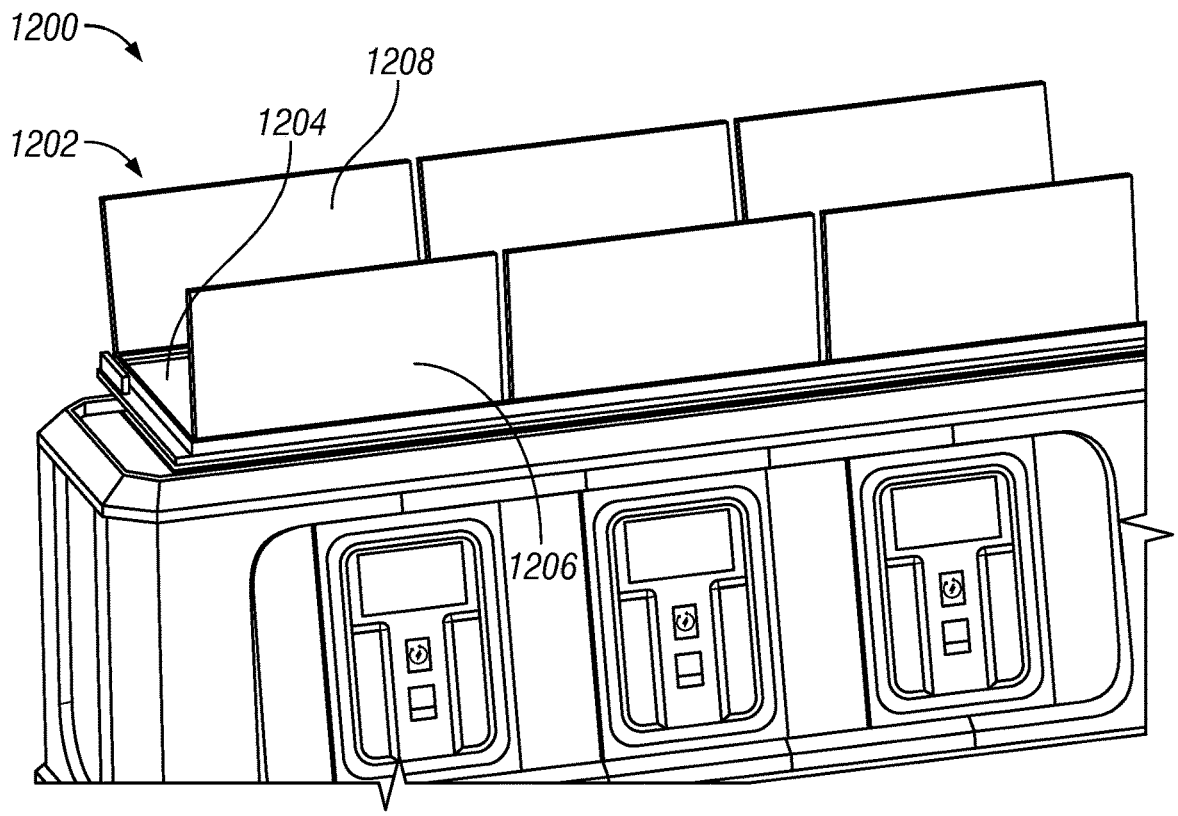
Figure 47D:
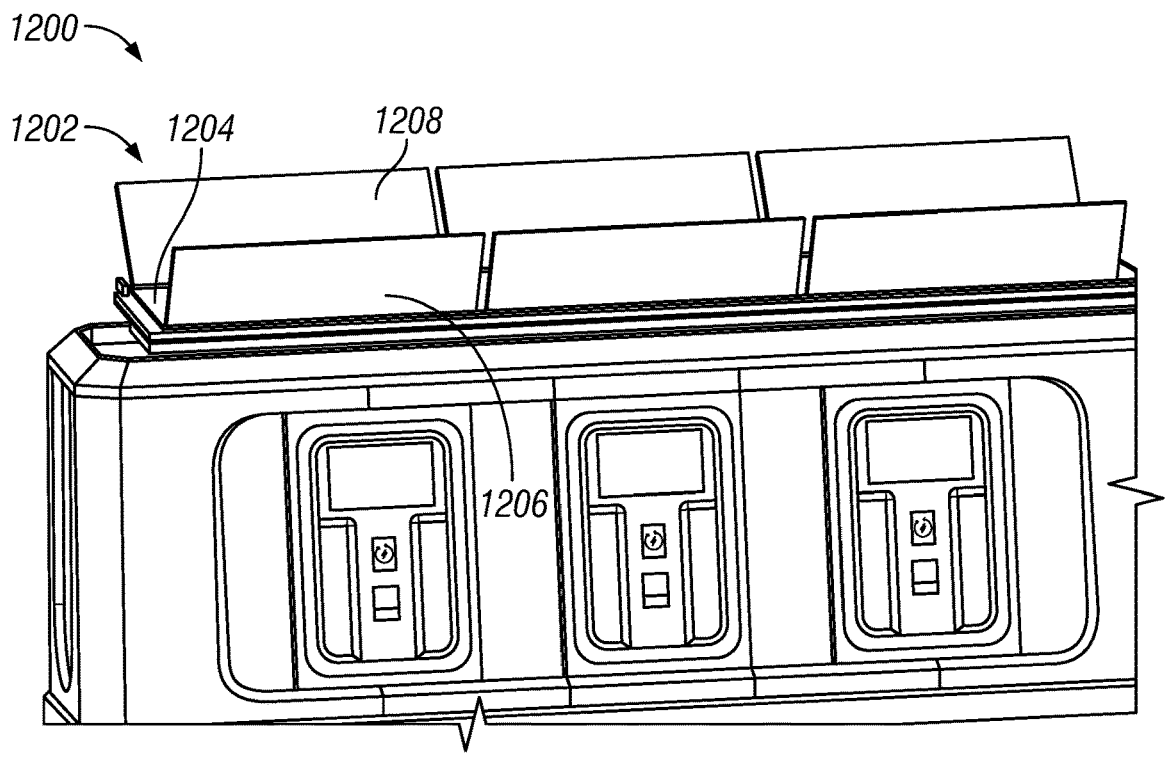
Figure 47E:
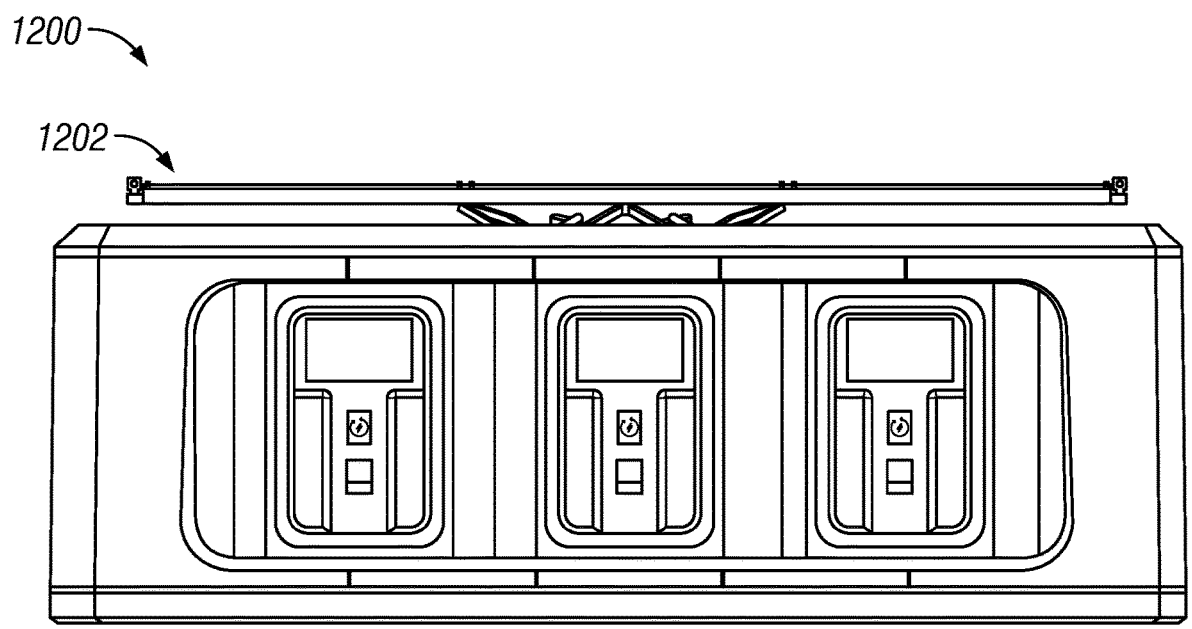

FIG. 47A-47E illustrate an EV charging station 1200 with a solar panel assembly 1202 according to another embodiment. FIGS. 47A-47E show a progression of the solar panel assembly 1202 moving from a retracted position in which the solar cells are protected to an extended position in which the solar cells are exposed for energy harvesting. In the example shown, the solar panel assembly 1202 includes a central solar panel portion 1204, a first side solar panel portion 1206, and a second side solar panel portion 1208. As shown, the first side solar panel portion 1206 and the second side solar panel portion 1208 are pivotable between a retracted position (FIG. 47A) and an extended position (FIG. 47E).

In the embodiment shown, the first side solar panel portion 1206 is pivotally connected to a first side of the solar panel assembly 1202 and the second side solar panel portion 1208 is pivotally connected to a second side of the solar panel assembly 1202. In this arrangement, the first side solar panel portion 1206 pivots about a longitudinal axis of the portion 1206 outwardly away from the second side solar panel portion 1208. When the first/second side solar panel portions 1206, 1208 are moved to the extended position, this exposes the solar cells for energy harvesting. When the first/second side solar panel portions 1206, 1208 are moved to the retracted position, the solar cells are adjacent to the central solar panel portion 1204 and protected from the elements or other items that may damage the solar panel assembly 1202 either when the EV charging station 1200 is stationary or in transit. This allows the solar panel surfaces to be covered while the EV charging station is in transit (retracted position) and exposed when stationary for energy harvesting (extended position).

Figure 48:
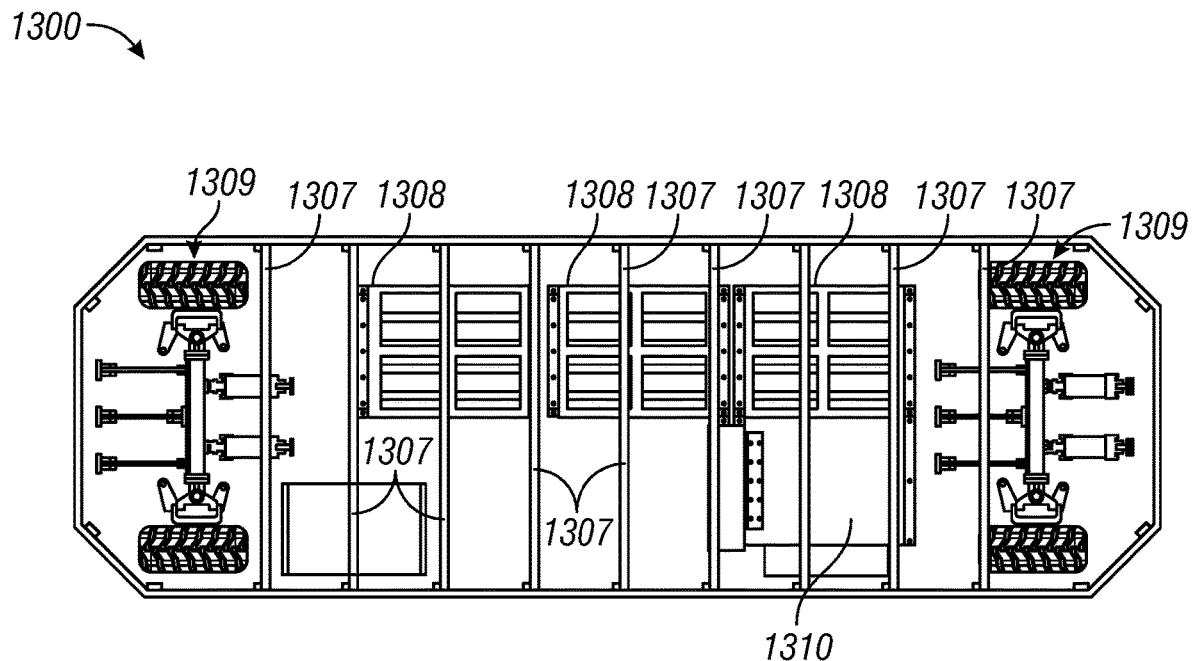
FIG. 48 is a top view showing an example EV charging station with panels removed to show interior structures according to an embodiment of this disclosure.
Figure 49:
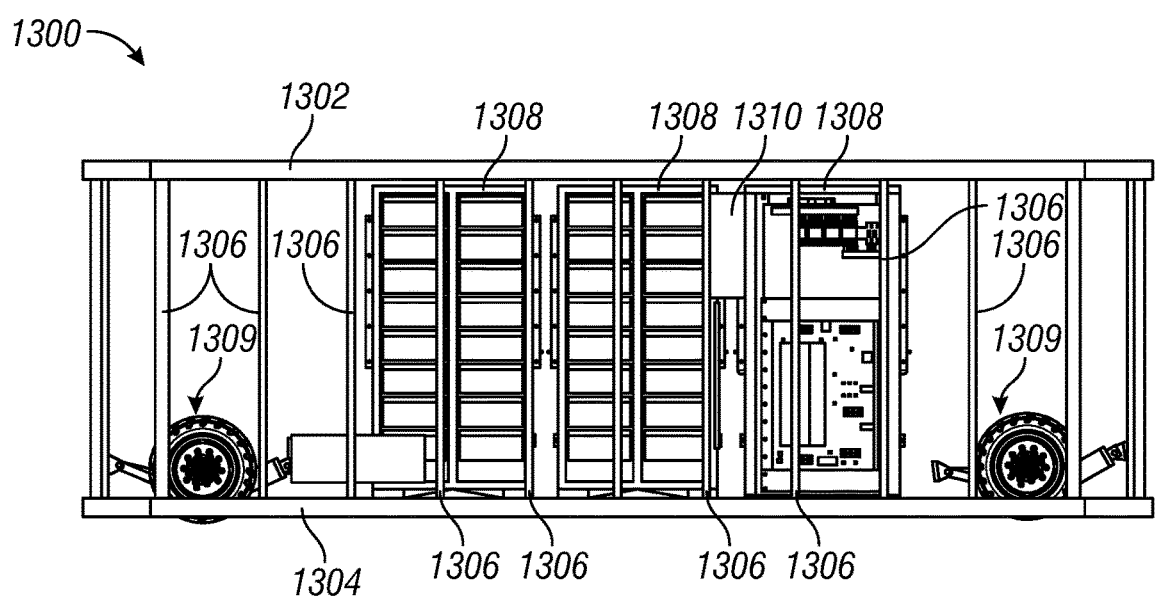
FIG. 49 is a side view of the example EV charging station shown in FIG. 48.
Figure 50:
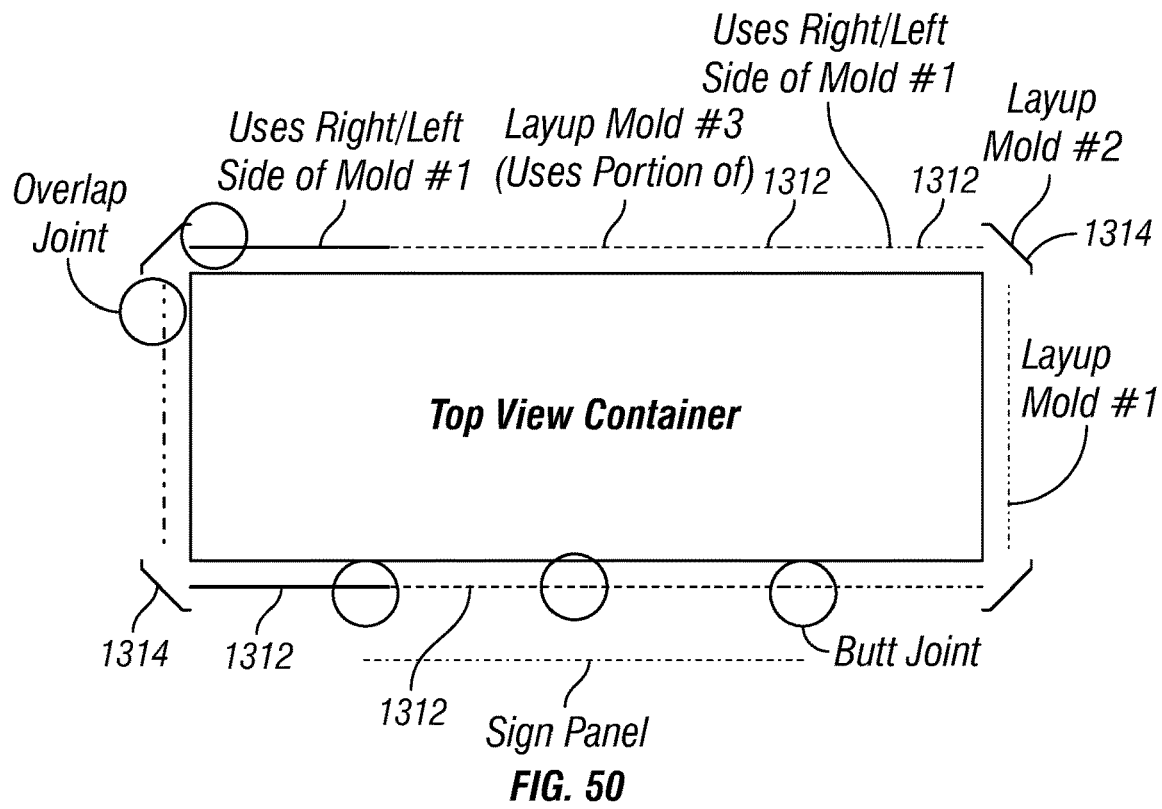
FIG. 50 is a top view of an example EV charging station with an example panel-based outer structure according to an embodiment of this disclosure.
Figure 51:
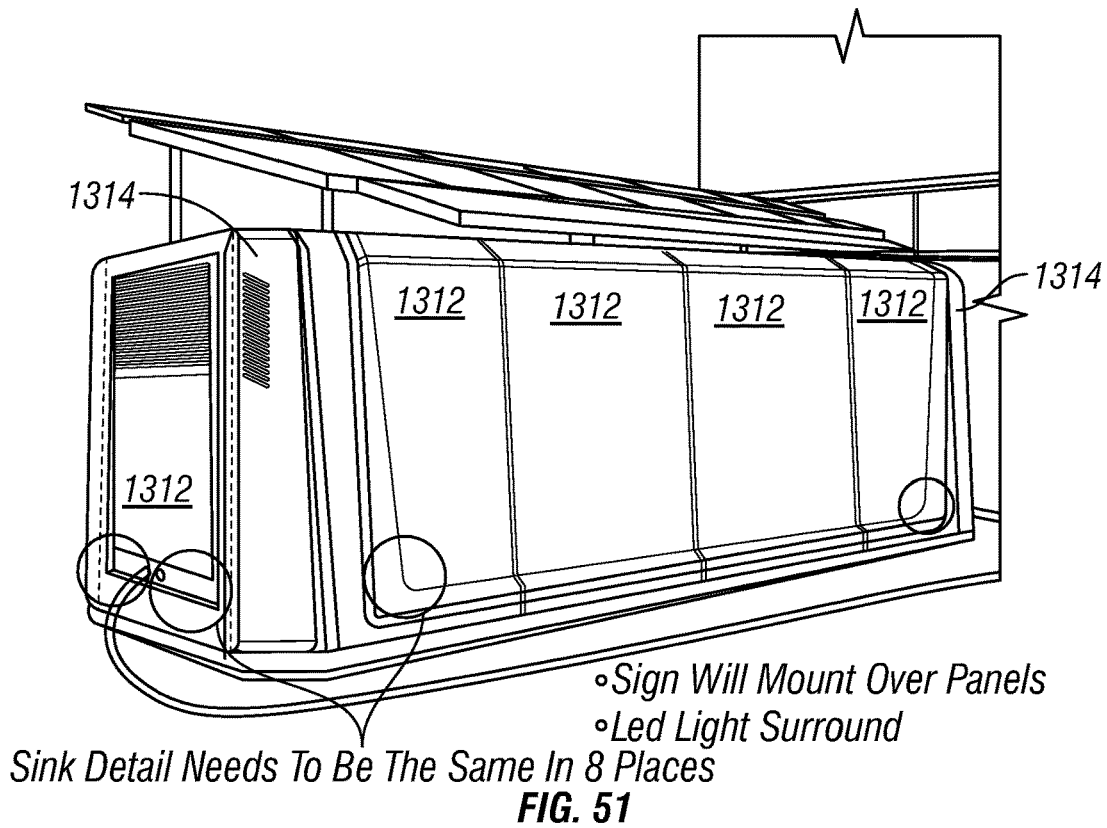
FIG. 51 is a perspective view of an example EV charging station with a panel-based outer structure according to an embodiment.
Figure 52:
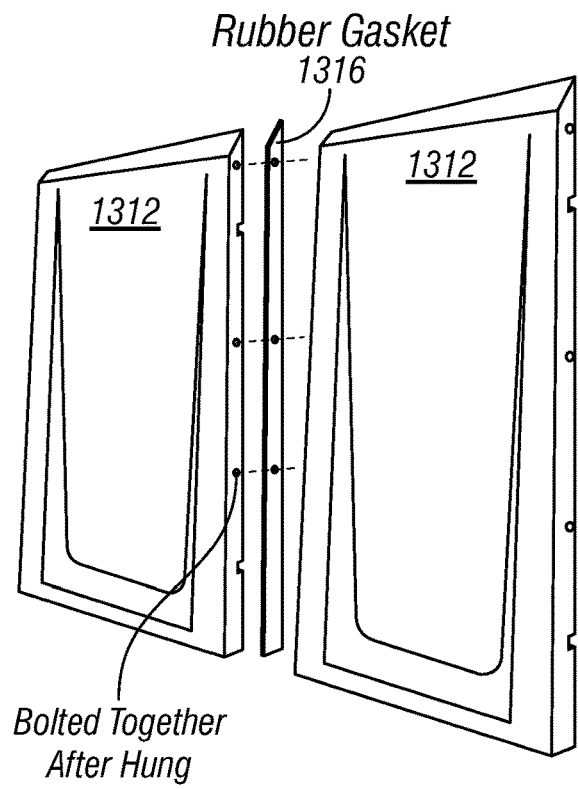
FIG. 52 is a exploded view of example panels used in the EV charging station shown in FIG. 51 according to an embodiment of this disclosure.
Figure 53:
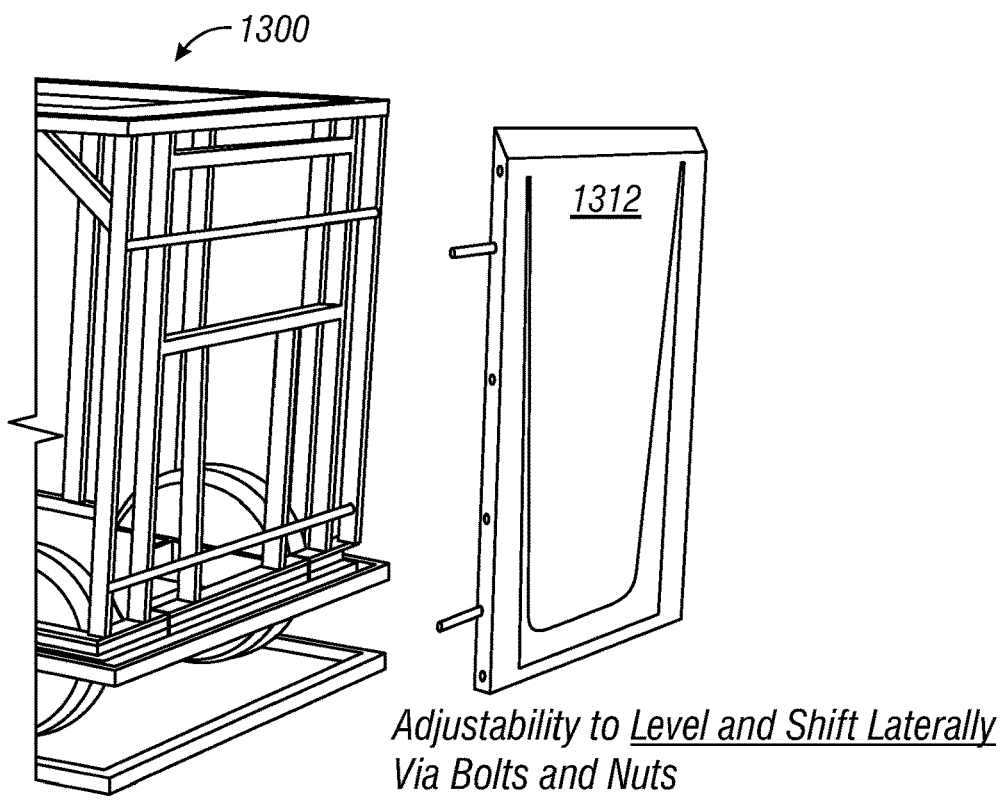
FIG. 53 is a exploded view of an example EV charging station with example panels and outer structure according to an embodiment of this disclosure.

FIGS. 48-49 illustrate an example frame structure 1300 and internal components of an EV charging station according to an embodiment of this disclosure. As shown, the frame structure 1300 defines an interior space to house internal components of the EV charging station, such as batteries 1308, control system 1310, etc. As shown, the frame structure 1300 includes an upper rail 1302 and a lower rail 1304 that extend approximately horizontally. The frame structure 1300 includes a plurality of vertically-oriented studs 1306 to define walls that extend between the upper rail 1302 and the lower rail 1304 and horizontally-extending studs 1307 to define a floor. There are a plurality of internal components within the frame structure 1300. For example, in the embodiment shown, there are front and rear wheels 1309 that are movable between extended position for self-driving and retracted position for stationary position. There are a plurality of racks of batteries 1308 that can store energy for charging electronic vehicles at the bays. In the example shown, there are three racks of batteries, but more or less racks could be provided depending on the circumstances. In some cases, battery racks 1308 could be sequentially charged as needed to provide energy for charging electronic vehicles. Depending on the circumstances, one rack of batteries 1308 could be charged while the other racks of batteries 1308 could be providing energy supply to the bays to charge electronic vehicles. In some cases, there is a control system 1310 for controlling one or more functions of the EV charging station described herein. Depending on the circumstances, the interior space housing the racks of batteries 1308 could be isolated for safety purposes so fire suppression systems that may remove oxygen from the area could be used in case of fire.

FIGS. 50-53 illustrate example panels that could be connected with the frame structure 1300 to form the exterior walls of the EV charging station. In the example shown, the panels include wall panels 1312 and corner panels 1314. In some embodiments, the panels 1312, 1314 may be formed from molded plastic, using one or more polymeric materials; in other embodiments, the panels 1312, 1314 could be formed of metal or other generally rigid materials. In some cases, one or more gaskets 1316 could be provided between panels 1312, 1314 to prevent water from infiltrating the interior of the EV charging station.

FIGS. 54-57 illustrate an example embodiment of an assembly for moving the wheels between the extended and retracted positions. For example, one or more hydraulic pistons 1322 could be used to raise and lower the frame structure 1300 between an extended position (FIG. 57) in which the wheels 1320 can be driven (for self-driving) and a retracted position (FIG. 56) in which the EV charging station is stationary. In the stationary position, the lower rails 1304 are supported by the ground, which acts as a barrier for anything to get beneath the EV charging station. This prevents animals and/or weather elements from getting underneath the EV charging station when it is in the stationary position for extended periods of time.

Figure 58:
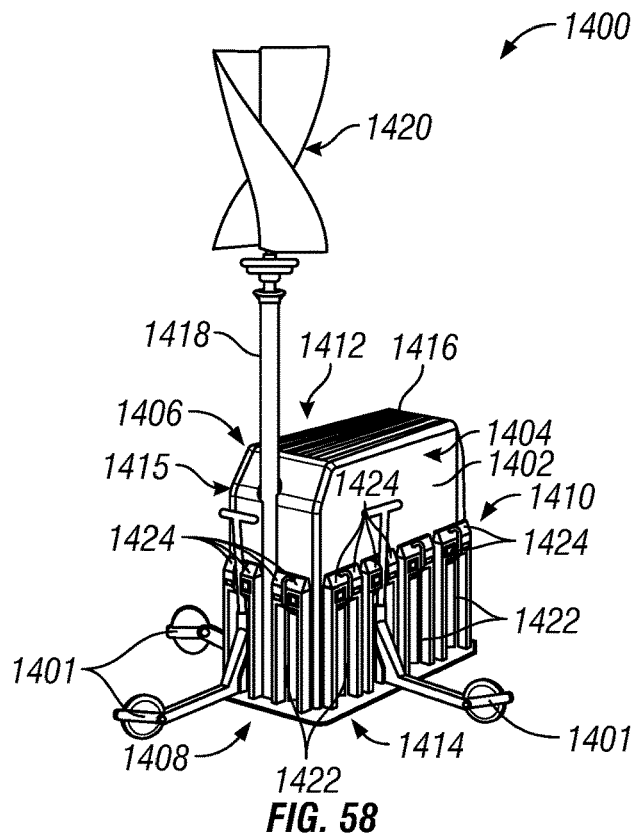
FIG. 58 is a perspective view of an example EV charging station for electronic scooters, bicycles and the like according to an embodiment of this disclosure.

FIG. 58 illustrates an example embodiment of an EV charging station 1400 for charging electronic scooters 1401, electronic bikes 1403 (FIG. 60), and the like. As shown, the EV charging station 1400 includes a frame 1402 with a front wall 1404, a rear wall 1406, a left wall 1408, a right wall 1410, a top wall 1412, and a bottom wall 1414. There is a batteries receiving portion 1415 dimensioned to receive internal batteries (not shown) for charging the scooters, bikes, etc. In the embodiment shown, the batteries receiving portion 1415 forms approximately the top half of the frame 1402 and positions the batteries (not shown) in an elevated position above the recessed areas 1422 that receive the front wheels of the scooters, bikes, etc. The EV charging station 1400 may include one or more of the components and environments of an EV charging station 100.

In the embodiment shown, a solar panel 1416 is mounted to the top wall 1412, which can be used to harvest solar energy to charge the batteries (not shown) within the frame 1402. As shown, a pole 1418 extends a wind turbine 1420 above the top wall 1412 of the EV charging station 1400. Although this example shows the pole 1418 mounted to the left wall 1408 of the frame 1402, the pole 1418 could be mounted to the front wall 1404, the rear wall 1406, or the right wall 1410. As shown, the left wall 1412 includes a recessed slot dimensioned to receive the pole 1418. The wind turbine 1420 is configured to harvest wind energy to charge the batteries (not shown) within the frame 1402, and in the embodiment shown, is in an elevated position due to the pole 1418 to optimize potential air flow for energy harvesting. In some embodiments, as discussed herein, the wind turbine 1420 could be embodied as a "Flower Turbine" by Flower Turbines LLC in the U.S. and Leviathan Energy Wind Lotus, Ltd. in Israel.

Although the embodiment shown in FIG. 58 includes a single wind turbine 1420, more than one wind turbine 1420 could be provided depending on the wind harvesting goals of the charging station 1400. For example, depending on the circumstances, a second wind turbine could be mounted to the right wall 1410 (or other walls) to increase wind energy harvesting capabilities. More than two wind turbines could be provided depending on the circumstances. Although the solar panel 1416 and wind turbine 1420 are shown as example energy harvesting devices, other types of energy harvesting devices, such as RF, thermal, piezoelectric, or other types of energy harvesting could be used to charge the batteries. In some cases, depending on the circumstances, the charging station 1400 may include an A/C power inlet port to plug into grid power for charging the batteries.

In some embodiments, one or more of the walls 1404, 1406, 1408, 1410 include openings to a plurality of recessed areas 1422 each dimensioned to receive at least a portion of the front wheel of the scooter, bike, etc. For example, the width of each recessed area 1422 may be dimensioned to correspond with a maximum width of a scooter or bike tire to which the EV charging station 1400 is configured to accommodate. Likewise, the height of the recessed area 1422 may be dimensioned to correspond with a maximum height of the scooter or bike tire to which the EV charging station 1400 is configured to accommodate. Depending on the circumstances, one or more proximity sensors may be within the recessed areas 1422 to detect when a scooter or bike is inserted into the respective recessed areas 1422. This detection could potentially trigger a variety of actions, such as prompting for payment, providing instructions for charging, turning on a light, providing entertainment (e.g., on an optional monitor or speaker(s)), etc.

In the embodiment shown, the frame 1402 includes extended portions 1424 surrounding each of the recessed areas 1422. In some cases, for example, the extended portions 1424 are dimensioned to receive a portion of the scooter or bike's frame, which reduces lateral movement of the scooter or bike. Depending on the circumstances, the extended portions 1424 may include a payment processing device, such as a credit card device.

The EV charging station 1400 includes a plurality of connectors for connecting electric scooters and/or bikes. For example, a connector could be associated with each of the recessed areas 1422. There could be multiple types of connectors provided depending on the circumstances to connect with different types of electronic scooters and/or bikes. Depending on the circumstances, the EV charging station 1400 may be configured with an authentication system, which allows charging to be turned on/off. For example, the authentication system could include payment processing, which turns on charging and charges the user's credit card or other account. In some cases, the energy could be free for users to charge without any authentication system.

Figure 59:
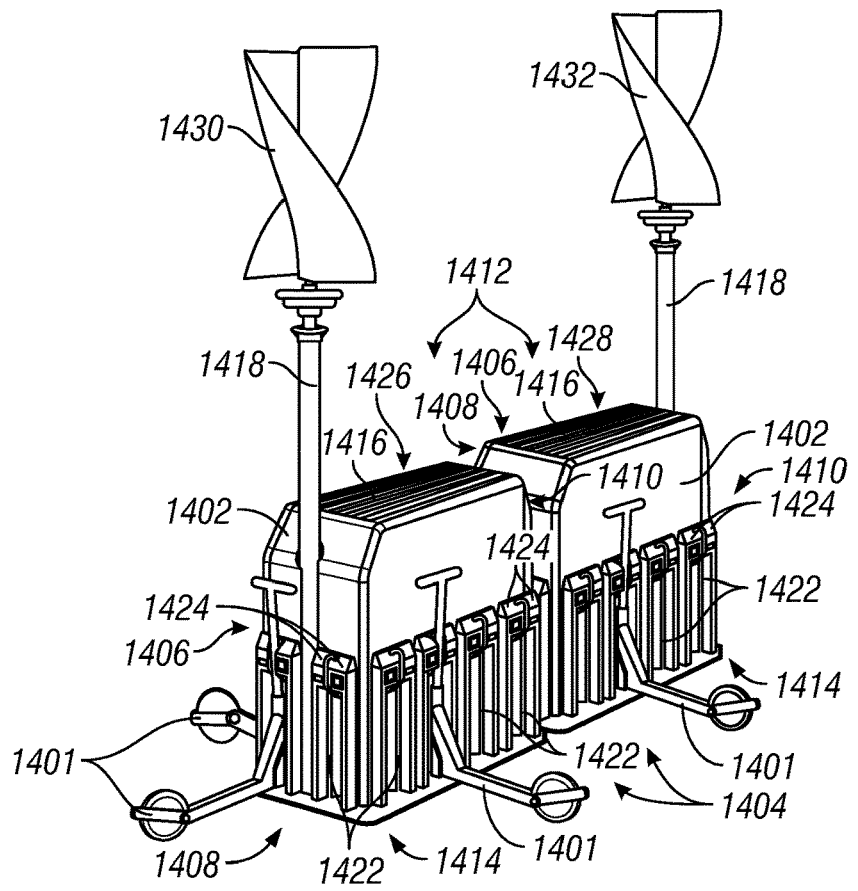
FIG. 59 is a perspective view of two EV charging stations from FIG. 58 shown end-to-end according to an embodiment of this disclosure.

Referring now to FIG. 59, there is shown a first charging station 1426 and a second charging station 1428, which are embodied similar to the EV charging station 1400. In the embodiment shown, the first charging station 1426 and the second charging station 1428 are arranged end-to-end with each having a wind turbine 1430, 1432, respectively, on opposing ends, but other arrangements are possible. Depending on the circumstances, each of the charging stations 1426, 1428 could be stand-alone units. In some cases, the charging stations 1426, 1428 could be electrically connected. For example, the charging stations 1426, 1428 could be configured to provide power to the other charging station 1426, 1428 depending on battery power levels. For example, if the batteries in charging station 1426 have a low charge level, the charging station 1428 could provide power to charge a scooter or bike connected to the charging station 1426, and vice versa.

Figure 60:
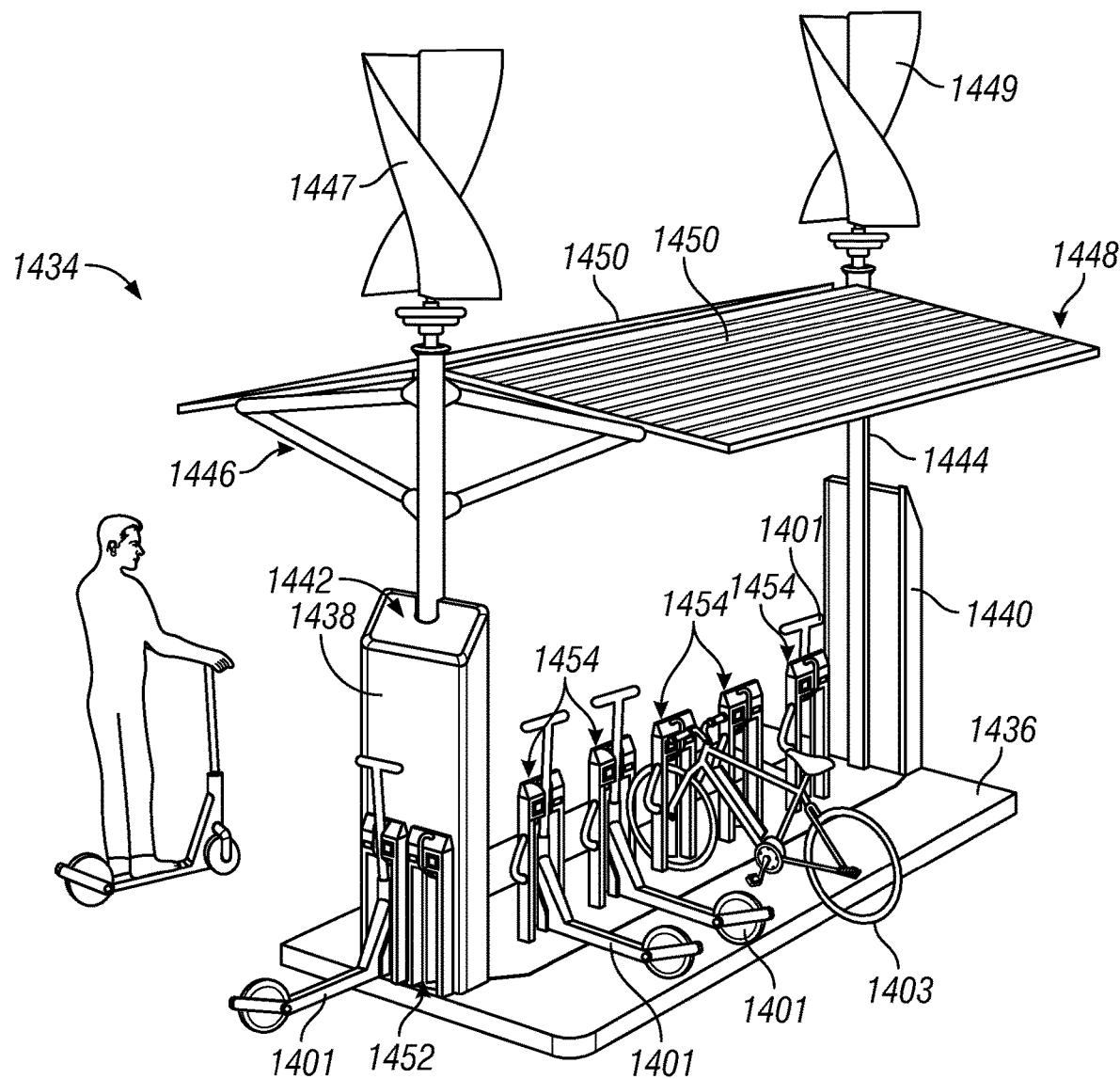
FIG. 60 is a perspective view of an example EV charging station for electronic scooters, bicycles and the like according to an embodiment of this disclosure.

FIG. 60 illustrates an EV charging station 1434 for electric scooters 1401 and/or electronic bikes 1403 according to another embodiment. In the example shown, the EV charging station 1434 includes a platform 1436 onto which other components may be connected and/or supported. In some embodiments, the platform 1436 may include one or more internal cavities for holding one or more batteries for charging electric bikes and/or scooters and/or other electric items. As shown, a first battery holding frame 1438 extends from a first end of the platform 1436 and a second battery holding frame 1440 extends from an opposing end of the platform 1436. In the embodiment shown, the battery holding frames 1438, 1440 longitudinally extend along an approximately vertical axis. Typically, batteries for charging the electronic scooters 1401 and/or bikes 1403 are housed within the batteries holding frames 1438 and are electrically connected with charging bays for charging the electronic scooters 1401 and/or bikes 1403. Depending on the circumstances, one or more batteries may also be positioned in other areas of the charging station 1434, such as the platform 1436.

In the embodiment shown, each of the battery holding frames 1438, 1440 includes a longitudinally extending recessed area dimensioned to receive at least a portion of respective poles 1442, 1444. As shown, the poles 1442, 1444 hold respective wind turbines 1447, 1449 in an extended position suspended above the platform 1436. In the example shown, there is a support structure 1446 extending laterally from the poles 1442, 1442 for suspending a roof structure 1448 above the platform 1436 for sheltering the platform 1436 from the weather elements. In the embodiment shown, the roof structure 1448 includes one or more solar panels 1450 for harvesting solar energy to charge the batteries of the EV charging station 1434.

In the example shown, the batteries holding frames 1438 include charging bays with openings 1452 for receiving a portion of the electric scooters 1401 and/or bikes 1403 to be charged. Additionally, as shown, there are a plurality of charging bays 1454 between the battery holding frames 1438, 1440 for charging electric scooters and/or bikes. Although there are five charging bays 1454 between the battery holding frames 1438, 1440 shown in the example, there could be more than five charging bays or less than five charging bays depending on the circumstances.

Figure 61:
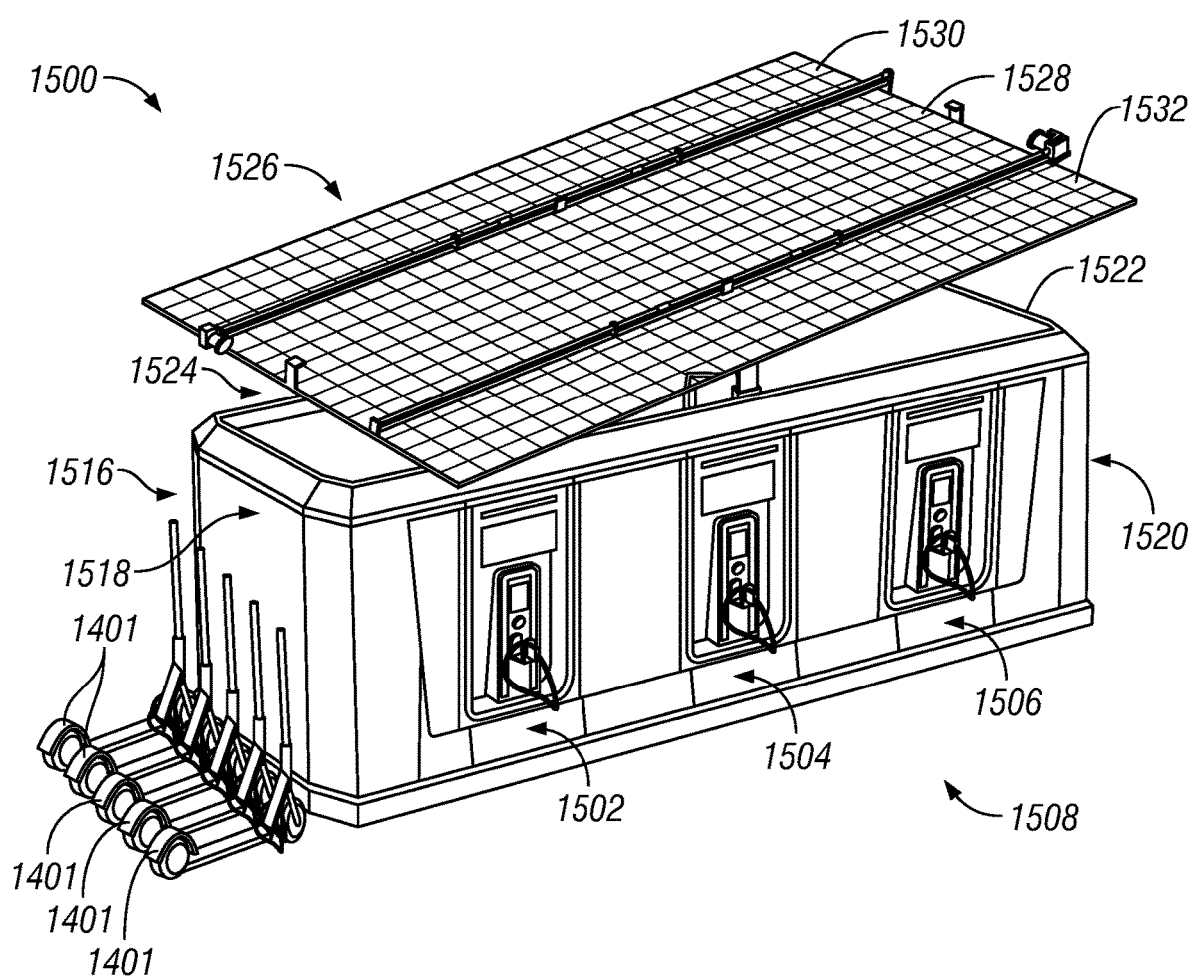
FIGS. 61-62 are perspective views of an example EV charging station that may accommodate charging of both electronic vehicles and electronic scooters, bicycles or the like according to an embodiment of this disclosure.
Figure 62:
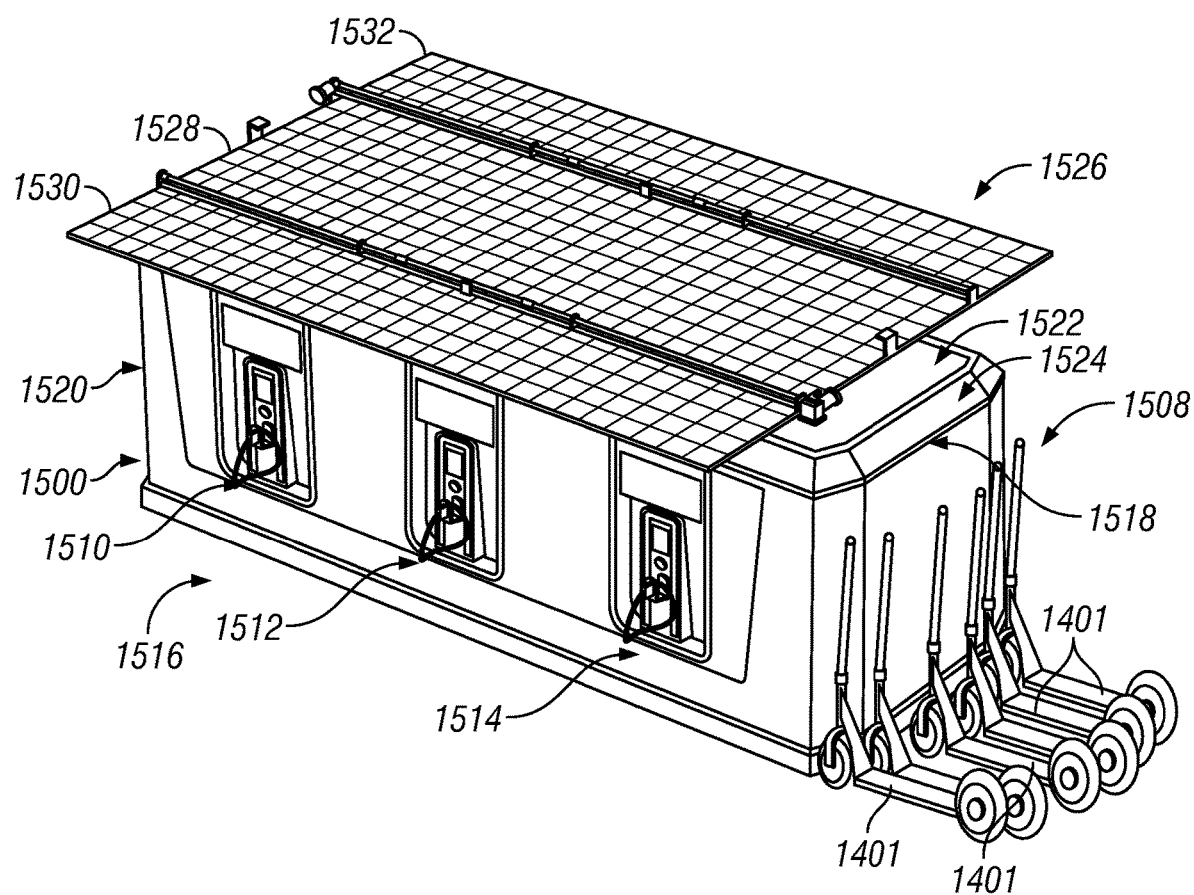

FIGS. 61 and 62 show an example EV charging station 1500 according to an embodiment of this disclosure. In the example shown, there is an EV charging station 1500 similar to EV charging stations 100, 400, 500, 900. In this embodiment, the EV charging station 1500 includes three charging bays 1502, 1504, 1506 on a first side 1508 and three charging stations 1510, 1512, 1514 on a second side 1516. Although three charging stations are shown on each side for purposes of example, more or less charging stations could be provided depending on the circumstances.

In the embodiment shown, the charging station 1500 includes a first end 1518 and a second end 1520. As shown, there are a plurality of electronic scooters 1401 parked near the first end 1518 that could be charged with chargers at one or more of the charging stations 1502, 1504, 1506, 1510, 1512, 1514. Depending on the circumstances, the charging station 1500 could include openings similar to the EV charging stations 1400, 1434 for receiving electronic scooters and/or bikes and/or auxiliary chargers for the electronic scooters and/or bikes.

In the example shown, the EV charging station 1500 includes a roof 1522 onto which a support structure 1524 is mounted for selectably adjusting the position of one or more solar panels 1526 for harvesting solar energy for recharging the batteries of the EV charging station 1500. For example, the support structure 1524 could be manually and/or electronically adjusted to maximize the energy harvesting. For example, the support structure 1524 could be controlled based on weather conditions and/or time of day to tilt and/or rotate and/or otherwise adjust positioning of the solar panels 1526 to optimize solar harvesting.

In some cases, the solar panels 1526 could be moved between an extended position, such as shown in FIGS. 61 and 62, and a retracted position to fit within the envelope of the roof 1522, such as for transport. In the example shown, the solar panels 1526 include a central panel 1528, a first side panel 1530 and a second side panel 1532. In some cases, the central panel 1528 is dimensioned to be equal to or less than the envelope dimensions of the roof 1522. For example, the solar panels 1526 could be transported in the retracted position with the same width as the EV charging station 1500, but can be widened in an expanded position to have more surface area for solar energy harvesting. Depending on the circumstances, the side panels 1530, 1532 may pivot between the retracted and extended positions. For example, as discussed herein, the side panels 1530, 1532 may pivot about a longitudinal axis of the side panels 1530, 1532. Depending on the circumstances, the side panels 1530, 1532 could telescope between extended and retracted positions.

Figure 63:
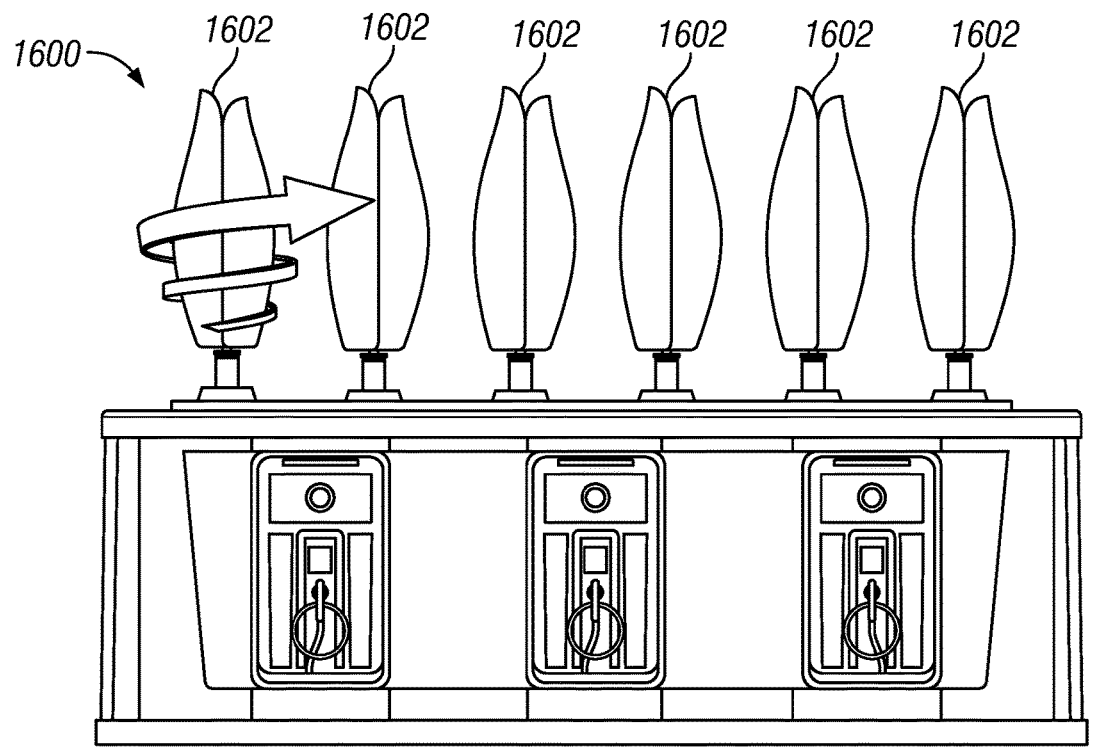
FIG. 63 is a side view of an example EV charging station with a plurality of wind turbines for recharging station's batteries according to an embodiment of this disclosure.

FIG. 63 illustrates an example EV charging station 1600 similar to EV charging stations 100, 400, 500, 900, 1500. In the example shown, there are a plurality of wind turbines 1602 mounted on the roof of the EV charging station 1600 to harvest energy to charge batteries of the EV charging station 1600. Although six wind turbines are shown for purposes of example, more or less wind turbines could be provided depending on the circumstances. As discussed herein with respect to other embodiments, the wind turbines 1602 could be embodied as a "Flower Turbine" by Flower Turbines LLC in the U.S. and Leviathan Energy Wind Lotus, Ltd. in Israel.

Figure 64:
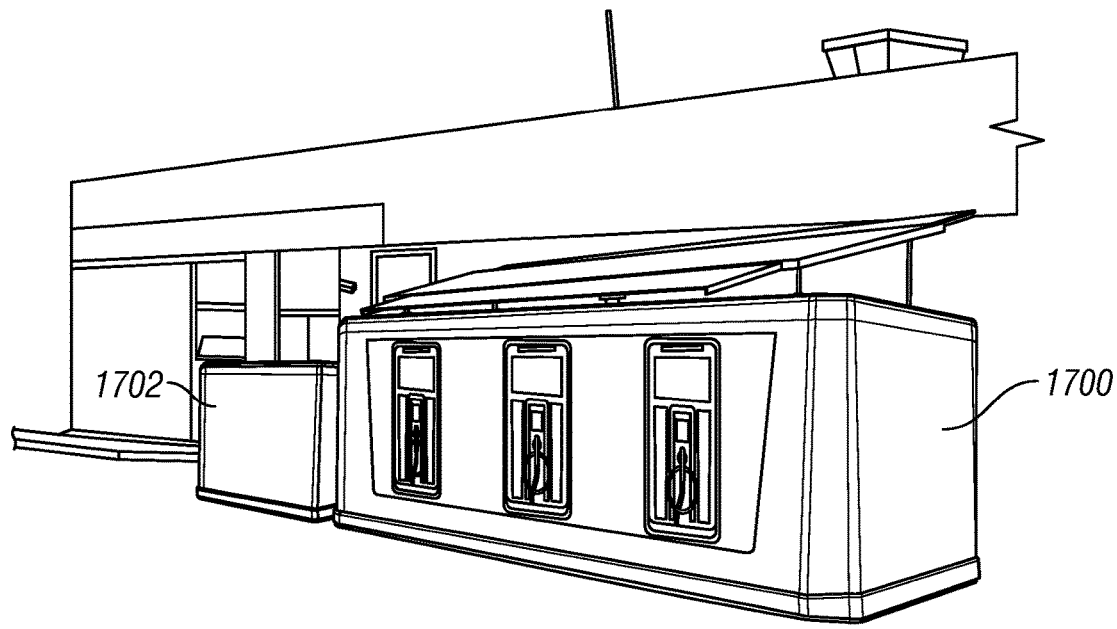
FIG. 64 is a perspective view of an example EV charging station with the station's batteries being recharged with nitrogen cell
Figure 65:
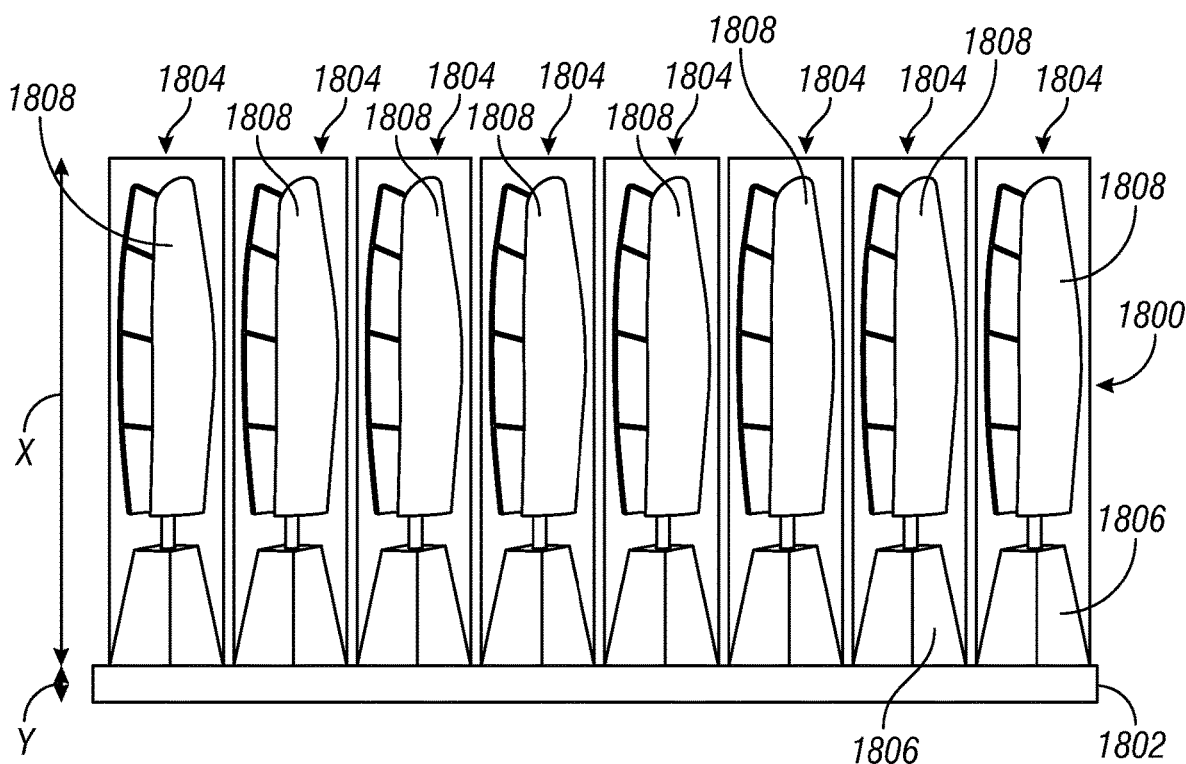
FIG. 65 is a side of view of an example wind turbine assembly according to an embodiment of this disclosure.

FIG. 64 illustrates an example EV charging station 1700 similar to EV charging stations 100, 400, 500, 900, 1500. In the example shown, there is a nitrogen cell 1702 provided to charge batteries of the EV charging station 1700. As discussed herein, there are numerous ways to charge the batteries in the EV charging stations discussed herein. As shown, a nitrogen cell 1702 could be one way of charging the batteries of the EV charging station 1700.

FIGS. 65-67B illustrate an embodiment of a wind turbine assembly 1800 that could be mounted or placed on the roof of an EV charging station 1801 (FIG. 67B) to harvest energy for charging the station's batteries. In the example shown, the wind turbine assembly 1800 includes a platform 1802 on which a plurality of turbines 1804 are carried or mounted. Typically, the platform 1802 is dimensioned corresponding with the roof of the EV charging station 1802 so that the wind turbine assembly 1800 can be received by the station's roof.

Figure 66:
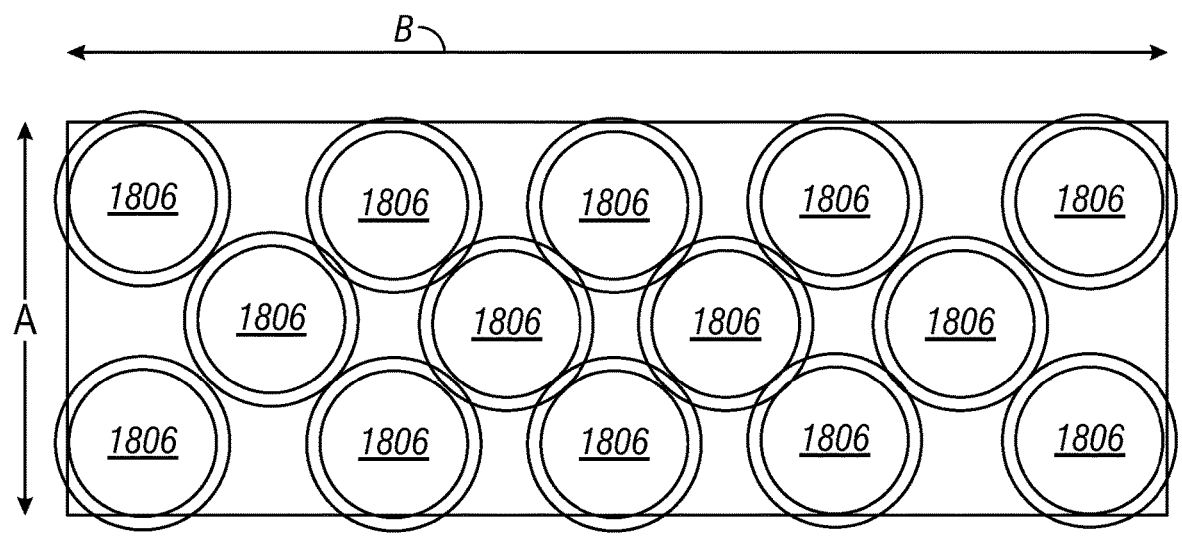
FIG. 66 is a top view of the example wind turbine assembly shown in FIG. 65.

In some embodiments, the plurality of turbines 1804 are spatially arranged to be densely packed on the platform 1802 to accommodate as many turbines as possible. For example, in some cases, the plurality of turbines 1804 may be arranged in a plurality of rows along a longitudinal axis of the platform 1802. In the embodiment shown, each of the plurality of turbines 1804 include a fixed base 1806 and a blade 1808 extending upwardly from the fixed base 1806. In the example shown in FIG. 66, there is shown an arrangement of densely packed fixed bases 1806 on the platform 1802. Although the example in FIG. 66 shows the fixed bases 1806 as being approximately circular in shape, the fixed bases 1806 could be a multiplicity of various shapes, such as an ellipse, polygon, or other shape. As shown, the blade 1808 rotates approximately about a substantially-vertical axis that is substantially perpendicular with the platform 1802. In the example shown, the platform 1802 may have an approximately six inch (approximately 15.25 cm) height, which is shown by line X in FIG. 65, while the plurality of turbines 1804 may have a height of approximately 115 inches (approximately 292 cm), which is represented by line Y in FIG. 65. In some embodiments, the platform 1802 may be approximately rectangular in shape and have a size of approximately 8 feet and 7 inches (approximately 261.6 cm), which is represented by line A, by 24 feet (approximately 731.5 cm), which is represented by line B. Of course, the exact dimensions of the various components for the wind turbine assembly 1800 could vary depending on the circumstances. For example, the size of the platform 1802 could vary based on the size of the roof.

Figure 67A:
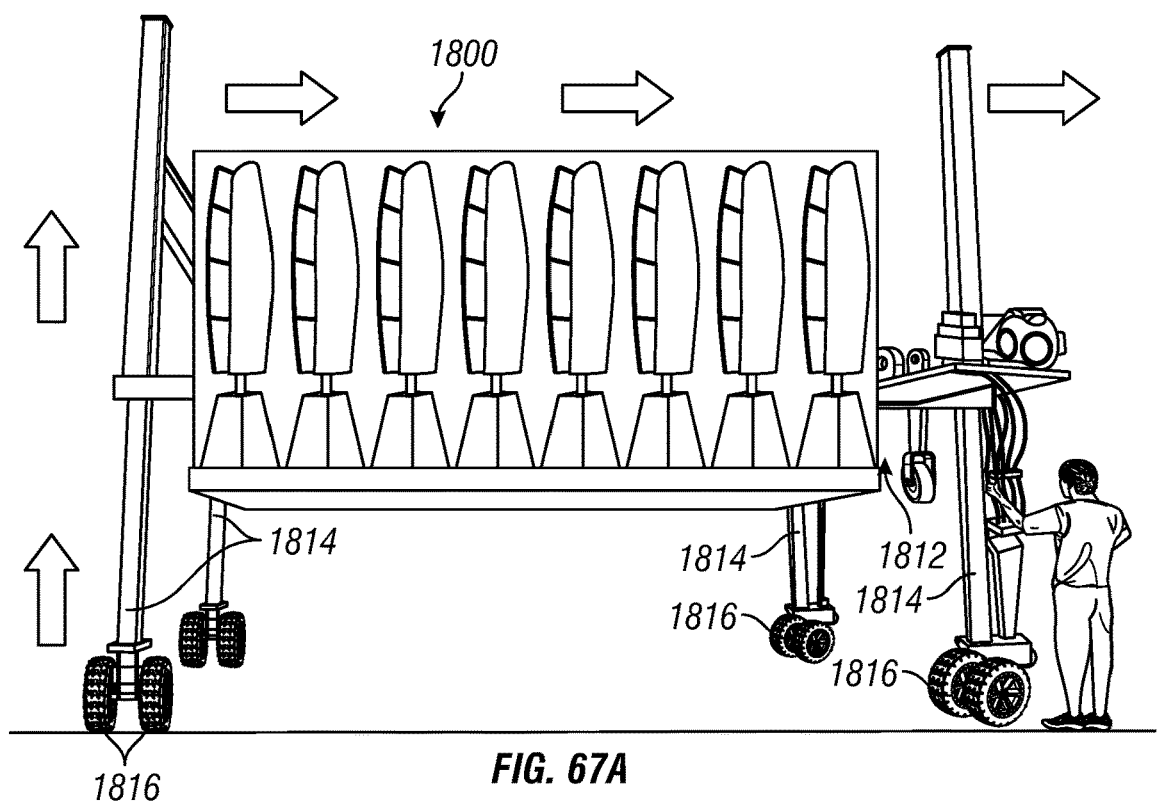
FIGS. 67A-67B are side views of the wind turbine assembly shown in FIG. 65 being transported with a turbine transport apparatus in a raised position to be placed on a roof of a EV charging station.
Figure 67B:
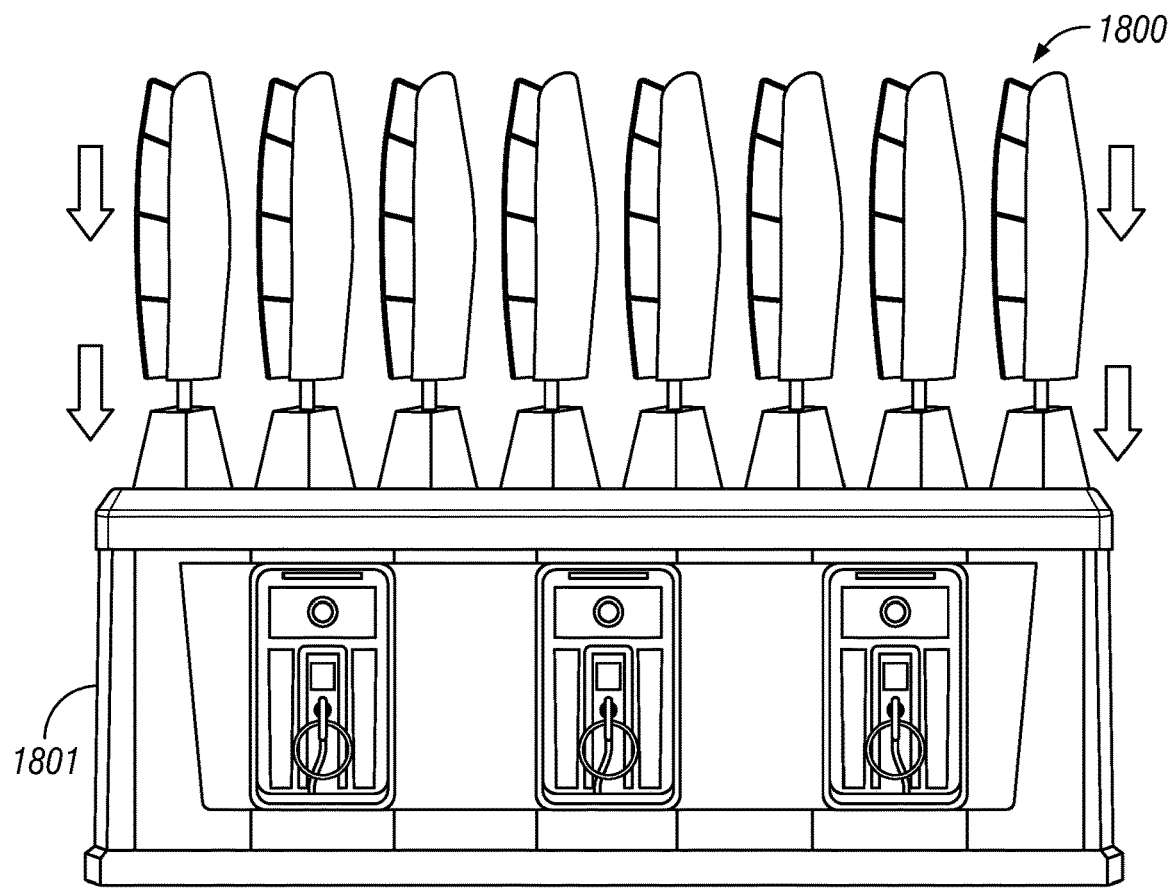

Referring to FIGS. 67A-67B, there is shown that the wind turbine assembly 1800 may be transported separately (depending on the circumstances) from the EV charging station 1801 and placed on the station's roof using a turbine transport apparatus 1810. The wind turbine assembly 1800 may be placed on turbine transport apparatus 1810, which is configured to elevate the wind turbine assembly 1800 to a position above the roof of the EV charging station 1801.

In the example shown, wind turbine transport apparatus 1810 includes a loading platform 1812 configured to receive the wind turbine assembly 1800 and raise/lower the wind turbine assembly 1800 above the ground. Typically, the loading platform 1812 is movable between a lowered position in which the wind turbine assembly 1800 is on the ground or other transport surface and a raised position that is as high or higher than the roof of the EV charging station 1802. In the example shown, the turbine transport apparatus 1810 includes a plurality of vertical lift devices 1814, such as pneumatic or hydraulic lifts, for moving the loading platform 1812 between the lowered and raised positions. For example, an electronic control device could control movement of the vertical lift devices 1814 between raised and lowered positions.

As shown, the vertical lift devices 1814 extend from one or more wheels 1816 to allow the turbine transport apparatus 1810 to move on the ground or other surface. Depending on the circumstances, the wheels 1816 could allow movement of the turbine transport apparatus 1810 by manually pushing, such as with a person exercising a force on the apparatus 1810, or a machine, such as a forklift pushing the apparatus 1810. In some circumstances, one or more of the wheels 1816 could be associated with one or more motors for driving the wheels 1816. In this manner, a wireless controller, such as a wireless joystick, could be used to maneuver the turbine transport apparatus 1810 between a transport vehicle and the EV charging station 1802 Regardless of how the turbine transport apparatus 1810 is moved, the wind turbine assembly 1800 would be suspended over the roof of the EV charging station 1802, and then the vertical lift devices 1814 would be lowered to place the wind turbine assembly 1800 on the roof of the EV charging station 1802. Accordingly, the wind turbine assembly 1800 could be transported to the location of the EV charging station 1802 and placed on its roof. The turbine assembly 1800 may then be electrically connected to the EV charging station 1802 to charge its batteries. As discuss herein, the turbines on the turbine assembly 1800 may be embodied as those available under the name "Flower Turbine" by Flower Turbines LLC in the U.S. and Leviathan Energy Wind Lotus, Ltd. in Israel.

Figure 68:
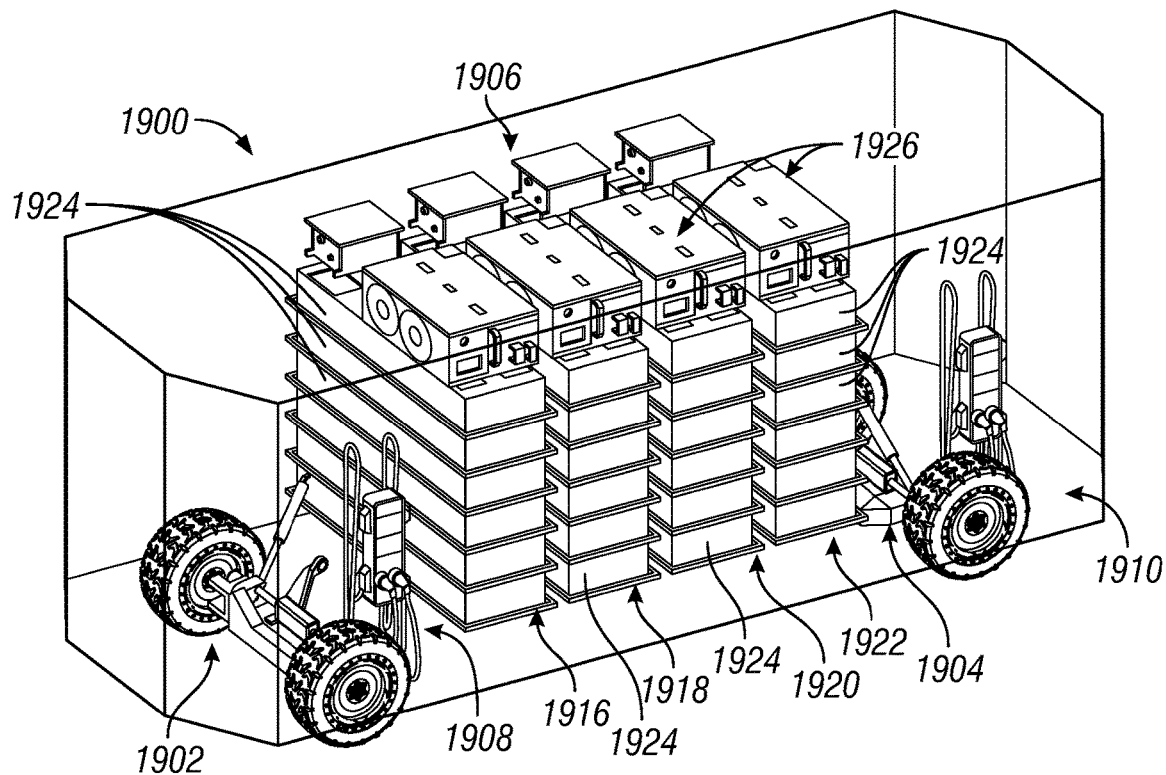
FIGS. 68-69 are perspective and side views, respectively, of an example EV charging station according to an embodiment of this disclosure.
Figure 69:
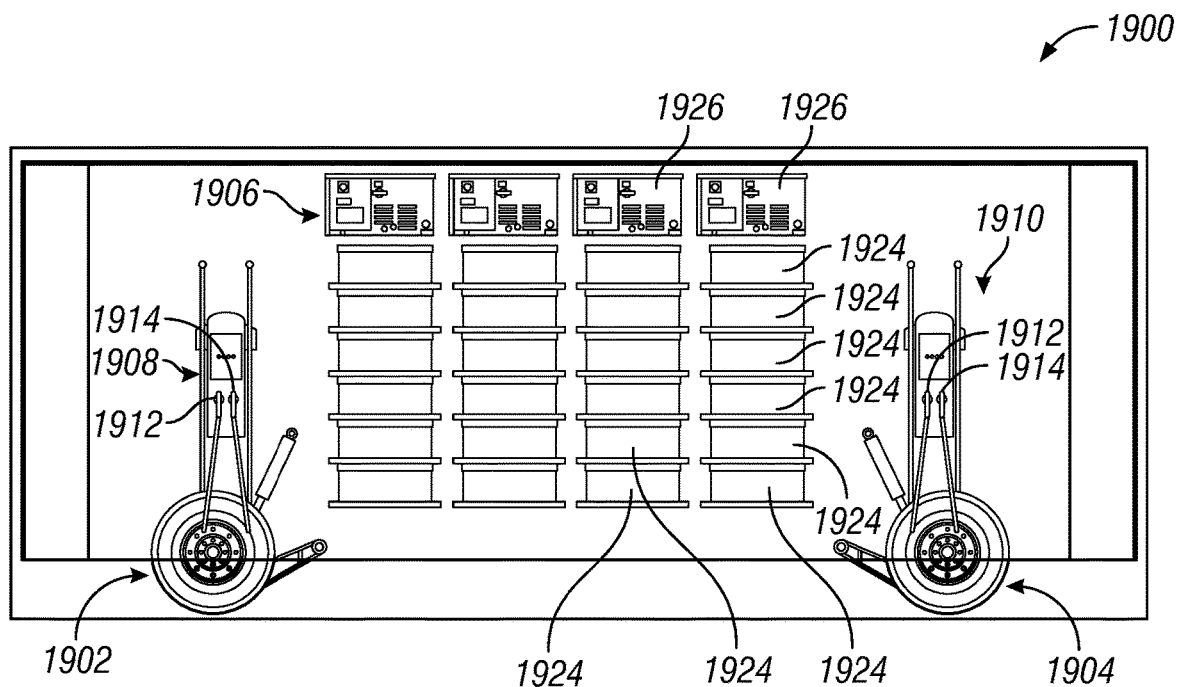

FIGS. 68-69 illustrates a simplified view of an EV charging station 1900 according to an embodiment of this disclosure. In the embodiment shown, there is shown a first set of wheels 1902 and a second set of wheels 1904. One or both of the wheels 1902, 1904 may be connected with a motor to be driven. There may be numerous ways to control the motor(s) driving the wheels 1902 and/or 1904, such as a wireless communications device (e.g., a RF transmitter). As discussed herein, the wheels 1902, 1904 may be movable between an extended position and a retracted position.

In the example shown, the EV charging station 1900 includes a charging system 1906 for supplying power for charging vehicles. As shown, the charging system 1906 is positioned along a longitudinal axis of the EV charging station 1900 between the sets of wheels 1902, 1904. In the example shown, the charging system 1906 supplies electrical power to a first charging bay 1908 and a second charging bay 1910. As shown, both the bays 1908, 1910 includes a first connector 1912 and a second connector 1914 for connecting multiple vehicles for charging. The charging system 1906 can be controlled by selectively supplying electrical power to the connectors 1912, 1914 of the bays 1908, 1910.

In the embodiment shown, the charging system 1906 includes a first power stack 1916, a second power stack 1918, a third power stack 1920, and a fourth power stack 1922. As shown, each power stack 1916, 1918, 1920, 1922 includes a plurality of batteries 1924 for supplying power and a controller system 1926 for controlling electrical supply/charging of the batteries. In some embodiments, the charging system 1906 selects which power stack 1916, 1918, 1920, 1922 to supply power when there is an electrical demand on one of the connectors 1912, 1914.

Consider an example in which a connector 1912 on the first bay 1908 receives a demand for electrical charging a vehicle. The charging system 1906 could be configured to determine which power stack 1916, 1918, 1920, 1922 will supply electrical power for the connector 1912 on the first bay 1908 based on one or more predetermined parameters. For example, one of the predetermined parameters could be the charge level of the batteries for the power stack 1916, 1918, 1920, 1922. In other words, the charging system 1906 could compare the charge level of the batteries for each power stack 1916, 1918, 1920, 1922, and pick the power stack that has batteries with the highest charge level to supply electrical power to the first connector 1912 on the first bay 1908. If there is then a demand on the second connector 1914 on the first bay 1908, the charging system 1906 could then select the power stack 1916, 1918, 1920, 1922 with the next highest battery charge level to supply electrical power to the second connector 1914 on the first bay 1908. Other parameters, such as which power stack is under maintenance or repair or current battery health, etc. could be used for determining which of the power stacks 1916, 1918, 1920, 1922 will supply electrical power to a connector 1912, 1914 requesting power. Although the example charging system 1906 includes four power stacks 1916, 1918, 1920, 1922 for purposes of example, more of fewer power stacks could be provided depending on the circumstances.

Figure 70:
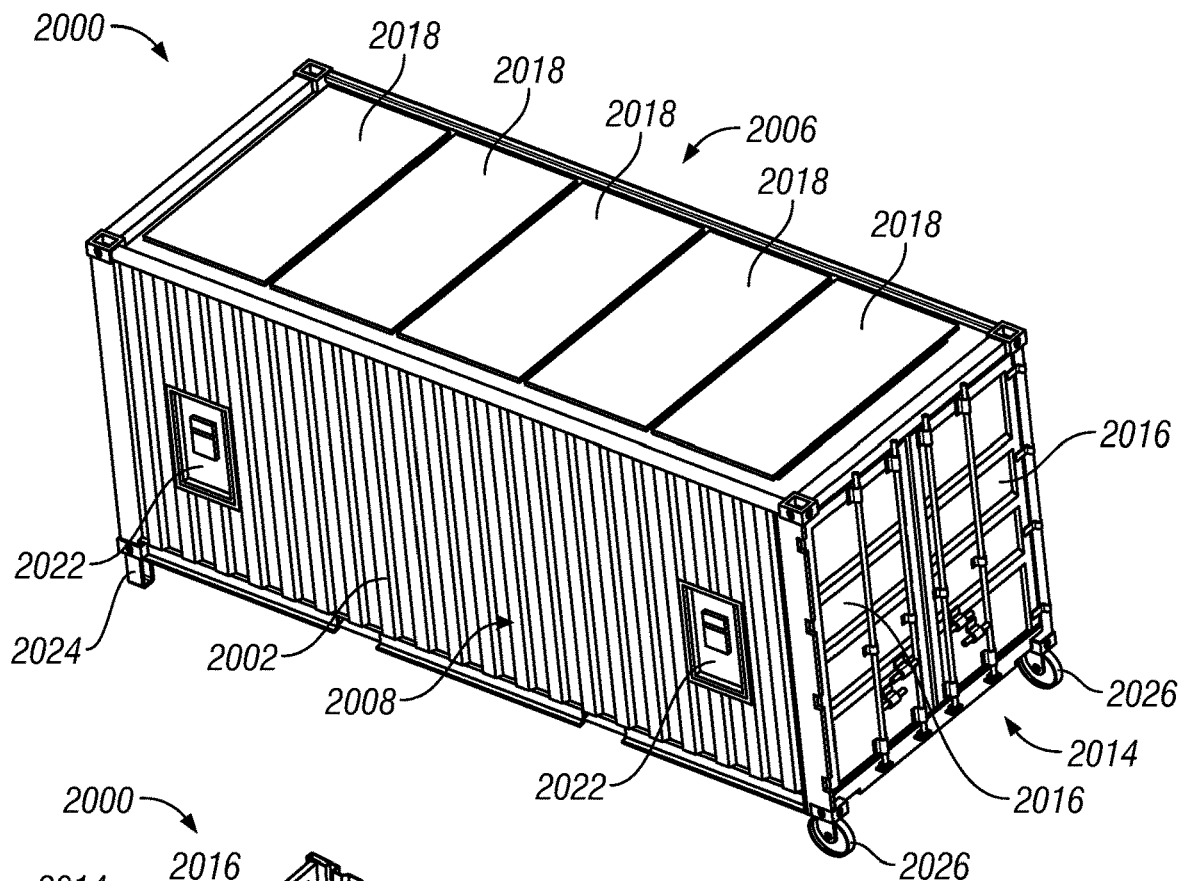
FIG. 70 is a perspective view of an example EV charging station in which the housing is formed from a shipping container.
Figure 71:
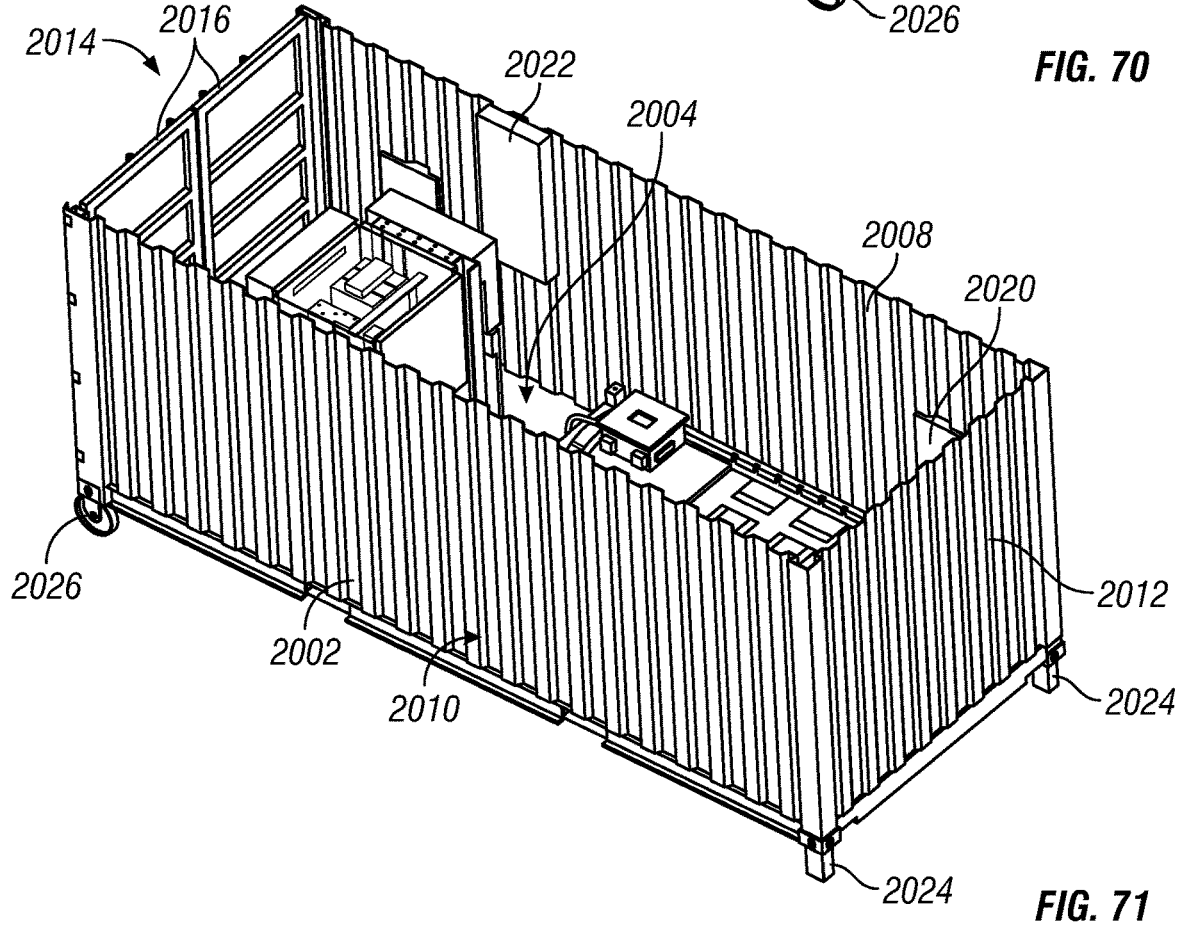
FIG. 71 is a perspective view of the example EV charging station shown in FIG. 70 with the roof removed.

FIGS. 70 and 71 illustrate an EV charging station 2000 in which the housing 2002 is formed from a shipping container. The functionality of the EV charging station 2000 may include one or more of the features described herein for the numerous EV charging station embodiments, but with the housing 2002 formed as a shipping container. In some examples, the housing 2002 could be sized in a standard shipping container size, such as being sized in accordance with one or more of ISO, UIC, TIR and/or CSC standards. For example, the housing 2002 could be a standard ISO 20 foot (6.06 m) or standard ISO 40 foot (12.2 m) shipping container.

In the example shown, the housing 2002 includes a floor 2004 (FIG. 71), a roof 2006 (FIG. 70), a first side wall 2008, a second side wall 2010, a back wall 2012, and a front wall 2014 formed from doors 2016. As shown in the embodiment of FIG. 70, a plurality of solar panels 2018 could be mounted to the roof 2006 for recharging batteries of the EV charging station 2000. In the embodiment shown, there is a first charging bay 2020 and a second charging bay 2022. However, depending on the circumstances, there could be a single charging bay or more than two charging bay. As shown, there are legs 2024 suspending the back wall 2012 above the ground and wheels 2026 suspending the front wall 2014 above the ground. In some cases, the door(s) 2016 can be opened to perform maintenance and/or repair to components inside the housing 2002.

EXAMPLES

Illustrative examples of the technologies disclosed herein are provided below. An embodiment of the technologies may include any one or more, and any combination of, the examples described below.

Example 1 includes a mobile electronic vehicle (EV) charging station with a charging station housing having an interior compartment. The charging station has one or more charging bays arranged on the charging station housing. The one or more charging bays include one or more charging connectors each configured to connect to an EV vehicle. The charging station includes a plurality of batteries within the interior compartment of the charging station housing. There is a power delivery subsystem to control supply of electrical power from one or more of the plurality of batteries to the one or more charging connectors. Also, the charging station has a drive system to drive the charging station housing from a first position to a second position.

Example 2 includes the subject matter of Example 1, wherein the drive system comprises a plurality of wheels and one or more motors operatively connected together such that the drive system drives one or more of the plurality of wheels with the one or more motors.

Example 3 includes the subject matter of Examples 1-2, wherein the drive system is controllable to adjust speed and/or steering of one or more wheels of the plurality of wheels.

Example 4 includes the subject matter of Examples 1-3, wherein the drive system is configured to be remotely controlled as to speed and/or steering based on wireless communications received from a wireless controller.

Example 5 includes the subject matter of Examples 1-4, wherein the plurality of wheels are movable between an extended position and a retracted position.

Example 6 includes the subject matter of Examples 1-5, wherein the drive system is configured to move the plurality of wheels between the extended position and the retracted position based on a wireless controller.

Example 7 includes the subject matter of Examples 1-6, wherein when the plurality of wheels are in the extended position, the plurality of wheels suspend the charging station housing above a ground.

Example 8 includes the subject matter of Examples 1-7, wherein when the plurality of wheels are in the retracted position, at least a portion of the charging station housing makes contact with the ground.

Example 9 includes the subject matter of Examples 1-8, wherein the plurality of wheels are pivotally connected with the charging station housing.

Example 10 includes the subject matter of Examples 1-9, wherein the plurality of wheels pivot between the extended and retracted positions.

Example 11 is a method of transporting an electronic vehicle (EV) charging station. The method includes the step of providing a self-propelled EV charging station that is configured to be wirelessly driven between a first position and a second position, wherein the EV charging station includes a power delivery subsystem capable of supplying Level 2 and/or Level 3 charging to one or more electronic vehicles (EVs). The self-propelled EV charging station is loaded into a cargo area of a transport vehicle by driving, using a wireless controller, the self-propelled EV charging station from an ingress location up a ramp of the transport vehicle to the cargo area. Additionally, the method includes unloading the self-propelled EV charging station from the cargo area of the transport vehicle by driving, using the wireless controller, the self-propelled EV charging station down the ramp to an egress location.

Example 12 includes the subject matter of Example 11, wherein the self-propelled EV charging station includes a plurality of wheels that are movable between an extended position and a retracted position.

Example 13 includes the subject matter of Examples 11-12, wherein the self-propelled EV charging station includes a plurality of wheels that are movable between an extended position and a retracted position based on the wireless controller.

Example 14 includes the subject matter of Examples 11-13, wherein the plurality of wheels pivot between the extended position and the retracted position.

Example 15 includes the subject matter of Examples 11-14, wherein in the extended position, the plurality of wheels suspend the self-propelled EV charging station above the ground.

Example 16 includes the subject matter of Examples 11-15, wherein in the retracted position, the plurality of wheels are fully retained within the self-propelled EV charging station so that at least a portion of the self-propelled EV charging station makes contact with a ground.

Example 17 includes the subject matter of Examples 11-16, wherein loading includes (i) moving the plurality of wheels to the extended position prior to driving the self-propelled EV charging station up the ramp and (ii) moving the plurality of wheels to the retracted position upon the self-propelled EV charging station reaching the cargo area.

Example 18 includes the subject matter of Examples 11-17, wherein unloading includes (i) moving the plurality of wheels to the extended position prior to driving the self-propelled EV charging station down the ramp and (ii) moving the plurality of wheels to the retracted position upon the self-propelled EV charging station reaching the egress location.

Example 19 is a mobile electronic vehicle (EV) charging station with a cuboid-shaped charging station housing having an interior compartment. The charging station has one or more charging connectors to electrically connect with an EV vehicle. There is a plurality of batteries within the interior compartment of the cuboid-shaped charging station housing. The charging station has a communication subsystem and a power delivery subsystem to control supply of electrical power from one or more of the plurality of batteries to the one or more charging connectors. There is a drive system with a plurality of wheels and one or more motors to drive one or more of the plurality of wheels, wherein the drive system is configured to control speed and/or steering of the plurality of wheels based on wireless communications received from the communication subsystem.

Example 20 includes the subject matter of Example 19, wherein the drive system is configured to adjust speed and/or steering of the plurality of wheels based on RF communications received from the communication subsystem.

Example 21 includes the subject matter of Examples 19-20, wherein the cuboid charging station defines a longitudinally-extending plane along a bottom-most portion of the cuboid charging station, wherein the plurality of wheels are movable between an extended position that intersects the longitudinally-extending plane along the bottom-most portion and a retracted position that is free of the longitudinally-extending plane.

Example 22 includes the subject matter of Examples 19-21, wherein the plurality of wheels pivot between the extended position and the retracted position.

Example 23 includes the subject matter of Examples 19-22, wherein the cuboid charging station housing includes a first side wall and a second side wall spaced apart by the interior compartment, wherein at least one of the one or more charging connectors are on both the first side wall and the second side wall.

Example 24 includes the subject matter of Examples 19-23, wherein the first side wall includes at least three charging connectors and the second side wall includes at least three charging connectors.

Example 25 includes the subject matter of Examples 19-24, wherein the first side wall and the second side wall are connected by an end wall with a door for accessing the interior compartment.

Example 26 is an electronic vehicle (EV) charging station that includes a charging station housing with an interior compartment; in this embodiment, the charging station housing comprises a shipping container. The charging station includes one or more charging connectors extending through openings in the shipping container to electrically connect with an EV vehicle. The charging station includes a plurality of batteries within the interior compartment of the charging station housing. Additionally, there is a power delivery subsystem to control supply of electrical power from one or more of the plurality of batteries to the one or more charging connectors.

Example 27 includes the subject matter of Example 26, wherein the shipping container is dimensioned as one of (i) a 20 foot ISO shipping container; or (ii) a 40 foot ISO shipping container.

Example 28 is an electronic vehicle (EV) charging station with a charging station housing with an interior compartment. The EV charging station has a vehicle barrier extending transversely from the charging station housing and one or more charging bays with charging connectors to electrically connect with an EV vehicle. The charging station includes a plurality of batteries within the interior compartment of the charging station housing. Additionally, there is a power delivery subsystem to control supply of electrical power from one or more of the plurality of batteries to the one or more charging connectors.

Example 29 includes the subject matter of Example 28, wherein the vehicle barrier is movable between an extended position in which the vehicle barrier extends transversely from a first side wall and/or a second side wall of the charging station housing and a retracted position in which the vehicle barrier is substantially flush with the first side wall and/or second side wall.

Example 30 includes the subject matter of Examples 28-29, wherein the vehicle barrier is configured to pivot between the extended position and the retracted position.

Example 31 includes the subject matter of Examples 28-30, wherein one or more charging bays include a recessed area and at least a portion of the vehicle barrier is within the recessed area in the retracted position.

Example 32 includes the subject matter of Examples 28-31, further comprising a status indicator associated with a charging bay of the one or more charging bays, wherein the status indicator is on a first side wall or a second side wall of the charging station housing, wherein the status indictor is to indicate a current status of the charging bay with which the status indicator is associated.

Example 33 includes the subject matter of Examples 28-32, wherein the status indicator is positioned above the one or more charging connectors of the charging bay with which the status indicator is associated.

Example 34 includes the subject matter of Examples 28-33, wherein the status indicator changes color based on the current status of the charging bay with which the status indicator is associated.

Example 35 includes the subject matter of Examples 28-34, further comprising at least one monitor associated with a charging bay of the one or more charging bays, wherein the at least one monitor is on a first side wall or a second side wall adjacent to the charging bay with which the at least one monitor is associated.

Example 36 is an electronic vehicle (EV) charging station with a cuboid-shaped charging station housing with an interior compartment, wherein the cuboid-shaped charging station housing includes a roof. The charging station includes one or more charging bays with charging connectors to electrically connect with an EV vehicle. There is a plurality of batteries within the interior compartment of the cuboid-shaped charging station housing. The charging station includes one or more solar panels are mounted to the roof of the cuboid-shaped charging station housing, wherein the one or more solar panels are electrically connected with the plurality of batteries to recharge the plurality of batteries based on harvesting solar energy. Additionally, the charging station includes a power delivery subsystem to control supply of electrical power from one or more of the plurality of batteries to the one or more charging connectors.

Example 37 includes the subject matter of Example 36, wherein the one or more solar panels comprises a central solar panel and a side solar panel extending transversely from the central solar panel.

Example 38 includes the subject matter of Examples 36-37, wherein the side solar panel is movable with respect to the central solar panel between an extended position and a retracted position.

Example 39 includes the subject matter of Examples 36-38, wherein the side solar panel telescopes in and out of the central solar panel between the extended and retracted positions.

Example 40 includes the subject matter of Examples 36-39, wherein the side solar panel pivots between the extended and retracted positions.

Example 41 includes the subject matter of Examples 36-40, wherein the central solar panel approximately corresponds with a size of the roof.

Example 42 includes the subject matter of Examples 36-41, wherein the one or more solar panels are mounted to the roof with an adjustable platform assembly to adjust an orientation of the one or more solar panels.

Example 43 includes the subject matter of Examples 36-42, wherein the adjustable platform dynamically adjusts orientation of the one or more solar panels based on a position of the sun and/or atmospheric conditions.

Example 44 includes the subject matter of Examples 36-43, wherein the adjustable platform is configured to tilt the one or more solar panels up to approximately 30 degrees from a horizontal position.

Example 45 includes the subject matter of Examples 36-44, wherein the adjustable platform includes a plurality of pneumatic cylinders to adjust orientation of the one or more solar panels.

Example 46 includes the subject matter of Examples 36-45, wherein the roof defines a recessed area and at least a portion of the adjustable platform is within the recessed area.

Example 47 is an electronic vehicle (EV) charging station with a cuboid-shaped charging station housing with an interior compartment, wherein the cuboid-shaped charging station housing includes a roof. The charging station includes one or more charging bays with charging connectors to electrically connect with an EV vehicle. There is a plurality of batteries within the interior compartment of the cuboid-shaped charging station housing. The charging station includes one or more wind turbines are mounted to the roof of the cuboid-shaped charging station housing, wherein the one or more wind turbines are electrically connected with the plurality of batteries to recharge the plurality of batteries based on harvesting wind energy. Additionally, the charging station includes a power delivery subsystem to control supply of electrical power from one or more of the plurality of batteries to the one or more charging connectors.

Example 48 includes the subject matter of Example 47, wherein the one or more wind turbines comprise a wind turbine assembly with a plurality of wind turbines mounted to a platform to be placed on the roof of the cuboid-shaped charging station housing.

Example 49 includes the subject matter of Examples 47-48, wherein the platform is dimensioned to fit within a size envelope of the roof.

Example 50 includes the subject matter of Examples 47-49, wherein the plurality of wind turbines are spatially arranged on the platform in a plurality of rows.

Example 51 includes the subject matter of Examples 47-50, wherein each of the plurality of wind turbines includes a blade that rotates about a substantially vertical axis.

Example 52 includes the subject matter of Examples 47-51, wherein at least a portion of the one or more wind turbines is moveable between an extended position and a retracted position.

Example 53 includes the subject matter of Examples 47-52, wherein the one or more wind turbines is movable between the extended and retracted positions by one or more of (i) pivoting between the extended and retracted positions; or (ii) moving along a substantially vertical axis between extended and retracted positions.

Example 54 includes the subject matter of Examples 47-53, further comprising a turbine transport apparatus to transport the wind turbine assembly between a first location and a second location.

Example 55 includes the subject matter of Examples 47-54, wherein the turbine transport apparatus is configured to move the wind turbine assembly between a raised position at a height above the roof and a lowered position.

The invention claimed is:
1. A mobile electronic vehicle (EV) charging station comprising:
 a cuboid-shaped charging station housing with an interior compartment, wherein the charging station housing includes a roof with rim defining a perimeter of a recessed area;
 a solar panel assembly with a solar array movable between a retracted position and an extended position, wherein in the retracted position, the solar array: (1) is received within the recessed area and does not extend above the rim; and (2) has an exposed surface area no greater than the area defined by the rim, wherein in the extended position, the solar array: (1) extends above the rim; and (2) has an exposed surface area greater than the area defined by the rim;
 one or more charging connectors to electrically connect with an EV vehicle;
 a plurality of batteries within the interior compartment of the cuboid-shaped charging station housing;
 a communication subsystem;
 a power delivery subsystem to control supply of electrical power from one or more of the plurality of batteries to the one or more charging connectors; and
 a drive system with a plurality of wheels and one or more motors to drive one or more of the plurality of wheels, wherein the drive system is configured to control speed and/or steering of the plurality of wheels based on wireless communications received from the communication subsystem.

2. The mobile EV charging station of claim 1, wherein the drive system is configured to adjust speed and/or steering of the plurality of wheels based on RF communications received from the communication subsystem.

3. The mobile EV charging station of claim 1, wherein the cuboid charging station defines a longitudinally-extending plane along a bottom-most portion of the cuboid charging station, wherein the plurality of wheels are movable between an extended position that intersects the longitudinally-extending plane along the bottom-most portion and a retracted position that is free of the longitudinally-extending plane.

4. The mobile EV charging station of claim 1, wherein the plurality of wheels pivot between the extended position and the retracted position.

5. The mobile EV charging station of claim 1, wherein the cuboid charging station housing includes a first side wall and a second side wall spaced apart by the interior compartment, wherein at least one of the one or more charging connectors are on both the first side wall and the second side wall.

6. The mobile EV charging station of claim 5, wherein the first side wall includes at least three charging connectors and the second side wall includes at least three charging connectors.

7. The mobile EV charging station of claim 6, wherein the first side wall and the second side wall are connected by an end wall with a door for accessing the interior compartment.

8. The mobile EV charging station of claim 1, wherein the solar panel assembly is configured to automatically adjust a tilt of the solar array based on sun position and/or atmospheric conditions.

* * * * *